(12) United States Patent
Parker et al.

(10) Patent No.: US 9,279,075 B2
(45) Date of Patent: *Mar. 8, 2016

(54) PHASE CHANGE MATERIAL-CONTAINING COMPOSITION AND RELATED PRODUCTS AND METHODS

(75) Inventors: Joseph B. Parker, Longmont, CO (US);
Joseph A. Driscoll, Honey Creek, IA (US)

(73) Assignee: Smart PCM Patent Holdco, LLC, Loveland, CO (US)

( * ) Notice: Subject to any disclaimer, the term of this patent is extended or adjusted under 35 U.S.C. 154(b) by 414 days.

This patent is subject to a terminal disclaimer.

(21) Appl. No.: 13/641,446

(22) PCT Filed: Apr. 15, 2011

(86) PCT No.: PCT/US2011/032724
§ 371 (c)(1),
(2), (4) Date: Oct. 15, 2012

(87) PCT Pub. No.: WO2011/130657
PCT Pub. Date: Oct. 20, 2011

(65) Prior Publication Data
US 2013/0034732 A1     Feb. 7, 2013

Related U.S. Application Data

(63) Continuation-in-part of application No. 12/760,818, filed on Apr. 15, 2010, now abandoned, which is a continuation-in-part of application No. 12/356,144, filed on Jan. 20, 2009, now abandoned.

(51) Int. Cl.
*C09K 5/02* (2006.01)
*C09K 5/06* (2006.01)
(Continued)

(52) U.S. Cl.
CPC ............... *C09K 5/063* (2013.01); *C04B 28/10* (2013.01); *C04B 28/14* (2013.01); *C04B 28/34* (2013.01); *C04B 2103/0071* (2013.01); *C04B 2111/28* (2013.01); *Y10T 428/2982* (2015.01)

(58) Field of Classification Search
CPC ......... C04B 12/02; C04B 12/025; C09K 5/02
See application file for complete search history.

(56) References Cited

U.S. PATENT DOCUMENTS 4,259,401 A    3/1981   Chahroudi et al.
4,504,306 A    3/1985   Miyashita et al.
(Continued)

FOREIGN PATENT DOCUMENTS

EP       0344013      5/1989
EP       1508552      2/2005
(Continued)

OTHER PUBLICATIONS

Kosny et al. New PCM-Enhanced Cellulose Insulation Developed by the ORNL Research Team. http://www.ornl.gov/sci/roofs+walls/research/detailed_papers/PCM. 17 pages. 2006.
(Continued)

*Primary Examiner* — Paul Marcantoni
(74) *Attorney, Agent, or Firm* — Russell S. Krajec

(57) ABSTRACT

The present invention provides methods of producing manufactured aggregates and other compositions from an encapsulated PCM slurry, suspension or emulsion by combining a cementitious binder and a adsorbent and/or absorbent with the PCM slurry. The encapsulated PCM-containing composition can be produced in an agglomeration process. The ingredients can also be mixed to form a viscous mass which can be extruded or otherwise formed to produce useful products.

17 Claims, 28 Drawing Sheets

(51) Int. Cl.
*C04B 28/10* (2006.01)
*C04B 28/14* (2006.01)
*C04B 28/34* (2006.01)
C04B 103/00 (2006.01)
C04B 111/28 (2006.01)

(56) References Cited

U.S. PATENT DOCUMENTS

| | | | |
|---|---|---|---|
| 4,572,864 A | 2/1986 | Benson et al. | |
| 4,599,321 A | 7/1986 | Rainis | |
| 4,747,240 A | 5/1988 | Voisinet | |
| 4,801,630 A | 1/1989 | Chow et al. | |
| 4,964,402 A | 10/1990 | Grim et al. | |
| 4,988,543 A | 1/1991 | Houle et al. | |
| 5,106,520 A * | 4/1992 | Salyer | 252/70 |
| 5,178,785 A | 1/1993 | Dolan et al. | |
| 5,435,376 A | 7/1995 | Hart et al. | |
| 5,626,936 A | 5/1997 | Alderman | |
| 5,755,216 A | 5/1998 | Salyer | |
| 5,770,295 A | 6/1998 | Alderman | |
| 5,804,297 A | 9/1998 | Colvin et al. | |
| 6,099,894 A | 8/2000 | Holman | |
| 6,200,681 B1 | 3/2001 | Jahns et al. | |
| 6,444,601 B1 | 9/2002 | Purcell, Jr. et al. | |
| 6,514,362 B1 | 2/2003 | Zuckerman et al. | |
| 6,645,598 B2 | 11/2003 | Alderman | |
| 6,652,771 B2 * | 11/2003 | Carn | 252/70 |
| 6,694,693 B2 | 2/2004 | Alderman | |
| 6,703,127 B2 | 3/2004 | Davis et al. | |
| 6,716,526 B2 | 4/2004 | Weston et al. | |
| 7,166,355 B2 | 1/2007 | Jahns et al. | |
| 7,240,513 B1 | 7/2007 | Conforti | |
| 7,247,263 B2 | 7/2007 | Parker et al. | |
| 7,576,985 B2 | 8/2009 | Kingston | |
| 7,632,006 B2 | 12/2009 | Schulz | |
| 7,699,928 B2 * | 4/2010 | Paul, Jr. | 106/691 |
| 2005/0055982 A1 | 3/2005 | Medina | |
| 2005/0059757 A1 | 3/2005 | Bredt et al. | |
| 2005/0241537 A1 | 11/2005 | Hicks et al. | |
| 2006/0111001 A1 | 5/2006 | Kosny et al. | |
| 2006/0124892 A1 | 6/2006 | Rolland et al. | |
| 2007/0224399 A1 | 9/2007 | Rabin et al. | |
| 2007/0224899 A1 | 9/2007 | Dungworth et al. | |
| 2009/0011171 A1 | 1/2009 | Alderman | |
| 2009/0156725 A1 | 6/2009 | Hampton | |
| 2009/0250189 A1 | 10/2009 | Soukhojak et al. | |
| 2010/0247851 A1 * | 9/2010 | Miyata et al. | 428/116 |
| 2013/0298991 A1 * | 11/2013 | Parker et al. | 136/259 |

FOREIGN PATENT DOCUMENTS

| | | |
|---|---|---|
| EP | 1857520 | 11/2007 |
| GB | 2462740 | 2/2010 |
| WO | 2009/059908 | 5/2009 |

OTHER PUBLICATIONS

Wagh, Arun S. Chemically Bonded Phosphate Ceramics: Twenty-First Century Materials With Diverse Applications. Elsevier. 2004. pp. 239-241.
Micronal® PCM SmartBoard™ 23/26, Technical data, material, preparation, jointing, finishing. 2 pages. Aug. 2006.
Castellón et al. Use of Microencapsulated Phase Change Materials in Building Applications. ASHRAE. 6 pages. 2007.
Kosny et al. 2006/2007 Field Testing of Cellulose Fiber Insulation Enhanced with Phase Change Material: Final Report. (ORNL/TM-2007/186) 49 pages. Sep. 2008.

* cited by examiner

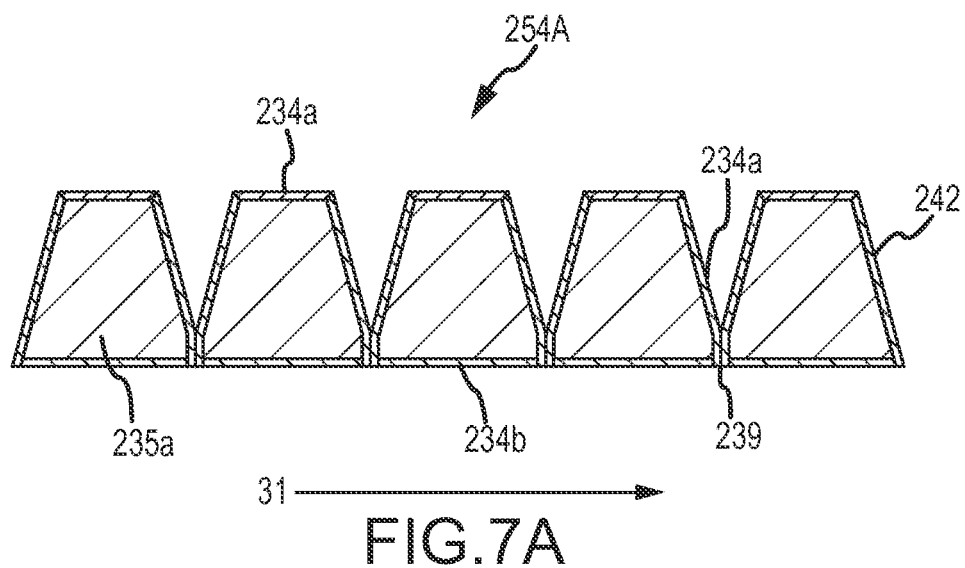
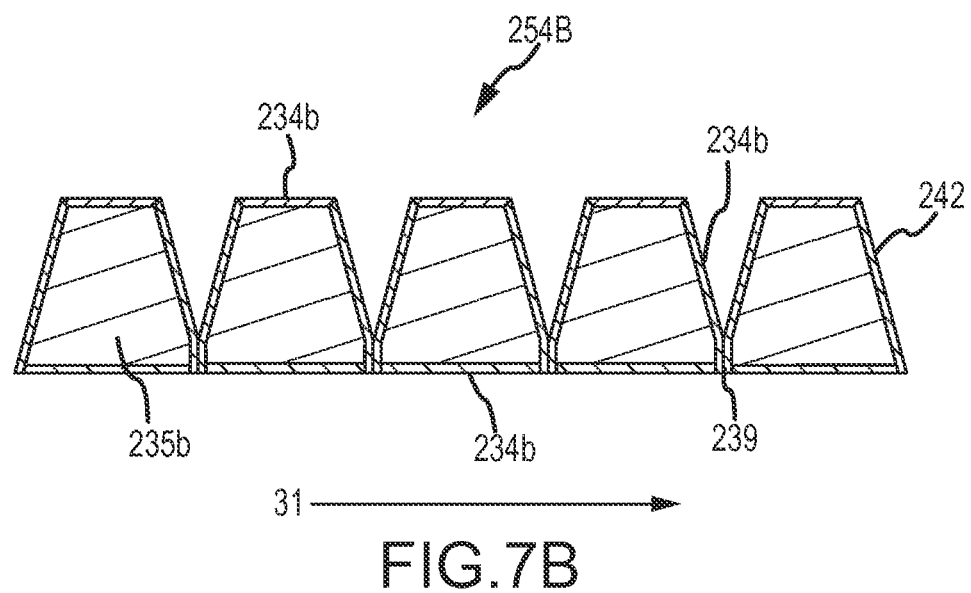

PHASE CHANGE MATERIAL-CONTAINING COMPOSITION AND RELATED PRODUCTS AND METHODS

CROSS REFERENCE APPLICATIONS

This application is a §371 national stage entry of International Application No. PCT/US11/32724 filed on Apr. 15, 2011 which is a continuation-in-part of U.S. patent application Ser. No. 12/760,818 filed Apr. 15, 2010, which is a continuation-in-part of U.S. patent application Ser. No. 12/356,144, filed Jan. 20, 2009. International Application No. PCT/US11/32724 is a continuation-in-part of International Application No. PCT/US2010/060599 filed Dec. 15, 2010, which claims priority to U.S. Provisional Patent Application No. 61/286,635 filed Dec. 15, 2009. Each of the patent applications referenced in this paragraph are incorporated herein by reference as if each and every part thereof were set forth herein in full.

FIELD OF INVENTION

The present invention relates generally to the field of compositions containing phase change material and related products (e.g., building products), methods (e.g., of manufacture) of use).

BACKGROUND OF THE INVENTION

Phase change materials (PCM) are thermal storage materials that are capable of storing large amounts of thermal energy that can be useful in moderating daytime-to-nighttime temperature fluctuations. At present a great deal of interest and markets exist for PCM. Well engineered lightweight structures utilizing PCMs typically reduce cycling of heating and cooling machinery and cause the buildings temperatures to more closely remain in the comfort zone for occupants. PCMs can be hydrated salts, plastic crystals, hydrated salts with glycols or hydrocarbon waxes. Ciba Specialty Chemicals' U.S. Pat. No. 6,716,526 and BASF U.S. Pat. No. 6,200,681 describe manufacturing processes for making microencapsulated hydrocarbon wax phase change particles. The manufacturing process of microencapsulated phase change material (mPCM) produces an aqueous emulsion that contains both solids and liquids. The solids portion, for example 42 to 48 weight percent, are PCM wax particles encased by shell of acrylic or other polymer material. The liquid portion contains from 58 to 52 weight percent water with wax and acrylics residues not bound up to the solids in the production process. In the past, for some applications it has been necessary to remove the encapsulated PCM solids from the acrylics dispersion in the slurry by a costly drying process to effectively incorporate encapsulated PCM into most other products.

An obstacle to the acceptance of organic PCM (e.g., hydrocarbon waxes) in building materials has been that such PCM may be inherently flammable. The PCM itself may be a hydrocarbon, typically a paraffin, that burns very easily. The PCM capsule material, whether of an acrylic polymer or another polymer material (e.g., melamine/formaldehyde resin), or some other material, may also be inherently flammable. There are a number of processes in the prior art for making encapsulated PCM and for the use of PCM in concrete, wallboard, insulation, and other building products.

U.S. Pat. No. 4,747,240, issued May 31, 1988 for Encapsulated PCM Aggregate to Voisinet et al., describes a process in which PCM as an admixture is incorporated directly into a variety of cementitious interior building materials. In that patent, both microencapsulated PCM or "form stabilized", non-encapsulated PCM, is incorporated directly as an aggregate into a cementitious composition. That patent does not contemplate an aggregate of various sizes, but describes the encapsulated PCM particles themselves as aggregate.

Similarly, U.S. Pat. No. 7,166,355, issued Jan. 23, 2007 for Use of Microcapsules in Gypsum Plaster Board to Jahns et al., discusses a process wherein microencapsulated PCM is incorporated directly into cementitious building material, i.e., wallboard core and plasterboard. This patent states that special steps must be taken to ensure the bonding of all components because of the poor bonding nature of the microencapsulated PCM particles.

WO 2009/059908 discusses compositions containing particles of organic phase change material, particles of fire retarding magnesium hydroxide and/or aluminum hydroxide, and/or magnesia cement. GB 2462740 A discusses compositions with magnesia cement made using magnesium oxide, magnesium chloride and water, and reports moderate first resistance with a low loading of PCM.

SUMMARY OF THE INVENTION

Phase change material-containing compositions, such as for use as or to manufacture building products, that have a high level of fire resistance together with a high loading of the phase change material and/or that are easier to incorporate in other materials would be highly desirable, especially in the case of organic phase change materials.

A first aspect of the invention includes a phase change material-containing composition. The composition includes phase change material, sorbent, and cement binder. The phase change material-containing composition may also be referred to as a cementitious mixture, and at times is referred to as such herein. A reference herein simply to "composition" is to the phase change material-composition of the invention, unless clearly intended otherwise by the context in which the term is used. The phase change material-containing composition is also sometimes referred to herein as a "PCM Composition." A number of feature refinements and additional features are applicable to the first aspect of the invention, which feature refinements and additional features may be used individually or in any combination. As such, each of the following features may be, but are not required to be, used with any other feature or combination of features of the aspects presented herein.

The composition may be provided in any physical shape or form. The composition may be provided in the form of aggregates, or particles (referred to herein both as a "particulate form" and an "aggregate form"). The composition may be provided in the form of a monolithic mass ("monolithic form"), as a single-piece structure of relatively large dimension (e.g., an extruded mass or molded mass, such as in the form of a sheet, block, strip or other shaped form). In one implementation, such a monolithic mass may have a volume of larger than 9 cubic inches (147 cubic centimeters), or even larger than 10 cubic inches (164 cubic centimeters).

When the composition is in a particulate form (e.g., a batch of particles), the particles of the composition may be sized at any appropriate size, and with any size distribution suitable for a particular application. In some embodiments, particles of the composition may be sized to have a weight average particle size of smaller than 2 inches (50.8 millimeters), smaller than 1 inch (25.4 millimeters), smaller than 0.8 inch (20.3 millimeters), smaller than 0.75 inch (19.05 millimeters), smaller than 0.6 inch (15.2 millimeters), smaller than 0.5 inch (12.7 millimeters), smaller than 0.25 inch (6.35 millimeter) or smaller than 0.24 inch (6.10 millimeter). The particles of the composition may have a weight average particle size of larger than 0.009 inch (0.23 millimeter), larger than 0.01 inch (0.25 millimeter), larger than 0.02 inch (0.51 millimeter), larger than 0.05 inch (1.27 millimeters), larger than 0.09 inch (2.29 millimeters), larger than 0.1 inch (2.54 millimeters) or larger than 0.15 inch (3.81 millimeters). In an embodiment, the particles of the composition may be sized to have a very small weight average particle size, for example with a lower bound chosen from the group consisting of 2 microns, 5 microns, 10 microns, 20 microns, 50 microns, 75 microns, 100 microns, 0.001 inch (0.0254 millimeter), 0.009 inch (0.23 millimeter), and 0.01 inch (0.254 millimeter) and an upper bound chosen from the group consisting of 10 microns, 20 microns, 50 microns, 75 microns, 100 microns, 0.001 inch (0.0254 millimeter). The particles of the composition may have any desired size distribution. The particles of the composition may be sized such that at least 90 weight percent of the particles are smaller than 2 inches (50.8 millimeters), smaller than 1.5 inches (38.1 millimeters), smaller than 1 inch (25.4 millimeters), smaller than 0.9 inch (22.9 millimeters), smaller than 0.75 inch (19.05 millimeters), smaller than 0.6 inch (15.2 millimeters), smaller than 0.5 inch (12.7 millimeters), smaller than 0.4 inch (10.2 millimeters), smaller than 0.25 inch (6.35 millimeters), smaller than 0.1 inch (2.5 millimeters), smaller than 0.01 inch (0.25 millimeter), smaller than 0.001 inch (0.025 millimeter), smaller than 100 microns, smaller than 75 microns, smaller than 50 microns, smaller than 20 microns, smaller than 10 microns, or smaller than 5 microns. The particles of the composition may be sized such that at least 90 weight percent of the particles are larger than 5 microns, 10 microns, 20 microns, 50 microns, 100 microns, 0.005 inch (0.13 millimeter), larger than 0.01 inch (0.25 millimeters), larger than 0.04 inch (1.02 millimeter), larger than 0.05 inch (1.27 millimeters), larger than 0.06 inch (1.52 millimeters), larger than 0.1 inch (2.54 millimeters), larger than 0.15 inch (3.81 millimeters), larger than 0.2 inch (5.08 millimeters) or larger than 0.25 inch (6.35 millimeters). In this regard, such particle size and particle size distribution characteristics may be based on a sieve analysis of the particles of the composition.

When the composition is in a particulate form, the particles (aggregates) of the composition may be loose particles or may be particles bound in a larger structure. By "loose" particles, it is meant that the particles are not bound to each other or with other materials in a larger structure, however such loose particles may be packed or otherwise disposed within a container or a containment structure. By particles "bound" in a larger structure, it means that the particles are bound (attached) either to each other or to another material that is not a part of the particles (e.g., acid-base cement or polymer).

The composition may be a composite that is held together by the cement binder. A wide variety of cement binders may be used, including Portland cements, plaster of Paris, silicate cements, and various acid-base cements. Cement binder is also referred to herein as cementitious binder. The cement binder may be, comprise or consist essentially of an acid-base cement. The cement binder may be, comprise or consist essentially of a chemically bonded ceramic. The cement binder may be comprise or consist essentially of a magnesia cement. One preferred cement binder is a magnesium phosphate cement. The magnesium phosphate cement may comprise the reaction product of cement feedstock components such as magnesium oxide and a phosphate, for example monopotassium phosphate. The magnesium phosphate cement may include water of hydration. For magnesium phosphate cement, water of hydration may often be expected in a range of 5 to 15 weight percent of the solid feedstock components for the cement (e.g., magnesium oxide and monopotassium phosphate).

By "cement binder", it is generally meant, unless the context clearly indicates otherwise, the cured cement composition, although at times the term may be used herein to refer to an uncured binder composition, binder feedstocks (e.g., dry ingredients) or a mixture of binder feedstocks, which will be apparent from the context in which the term is used. The cement binder may be present in any amount sufficient to bind the components of the composition into the structure of the composition (e.g., a composite structure). Often, the cement binder may be present in the composition at a weight ratio of the weight of the cement binder to the weight of the phase change material of at least 0.008:1, at least 0.01:1, at least 0.04:1, at least 0.05:1, at least 0.08:1, at least 0.1:1, at least 0.12:1, or at least 0.16:1. Often, the cement binder may be present in the composition at a weight ratio of the weight of the cement binder to the weight of the phase change material of up to 5:1, up to 2:1, up to 1.5:1, up to 1:1, up to 0.5:1 or up to 0.49:1. One preferred range for the weight ratio of the cement binder to the phase change material is from 0.1:1 to 0.5:1, with another preferred range being from 0.12:1 to 0.49:1.

The composition may be alone or in the presence of other components or materials, and may be uncontained or contained in a container. In one embodiment, the composition is not contained within containment pockets of a flexible containment structure, such as of a phase change material-containing blanket (e.g., as disclosed in International Application No. PCT/US2010/060599). In another embodiment, the composition is contained within a container, or containment pocket of a containment structure, having a containment volume that is larger than 9 cubic inches (147 cubic centimeters), or larger than 10 cubic inches (164 cubic centimeters).

The composition may contain a large content of phase change material. The composition may comprise at least 34 weight percent, at least 35 weight percent, at least 40 weight percent, at least 45 weight percent, at least 50 weight percent, at least 55 weight percent, at least 60 weight percent, or even at least 61 weight percent or more weight percent of the phase change material. The composition may comprise the phase change material in an amount of up to 59 weight percent, up to 60 weight percent, up to 65 weight percent, up to 70 weight percent, up to 75 weight percent or even up to 80 weight percent or more of the composition.

The phase change material may be any material exhibiting a phase change within a desired temperature range. The phase change may be any suitable phase change with a latent heat associated with the phase change. The phase change may be a change from one crystal state to another crystal state (crystalline phase change). The phase change may be a liquid-solid phase change. The phase change material may be an organic material (e.g., hydrocarbons, waxes). The phase change material may be an inorganic salt composition material (e.g., hydrated). Some preferred embodiments are for the phase change material to be, comprise or consist essentially of a hydrocarbon or hydrocarbons (e.g., wax) having a liquid-solid phase change within a desired temperature range. The phase change material may be a blend of components, which may be particularly useful for adjusting the phase change temperature or phase change temperature range of the material. For example, a phase change wax may be a pure wax, a blend of different waxes, or may be a wax with additional components (which may include residual materials from processing). In one implementation, the phase change material may be, comprise or consist essentially of paraffinic hydrocarbons. Such paraffinic hydrocarbons may be, comprise or consist essentially of $C_{13}$ to $C_{28}$ paraffinic hydrocarbons, $C_{15}$ to $C_{26}$ paraffinic hydrocarbons or $C_{16}$ to $C_{22}$ paraffinic hydrocarbons. The phase change material (organic or inorganic) may exhibit a phase change (e.g., crystalline phase change or liquid-solid phase change) at a variety of temperatures, such as within a temperature having a lower limit selected from the group consisting of −10° C., 0° C., 10° C., 15° C., 20° C., 21° C. and an upper limit selected from the group consisting of 90° C., 85° C., 80° C., 75° C., 70° C., 65° C., 55° C., 45° C., 35° and 30° C. and 28° C.

Various commercially available PCMs may be employed in these embodiments, including hydrocarbon liquids or waxes, natural or synthetic waxes, metal inorganic salts containing waters of hydration, and certain crystalline polymer materials. These PCMs may be encapsulated in shells of suitable sizes and materials. One preferred class of PCMs are hydrocarbon waxes. PCM may be encapsulated in shells comprising polymers such as acrylics or melamines, some of which are commercially available from Ciba/BASF and other sources. Encapsulated PCM, which often have average diameters in the range of from about one micron to about 3 mm, may be used with those having diameters in the range of from about one micron to about 100 microns being considered "microencapsulated" PCM.

In some embodiments, the phase change material may be contained in particles that are bound within a composite structure of the composition. As used herein, a "particle" containing PCM refers to a discrete solid or liquid domain within the composition. The particles may consist essentially of only the PCM. The particles may be composite particles with multiple discrete components. When the particles consist essentially of only the PCM, the particles may have been provided during manufacture as a disperse phase of an emulsion, such as a water-in-oil emulsion in the case of hydrocarbon (e.g., wax) phase change materials. One preferred type of such composite particle for the PCM is an encapsulated particle, as discussed above, having a shell-core structure in which the PCM is contained within a core that is enclosed within and surrounded by a shell. The shell may be made of any material, and may be made of a polymeric material. The shell may be of an acrylic material. Particles containing the PCM may be spherical, including those that are substantially spherical or spheroidal even if not exactly spherical. The particles containing the PCM, whether encapsulated or not, may be of any desired size. For example, the particles may have a weight average size of from 1 micron to 3 millimeters. The particles may be microparticles, generally particles having a weight average size of from 1 micron to 100 microns. Encapsulated particles in this micro-size range are often referred to as microencapsulated particles. The particles may be present in the composition in any desired amount. For example, such particles may be present in the composition in any of the amounts listed above for the PCM as a weight percentage of the composition.

As will be appreciated, when the particles are composite particles (e.g., encapsulated particles of a shell-core configuration) the amount (e.g., weight) of phase change material will be smaller than the corresponding amount of the particles. The difference may be small, perhaps only a few weight percentage points of the composition, or may be larger. With shell-core encapsulated particles, the shell may account for a few to several weight percentages of the particle weight. Typically, the shell will account for less than 20 weight percent, or less than 10 weight percent or less than 9 weight percent of the shell-core particles, and with the phase change material often accounting for at least 80 weight percent, or at least 90 weight percent or at least 91 weight percent of the shell-core particles. As will be appreciated, as the size of the particles become smaller, the shell may tend to become a larger percentage of the particles.

The sorbent has capacity to sorb water or an aqueous liquid. By "sorbent" it is meant material that adsorbs and/or absorbs the liquid, and "sorb" includes adsorption and/or absorption mechanisms. The sorbent is sometimes referred to herein as an adsorbent and/or absorbent. The sorbent may serve a number of functions within the composition. The sorbent may beneficially tie up excess water from the manufacture processing. This may be particularly beneficial, for example, when the phase change material is provided in the form of a disperse phase in an emulsion or in a slurry with an aqueous continuous phase. The sorbent may beneficially tie up some or all of the excess aqueous liquid from the emulsion. Even when the sorbent does not tie up all excess liquid, the amount of water that must be dried to prepare the final product may be significantly reduced relative to compositions not including such a sorbent.

The sorbed liquid may also help provide fire resistance to the composition, as some or all of such sorbed water or aqueous liquid may be released when the composition is exposed to high heat or flame. The sorbent itself may also have fire-retardant properties that further increases fire-resistance of the composition, and correspondingly a product containing the composition. In this regard, the fire retardant properties of the composition may be objectively measured (e.g., by Euroclass fire ratings). For example, the composition may have a Euroclass fire rating of C or higher in one embodiment. In another embodiment, the composition may have a Euroclass fire rating of B or higher. This fire retardancy may be due to the composition of the sorbent and/or the shape of morphology of the sorbent, as well as to liquid sorbed to the sorbent. For example, the sorbent may be made of a non-flammable or refractory material. The sorbent should preferably have a sorption capacity for the liquid (e.g., water or aqueous liquid) of at least 0.4, at least 0.5 or even least 0.75 times or more the weight of the sorbent, and more preferably a sorption capacity of at least 0.9, at least 1.0, at least 1.25, at least 1.5, at least 2.0 times or at least 2.1 times the weight of the sorbent. The sorption capacity may often be smaller than 5 or smaller than 3 times the weight of the sorbent. By "sorption capacity" it is meant the amount of the liquid that may be sorbed (tied up) by the sorbent when the sorbent is exposed to the liquid under normal ambient conditions. Examples of some possible materials for the sorbent include the materials selected from the group consisting of silica gel, molecular sieve, zeolite, diatomaceous earth, aluminosilicate minerals and combinations thereof.

Preferred is a sorbent that comprises, preferably includes a majority by weight of, and more preferably consists essentially of a clay. Preferably the clay is a water-sorbing clay. The clay preferably is a substantially non-swelling clay. In that regard, when the clay is a water-sorbing clay, substantially non-swelling means that the volume of the clay does not, or does not significantly, expand when the clay sorbs water. The clay may be a phyllosilicate clay. The clay may be a magnesium alumino silicate mineral in the form of clay particles. The clay particles may have a high aspect ratio such that the length of the clay particles is much greater than the diameter of the clay particles. In this regard, the clay particles may have an average aspect ratio of at least 250:1 or at least 500:1. In various embodiments, such clay particles may have an average diameter of smaller than 6 nanometers, smaller than 4 nanometers or at about 3 nanometers or smaller, and the clay particles may also have an average length of at least 1 micron, at least 1.25 microns, at least 1.4 microns, or at least 2 microns. Attapulgite and palygorskite are examples of clay materials containing needle-like clay particles having such a high aspect ratio. In one preferred implementation, the sorbent comprises, or consists essentially of, a clay selected from the group consisting of attapulgite, palygorskite, and combinations thereof. Clay used as a sorbent may be provided in a mined clay composition as normally produced in normal mining and mineral beneficiation operations, or may be or include a modified composition, for example substantially purified in one or more clay components.

The sorbent may be present in any appropriate amount consistent with the other components of the composition. The sorbent may be present in the composition at a weight ratio of the weight of the sorbent to the weight of the phase change material of at least 0.009:1, at least 0.01:1, at least 0.05:1, at least 0.06:1, at least 0.1:1, at least 2:1 or at least 0.21:1. The sorbent may be present in the cementitious composition at a weight ratio of the weight of the sorbent to the weight of the phase change material of up to 5.5:1, up to 5:1, up to 2:1, up to 1:1, up to 0.9:1, up to 0.6:1, or even up to 0.59:1. One preferred range for the weight ratio of the sorbent to phase change material is from 0.05:1 to 1:1 and another preferred range is from 0.06:1 to 0.9:1

The composition may include water. Some water may be chemically bound water (e.g., water of hydration in the cured cement binder). The composition may also contain significant non-chemically bound water (e.g., water sorbed by a sorbent). For example, the composition may comprise non-chemically bound water at a weight ratio of the non-chemically bound water to the sorbent of at least 0.4:1, at least 0.5:1 or even least 0.75:1 or more, and more preferably a ratio of at least 0.9:1, at least 1.0:1, at least 1.25:1, at least 1.5:1, at least 2.0:1 times or at least 2.1:1. The weight ratio of non-chemically bound water to sorbent may often be smaller than 5:1 or smaller than 3:1.

One advantage of the composition of the invention is that a high loading of flammable phase change material (e.g., waxes, hydrocarbons) may be achieved along with a high fire resistance of the composition. This permits the composition to have a high enthalpy for heat storage due to the latent heat of phase change of the phase change material. The phase change material-containing composition may have an enthalpy of at least 50, at least 55, at least 60, at least 70, at least 80, at least 90, at least 95, at least 100 or at least 105, at least 110, at least 120, or more joules per gram of the composition. By "enthalpy" it is meant, as applied to the phase change material-containing composition, the heat storage capacity per unit weight of the composition, due to the latent heat of phase change (e.g., liquid-solid phase change) for the phase change material contained within the composition.

A second aspect of the invention includes a method for making a phase change material-containing composition. The method includes reacting cement binder feedstock components in a feedstock mixture to form a reacted mixture. The method further includes drying the reacted mixture, the reacted mixture comprising a cement binder that is a product of the reacting. The feedstock mixture includes the cementitious binder feedstock components, particles comprising phase change material, sorbent, and aqueous liquid.

A number of feature refinements and additional features are separately applicable to the second aspect of the invention. These feature refinements and additional features may be used individually or in any combination. As such, each of the following features that will be discussed may be, but are not required to be, used with any other feature or combination of features of second aspect. The feature refinements and additional features presented above with regards to the first aspect of the invention may also be used, but are not required to be used, with the second aspect.

The phase change material may be any phase change material with any of the characteristics as described with respect to the first aspect of the invention. The sorbent may be any sorbent with any of the characteristics as described with respect to the first aspect of the invention. The cement binder may be any cement binder with any of the characteristics as described with respect to the first aspect of the invention. The cement binder feedstock components may be feedstock components for making any cement binder with any of the characteristics as described with respect to the first aspect of the invention.

In one embodiment of the method of the second aspect, the feedstock mixture comprises:

from about 30 to about 60 parts by weight of the aqueous liquid;

from about 25 to about 90 parts by weight of the phase change material;

from about 0.25 to about 20 parts by weight of the cement binder feedstock components, and from about 5 to about 50 parts by weight of the sorbent.

In one variation on this embodiment, the total of the parts by weight in the feedstock mixture of the phase change material, the cement binder feedstock components and the sorbent equal about 100.

In one preferred embodiment of the method of the second aspect, the feedstock mixture comprises:

about 10 parts by weight magnesium oxide;

about 20 parts monopotassium phosphate, also known as potassium acid phosphate (MKP);

about 80 parts of the sorbent;

and about 400 parts by weight of the phase change material (e.g., in slurry form).

The phase change material-containing composition produced according to the method of the second aspect of the invention may be according to any of the discussion above concerning the first aspect of the invention. Any one or more of the cement binder feedstock components, the particles comprising phase change material, the sorbent and the cement binder may be according to the discussion above for the first aspect of the invention, including characteristics of any such materials and proportions of any such materials. As used herein, cement binder feedstock components do not include water which may form part of the final, cured cement binder (e.g., water of hydration).

One variation of the second aspect of the present invention includes a method of manufacturing engineered phase change aggregates or extrudite directly from typical aqueous PCM emulsions by combining a cementitious binder with the slurry in an agglomeration or mixing/extrusion process that bypasses or eliminates the costly spray drying process. The invention also provides types of fast setting cements and an adsorbent and/or absorbent material that bind up a high percentage of the water in the aqueous PCM fluid and set fast enough to allow a continuous PCM production process. The composition in aggregate form then goes through a curing and classification process to meet the size criteria of the end product. If the composition is a viscous mass (e.g., such as a monolithic mass prior to curing), then the composition may go through an extrusion process which matches the application. The invention also provides a method of manufacturing a PCM composition that is substantially fire retardant. Some embodiments of the method of the second aspect of the invention include processes for the production of fire resistant phase change material (PCM) materials, generally comprising initial steps of providing at least one PCM in encapsulated form, then combining same with a cementitious binder and an adsorbent and/or absorbent material. Encapsulated PCMs are available in a variety of melting points and particle sizes (e.g., as discussed above), including microencapsulated versions (mPCM), and can be provided as a substantially dry powder, a damp cake or an aqueous slurry, suspension or emulsion. Depending upon the type of PCM used, aqueous liquids may be added while the ingredients are admixed to form a viscous mass which is a fire resistant PCM material. The proportions should be effective to provide sufficient plasticity in the viscous mass to permit further processing, such as extrusion, before the material begins to set. The proportions of the principal ingredients can be (expressed as parts by weight)

Aqueous liquid from about 30 to about 60
PCM solids (including capsule materials)—from about 25 to about 90;
cementitious binder—from about 0.25 to about 20, and
absorbent and/or adsorbent (i.e., sorbent)—from about 5 to about 50.

Regardless of the type(s) of PCM and the amount of aqueous liquid added to the formula, the final moisture content of the viscous mass produced by mixing all ingredients is often in the range of from about 25, or about 30, or at about 35 weight percent to about 60 weight percent, relative to the total weight of all ingredients other than the water. By "final moisture content" it is meant the total moisture content of the viscous mass before drying and/or hardening take place. The amount of absorbent and/or adsorbent (i.e., sorbent) can be from about one times to about six times the weight of the cementitious binder. In separate embodiments, the ingredients can be combined in an agglomerator or pelletizer to form PCM aggregate particles which have many uses and can be produced and processed to obtain aggregates having a wide range of average sizes and particle size distributions. Preferably, the aggregate particles have a non-respirable minimum size of about 20 microns or larger. In various embodiments, the aggregate particles may have size and size distribution characteristics as discussed above with regard to the first aspect of the invention.

The viscous mass may have an enthalpy in the range of from about 35 to about 250 Joules/gram. Additionally, or alternatively, the viscous mass may have an enthalpy as discussed above with regard to the composition of the first aspect of the invention. In another embodiment the aqueous liquid encapsulated PCM slurry or emulsion with a viscosity of about 200 mPa·s is combined with the cementitious binder and an adsorbent and/or absorbent. When the combined ingredients are subjected to vigorous mixing, a fire resistant viscous mass quickly forms. This viscous mass may be described as a non Newtonian semi-solid that can hold peaks and has the initial consistency of peanut butter or shortening. The viscous mass while in a plastic state prior to setting and hardening is suitable for shaping into products through an extrusion apparatus.

Using this process, the PCM composition can be extruded into extrudites having various shapes including flat layers of various sizes and thicknesses. Such layers can be extruded directly onto flat substrates of various types, where they may adhere to impart PCM properties to the substrate material. Whether producing aggregate or extrudite products, the processes can be operated for continuous production or as batch processes.

Various commercially available PCMs (e.g., such as those described above) may be employed in these embodiments, including hydrocarbon liquids or waxes, natural or synthetic waxes, metal inorganic salts containing waters of hydration, and certain crystalline polymer materials, as described in detail herein. These PCMs are preferably encapsulated in shells of suitable sizes and materials. This implementation of the present invention more generally relates to hydrocarbon waxes. Materials which have been successfully tested include hydrocarbon PCM encapsulated in shells comprising polymers such as acrylics or melamines, some of which are commercially available from Ciba/BASF and other sources as described elsewhere herein. Encapsulated PCM which have average diameters in the range of from about one micron to about 3 mm, can be used with those having diameters in the range of from about one micron to about 100 microns being considered "microencapsulated" PCM.

A wide variety of cementitious binders can be used, including Portland cements, plaster of Paris, silicate cements, and various acid-base cements as described in detail elsewhere herein. Adsorbent and/or absorbent (i.e., sorbent) materials are employed to take up excess water and allow the compositions to achieve the desired moisture content which is effective to produce the desired viscosity and other properties. Various clay minerals can be used, including attapulgite or palygorskite, as discussed above with regard to the first aspect of the invention. The attapulgite or palygorskite is preferably purified to remove grit and non-attapulgite clays, and may have particle sizes such as those described above. The clay particles may be smaller than about 100 mesh. With this invention, combinations of the preferred acid-base cement and purified attapulgite clay have been observed to be effective fire retardants. U.S. Pat. No. 7,247,263 discloses purified attapulgite as major part of a fire-barrier composition.

In addition to the fire retardant qualities produced by combining the above materials to produce PCM aggregates or extrudites or other monolithic forms, the fire resistant qualities of these products may be enhanced by incorporating fire retardants such as magnesium and/or aluminum hydroxides.

The PCM aggregates and extrudites disclosed herein may be employed in a variety of ways, including addition in particulate form to various insulative materials or extruded onto the surface of planar insulating materials. PCM aggregates may be incorporated into various concrete products and used in heat exchanger apparatus by packing into cylindrical columns or suitable arrangement in ducts for heat exchange with flowing gases or liquids.

A third aspect of the invention includes a product comprising a phase change material-containing composition of the first aspect of the invention. Such a composition may be included in number of different products. Products may consist of, or may consist essentially of, only, such as for example in the form of a batch of loose particles of the composition or in shaped structures of the composition (e.g., a shaped monolithic mass). The phase change material-containing composition may comprise a component of a product that includes at least one other component. For example, the composition may be in a particulate form or a monolithic form that makes up a part of a larger product. For example, the composition in a monolithic form may be a layer in a multi-layer structure or a laminated structure. As another example, particles of the composition may contained in a larger structure, such as bound in a matrix or disposed in a particle containment structure.

In one embodiment, products may include only the phase change material-containing composition such as in the form of particulate matter (e.g., or in bulk form). Products may be provided that include shaped or molded objects made substantially only of the PCM composition. Examples include, but are not limited to decorative panels, art, tiles, bricks and other molded, extruded or otherwise shaped forms made from the composition.

In an embodiment, the composition may be part of a sheet board product, such as an interior or exterior wall board product. The composition may be bound in a matrix of a sheet material (e.g., in a gypsum or magnesium oxide board product). Such sheet board products comprising a PCM composition may be designed for use in a wall, roof, ceiling or floor application of a building.

In one embodiment, the composition may comprise an additive to an insulation product. For example, the composition may be intermixed with, and optionally bound with insulation material such as for example batt insulation, blown insulation, foam insulation, or other type of insulation. The composition may be part of a laminate or layered product. By multi-layered structure, it is meant a structure with multiple discrete material layers, which may be bonded to each other as retained in the layered configuration mechanically. By laminate structure, it is meant a multi-layered structure in which the layers are bonded together. For example, the composition may be, or may be contained in, one or more layers of a multi-layered (e.g., laminate) structure. For example, a sheet of the composition, or a sheet containing the composition, may be bound to a foam insulation board. The composition may be, or be a part of, a layer in a structural insulated panel (SIP). As another example, the composition may be a layer disposed between steel panel walls. As another example, the composition may be intimately mixed with insulation material (e.g., blown, batt, or other type of insulation material) rather than being in a separate layer. Additionally, an insulation product including an aerogel may be provided. For example, the composition may be mixed into or provided next to an aerogel (e.g., foamed silica).

In one embodiment, the composition may be part of a thermal exchange product (e.g., heat exchange product). For example, a PCM composition may be thermal storage material or thermal mass in a direct or indirect heat exchanger (e.g., in a thermal solar system), and which may involve a gas (e.g., air) or liquid (e.g., water) as a heat exchange working fluid. The composition may be a part of the composition on floor heating system (e.g., in residential, commercial, industrial or agricultural buildings. The composition may be in a particulate form and may be mixed with other particulate material (e.g., sand). Further still, the PCM composition may be disposed on (e.g., cast onto) a structure (e.g., an aluminum honeycomb, etc.), for example for use as a heat sink (e.g., bonded to the back of photovoltaic modules or other heat generating devices).

In one embodiment, the composition may be part of top coating products. Examples include paint, plaster, mortar and wall and ceiling texture coatings. Such top coating products any include a conventional base composition with added fine particles of the composition, and may be applied in a normal manner.

In one embodiment, the composition may be in a blanket product. For example, a blanket may comprise a flexible containment structure with multiple discrete containment pockets and the composition contained within some or all, and preferably all, of the containment pockets. The blanket may be used at any appropriate location in a building, for example to provide thermal mass at a desired location of the building structure. Such a blanket of the invention may be made to be highly fire-resistant, and may include a flexible containment structure made mostly or substantially entirely of a fire-resistant fabric, such as a fiberglass fabric or a metal wire fabric. The containment pockets may be porous and permeable, permitting air flow that improves heat transfer.

Breaching the containment pocket may not raise a problem with enhanced flammability because of fire resistant attributes of the composition. The composition may be such that the high fire resistance may be retained even when it is broken-up or spills from the containment pocket. The flexible containment structure of such a blanket may comprise two opposing flexible sheets, such as of such fire-resistant fabric, with space between the flexible sheets divided into discrete containment pockets to contain the composition that includes the phase change material. The pockets may be defined by seams to join the flexible sheets between pockets. Alternatively, the pockets may include a wall disposed between and attached to each of the opposing flexible sheets. The blanket may include three or more flexible sheets with containment pockets disposed between different pairs of the sheets to provide multiple layers of containment pockets. The blanket may contain several separate containment pockets (more than 10, 50, 100 or more), which may be sized to facilitate easy storage and handling of the blanket and to provide versatility and flexibility for use of the blanket in different building applications. The blanket may be cut-to-size a particular application or to fit in a particular space. In one implementation, cuts may be made across seams between adjacent containment pockets to prevent spillage of composition. To the extent that a cut is made across a containment pocket, the containment pockets may be made relatively small so that the loss of phase change material from that pocket is not great. A containment volume within each pocket, in which the composition is disposed, may be any convenient size. In one implementation, the containment volume in each of the pockets is smaller than 9 cubic inches (147 cubic centimeters). For example, a pocket volume internal dimensions of 3 inches by 3 inches by 1 inch (7.6 centimeters by 7.6 centimeters by 2.5 centimeters) would have an internal containment volume of approximately 9 cubic inches (147 cubic centimeters). In one implementation, the containment volume may be smaller than 3 cubic inches (49 cubic centimeters). For example, a pocket having internal dimensions of 2 inches by 2 inches by 0.75 inch (5.1 centimeters by 5.1 centimeters by 1.9 centimeters) would have a containment volume of approximately 3 cubic inches (49 cubic centimeters). For many applications, the containment volume of a pocket may be at least as large as 0.25 cubic inches (4 cubic centimeters) or larger. For example, a pocket having internal dimensions of 1 inch by 1 inch by 0.25 inch (2.5 centimeters by 2.5 centimeters by 6.35 centimeters) would have a containment volume of approximately 0.25 cubic inch (4 cubic centimeters). The blanket may be made with any desired dimensions, but typically the blanket will have a small thickness dimension relative to much larger length and width dimensions, typical of a blanket shape. For example, the blanket may have a length dimension of at least 1 foot (30 centimeters), a width dimension of at least 6 inches (15 centimeters) and a thickness dimension of no larger than 1 inch (2.5 centimeters). The blanket may be square, with equal length and width dimension. The blanket may be sized for convenient storage and handling, for example to avoid excessive weight for easy handling. The blanket may be sized to have a length dimension that is smaller than 3 feet (91 centimeters), a width dimension that is smaller than 3 feet (91 centimeters) and a thickness dimension that is smaller than 1 inch. In some applications it may be desirable to have a thickness dimension that is not larger than 0.5 inch (1.27 centimeters), or even not larger than 0.25 inch (0.635 centimeters). For many applications, the blanket may have a thickness dimension of one-eighth inch (0.3 centimeter) or larger. For enhanced handling and storage, the blanket may be rollable into a roll, and which may be unrolled prior to installation. For example, the blanket may be rollable along one or both of the length dimension and the width dimension into a roll. The composition disposed in the containment pockets may be in the form of loose particles of the composition. The particles of the composition may be sized at any appropriate size, and with any size distribution desired for efficient packing of the particles within the containment volumes of the containment pockets. The particles of the composition may be of a size and size distribution as discussed above when discussing the composition with the first aspect of the invention. The composition disposed in a containment pockets may be in the form of a single monolithic mass of the composition (e.g., an extruded mass), preferably sized to occupy most or substantially all of the available containment volume in the pocket. If the blanket is designed to be rollable into a roll, such monolithic masses may be shaped and/or spaced in a manner to facilitate rolling of the blanket into a roll. The monolithic masses may have beveled sides that come closer together during rolling and/or the monolithic masses may be spaced so that facing surfaces of adjacent monolithic masses do not interfere with each other when the blanket is rolled into a roll. One advantage of the blanket of the invention is that a high loading of flammable phase change material (e.g., waxes, hydrocarbons) may be achieved along with a high fire resistance of the composition and of the blanket. This permits the blanket to have a high enthalpy for heat storage due to the latent heat of phase change of the phase change material. The blanket may have an enthalpy of at least 50, at least 60, at least 70, at least 80, at least 90 or even at least 100 or more joules per gram of the blanket or per gram of the composition. By "enthalpy" it is meant, as applied to the composition or the blanket, the heat storage capacity per unit weight of the composition or the blanket, as the case may be, due to the latent heat of phase change for the phase change material contained within such composition or blanket.

A fourth aspect of the invention includes uses of the phase change material-containing composition of the first aspect of the invention as well as products and structures including the phase change material-containing composition. Such products and structures may for example be according to the third aspect of the invention.

In some embodiments, the composition may be used to manufacture a product structure including the compositions. The product may be consist of, or essentially of, only the compositions formed into the product, or the product or structure may include the composition in combination with at least one component in addition to the composition. For example, any such product may be a particular form of the composition described with the first aspect of the invention or may be any of the products described for the third aspect of the invention. As another example, the structure may be any structure described for the third aspect of the invention. In one embodiment, the composition may be used in the manufacture of a building product, for example designed for use in a foundation structure, a floor structure, wall structure, roof structure or ceiling structure of a building. The building may be, for example, a residential, commercial, industrial, institutional or agricultural building. Furthermore, the composition may be used in a temporary structure (e.g., a temporary building structure, tent, or the like).

In other embodiments, the composition, or any product or structure including the composition, may be used as part of a building. The building may be, for example, a residential, commercial, industrial, institutional or agricultural building. In one embodiment, the composition may be used (by itself or as part of a larger product or structure) as thermal mass in a building. In another embodiment, the composition, or a product or structure including the composition, may be used as part of any of a floor structure, wall structure or ceiling structure of a building. One embodiment involves use of the composition as thermal storage material in a heat exchange product.

In other embodiments, the composition may be used as a thermal storage medium. The thermal storage medium may be part of a thermal exchange product or system, for example thermal exchange products or systems described with the third aspect of the invention.

Still other aspects of this invention will appear from the following description and appended claims, reference being made to the accompanying drawings forming a part of this specification wherein like reference characters designate corresponding parts in the several views.

BRIEF DESCRIPTION OF THE DRAWINGS

These and other attributes of the invention will become more clear upon a thorough study of the following description of the best mode for carrying out the invention, particularly when reviewed in conjunction with drawings, wherein:

FIG. 7a is a sectional view of a PCM Blanket with a PCM aggregate forming the middle layer. The top ply is attached by seam to the bottom ply enclosing the middle layer of PCM Mix formed into aggregate within a pattern of pouches or slats or enclosed patterns.

FIG. 7b is a sectional view of the PCM Blanket with a PCM mass extruded forming the middle layer. The top ply is attached to the bottom ply enclosing the middle layer of PCM Mix extruded within a pattern of pouches or slats or enclosed patterns.

Figure 1:
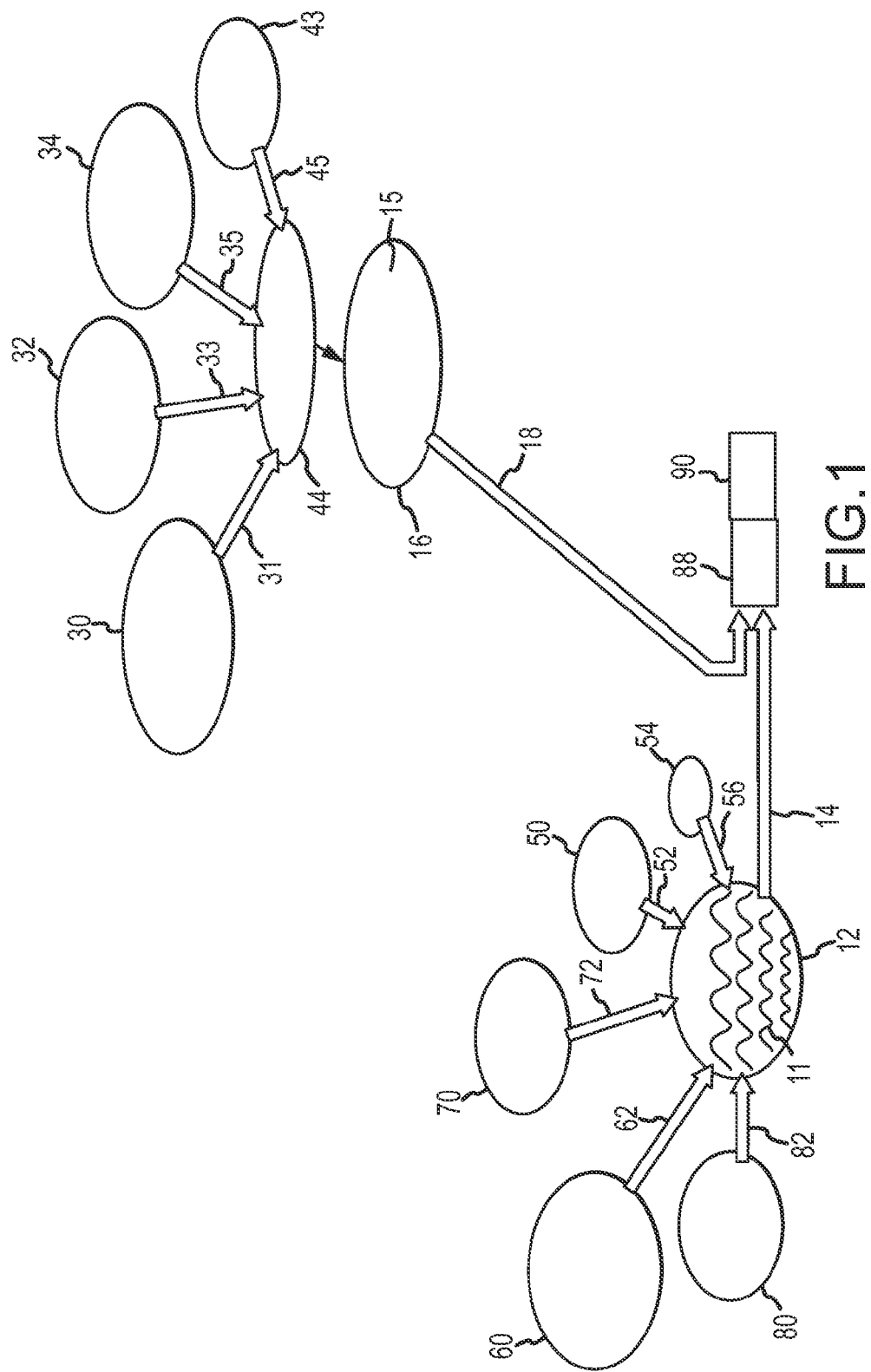
FIG. 1 is a flow diagram of a process for production of a fire resistant PCM viscous mass which can be fashioned into numerous forms such as an aggregate, multiple extruded shapes, or self bonded directly to material such as insulation foam board.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

As can be seen by reference to the drawings, and the following Examples, the method that forms the basis of an embodiment of the present invention is generally illustrated in the flow diagram of FIG. 1, which is discussed below along with the other figures. In the following description and the examples, all percentages are by weight unless otherwise indicated. The term "A and/or B" is used in the conventional sense, meaning that A, B or A+B may be present.

DEFINITIONS

In addition to terms defined elsewhere herein, the following terms have the meanings as provided below for purposes herein.

Acid-Base Cement—A class of cements formed by reaction of an acid with a base at room temperature which exhibit properties like those of ceramics. Identified as Chemically Bonded Cements (CBC).

Chemically bonded phosphate ceramics (CBPCs)—a subclass of CBCs generally formed by the reaction of metal oxides such as those of magnesium or zinc, with either phosphoric acid or an acid phosphate such as ammonium phosphate solution.

Absorption: the penetration of one substance into the inner structure of another, as with cotton or sawdust absorbing a liquid.

Adsorption: the adherence of the atoms, ions or molecules of a gas or liquid to the surface of another substance (the adsorbent). Finely divided or microporous materials presenting a large area of active surface are strong adsorbents.

Both absorbents and adsorbents can be useful in preparing compositions of the present invention, and some materials, e.g. clay minerals containing mixtures of clay types, can perform both functions. The term sorbent refers to absorbents, adsorbents, or any combination thereof without limitation.

Agglomeration: a size enlargement process by which smaller particles are made into larger particles by briquetting, pelletizing, extruding, agglomerating, or other size enlargement methods. Some agglomerators are disclosed in U.S. Pat. Nos. 4,599,321; 7,632,006 and 4,504,306, all of which are incorporated herein by reference.

Commercially available agglomerators include the O'Brien Agglomerator, available from Engineering and Design Associates, Inc. of Folsom, Calif. Both agglomerators and pelletizers are offered by Mars Mineral of Mars, Pa.

Aggregates: materials in particulate form of various shapes, sizes and compositions capable of being bound together with other such materials by cement. In the construction and other industries, aggregates are generally divided into fine (e.g., sand) and coarse (e.g., gravel) categories based on particle size.

Manufactured aggregates: material produced by mixing, agglomeration and curing with properties that meet with specifications of the concrete or other composition in which it will be incorporated.

Aqueous liquid: any water-based liquid, including slurries, suspensions, solutions and emulsions.

Clays or clay minerals: a family of materials classified as hydrous aluminum phyllosilicates, sometimes containing variable amounts of iron, magnesium, alkali metals, alkaline earth metals and other cations. Clays have structures similar to the micas, forming flat hexagonal sheets. Clays are generally ultra fine grained, and are commonly referred to as 1:1 or 2:1 types. Clays are essentially built of tetrahedral and octahedral sheets. The tetrahedral sheets share corners of silicate (SiO4) and aluminate (AlO4) groups, and thus have the overall chemical composition (Al,Si)3O4. These tetrahedral sheets are bonded to octahedral sheets formed from small cations, such as aluminum or magnesium, coordinated by six oxygen atoms. A 1:1 clay would contain one tetrahedral sheet and one octahedral sheet; examples are kaolinite and serpentine. A 2:1 clay contains an octahedral sheet sandwiched between two tetrahedral sheets, examples being illite, smectite, attapulgite and chlorite. Clay minerals can be divided into the following groups:

Kaolin group: kaolinite, dickite, hallowsite and nacrite, sometimes including the serpentine group;

Smectite group: dioctahedral smectites such as montmorillonite and nontronite and trioctahedral smectites such as saponite;

Illite group, including the clay-micas;

Chlorite group: materials similar to chlorite, with chemical variations;

Other 2:1 clays with long water channels internal to their structure such as sepiolite, attapulgite and palygorskite.

Desiccant: hygroscopic substances such as activated alumina, calcium chloride, silica gel or zinc chloride which absorb water vapor from the air; such functions can also be performed by molecular sieves.

Mixing: a process step to blend feed stocks to form a feed mix prior to agglomeration. Ideally, mixing causes particles of the feedstocks to come into close proximity to one another and particles of the feedstocks become uniformly distributed throughout the feed mix.

Extrusion: a process of forming a plastic material or viscous mass by forcing it under pressure through an extrusion head or other forming apparatus.

Extrudite: a formed material produced by extrusion.

Feedstocks: materials that are blended together by mixing. In embodiments of this invention, the term includes (a) PCM particles; (b) any other materials that are not PCM particles, but were part of the PCM manufacturing process (e.g., the fluid portion of a slurry or emulsion, the acrylic or melamine/formaldehyde polymers comprising the capsule of PCM, and other matter left over from production processes contained in the slurry or emulsion, etc.), and (c) the cement binder, adsorbent or absorbent materials (e.g., a sorbent), and combinations thereof, as well as any other material added to solidify and improve the qualities of the feed mix and the aggregate or extrudite that will be made from the feed mix.

Feed Mix: mixture of PCM and other feedstocks, (and water or surfactants where required) prior to agglomerating or other processing.

Cement: any combination of inorganic materials that can act as a bonding agent to bind other materials together into a hardened mass (e.g. Portland Cement, plaster of Paris, silicate cements, magnesium phosphate cements, magnesium oxychloride cements, magnesium oxysulfate cements, etc.). Also, a cured composition comprising such cement(s).

Cementitious: a term descriptive of anything made up of materials bound together in a hardened mass of cement. Also a cementitious binder used to bind materials together.

Concrete: a mixture of aggregates and cement plus sufficient liquid, which can cure and harden into a finished solid form.

End Product: whatever is to be manufactured. In this case, where building materials are the end product, the term includes, but is not limited to, bricks, blocks, boards, wall tiles, paving, ceiling materials (ceiling tiles, etc.), flooring (floor tiles, underlayment, etc.), concrete articles, mortars, renders, plasters, cements, room furnishings, heating and cooling ductwork, and insulation products.

Fibrous reinforcements: Any form of short, fine fibers which can be admixed with the viscous mass containing encapsulated PCM which is used to produce various embodiments of PCM aggregates and extrudites. The fibers can be made from inorganic materials such as metals or glass, carbon or ceramics, and various organic polymer materials such as polypropylene. Suitable polypropylene fibers are produced by PROPEX Concrete systems as FIBERMESH® 150. Such fibers can be chopped or milled.

Fire Resistant/Fire Retardant: "fire resistant" and "fire retardant" are sometimes used interchangeably but imply a subtle difference in fire properties. In this invention, we define fire or flame retardant to mean a material that resists burning or burns slowly and fire resistant to mean a material that resists burning to the extent it can act as a fire barrier. Varying degrees of fire resistance are defined in safety codes and are capable of objective measurement (e.g., Euroclass fire code ratings).

Magnesium oxide, MgO, magnesia: available in several different forms, ranging from a lighter material prepared in a relatively low calcination temperature dehydration of the hydroxide to a more dense material made by higher temperature furnacing or calcination of the oxide after it has been formed from the carbonate or hydroxide. Thermal alteration affects the reactivity of MgO, since less surface area and pores are available for reaction with other compounds. Industrial versions include light burned and hard burned or dead burned MgO. High purity MgO may be rehydrated to form a slurry of magnesium hydroxide.

PCM: phase change material(s) are heat storage materials that act as thermal mass. The principle behind PCM is that the materials' latent heat of fusion is substantially greater than its sensible heat storing capacity (i.e., the amount of heat that the material absorbs when melting, or releases when freezing or hardening, is much greater than the amount of heat that the material absorbs or releases by cooling or heating when undergoing the same amount of temperature change in ranges below and above the phase change temperature.) As used herein for certain embodiments, PCM refers to the wax or other hydrocarbon that comprises such material in a particulate form, by which is meant encapsulated and provided in bulk in a powder, slurry, cake, or emulsion.

Some suitable paraffinic hydrocarbon phase change materials are shown below in Table 1, which indicates the number of carbon atoms contained in such materials, which is directly related to the melting point of such materials.

TABLE 1

| COMPOUND NAME | NUMBER OF CARBON ATOMS | MELTING POINT CENTIGRADE |
|---|---|---|
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |

TABLE 1-continued

| COMPOUND NAME | NUMBER OF CARBON ATOMS | MELTING POINT CENTIGRADE |
|---|---|---|
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

In addition to the paraffinic hydrocarbons described above, plastic (polymeric) crystals such as DMP (2,2-dimethyl-1,3-propanediol) and HMP (2-hydroxymethyl-2-methyl-1,3-propanediol) and the like may be used as temperature stabilizing materials. When plastic crystals absorb thermal energy, the molecular structure is temporarily modified without changing the phase of the material. Plastic crystals may be employed alone or in combination with other temperature stabilizing materials in any of the configurations described herein.

Hydrated salts: Metal inorganic salts with waters of hydration, such as Glauber's salt (sodium sulfate decahydrate), calcium chloride hexahydrate and sodium carbonate are also useful as PCMs.

Waxes: Numerous petroleum-based, natural and synthetic waxes can be used in PCMs, the selections based mainly upon cost, availability and thermal properties. In addition to hydrocarbons such as described above, some waxes are esters of fatty acids and alcohols. Natural waxes include those derived from animals (e.g., beeswax, lanolin, shellac wax and Chinese insect wax), vegetables (carnauba, candelilla, bayberry and sugar cane) and minerals (e.g., ozocerite, ceresin and montan). Synthetic waxes include ethylenic polymers and polyol ether-esters such as Carbowax® and sorbitol, chlorinated naphthalenes, sold as Halowax®, hydrocarbon-type waxes produced via Fischer-Tropsch synthesis and polymethylene waxes. The paraffins or aliphatic hydrocarbons described above can also be chlorinated to alter their properties.

Encapsulated PCM: encapsulated phase change material. PCM is encapsulated so it will remain in place while in its liquid phase. Encapsulation typically takes place in a process wherein PCM, in liquid phase, is contained within a temperature controlled fluid medium that also contains a material that will form the "shell" or "capsule" for the PCM, as well as other materials required for the production process. A physical and/or chemical action takes place within the fluid medium which causes microscopic particles of liquid PCM to be formed within a thin layer of shell material. The shell material, which has a higher phase change temperature, hardens around the tiny particles of liquid PCM, and as the medium cools further, the encased PCM particles also become solid. After the process, the particles are generally referred to as encapsulated PCM. These are contained in a slurry or suspension (i.e., the fluids used in the manufacturing process and the PCM particles) that generally contains from 35% to 65% PCM solids.

Plasticizer, superplasticizer: compounds used in cement, concrete and the like to reduce free water and make the mixtures more fluid to increase their workability. Compounds used for various applications include synthetic sulfonates and polycarboxylates, sulfonated naphthalenes, melamine polysulfonates and 2-Acrylamido-2-methylpropane sulfonic acid.

Residence time: The amount of time a particle or specific volume of liquid dwells within a continuous mixing or agglomerating machine. The time lapse between specific particle or liquid inflow and outflow. Residence time in embodiments of this invention is controlled by the rate of inflow of dry feeds and liquid feeds.

Commercially available dry mPCM when incorporated in cementitious building materials has many drawbacks. The microscopic particle size increases water demand beyond typical water/cement ratios and special precautions must be taken to avoid inhaling the particles. U.S. Pat. No. 6,099,894 mentions these precautions. Acrylics and other chemical residues retard set times. Scanning Electron Micrographs show that encapsulated PCM interferes with crystalline and amorphous structure formation in Portland cement, gypsum plasters and acid/base cements. The acrylic shell material has poor bonding qualities when incorporated in typical cements used in building products. European Published Patent Application No. EP0344013 discloses that the PCM particles reduce concrete strength and interfere with crosslinking. Encapsulated PCM can be added, for example, directly into a cement mix or to other ingredients in a process for manufacturing other cementitious materials. U.S. Pat. No. 5,804,297, for example, discloses a method for incorporating dry microencapsulated PCM into a coating which is said to provide thermal insulation and latent heat storage characteristics to the underlying material. Similarly, U.S. Pat. No. 7,166,355 discloses a method for incorporating dry microencapsulated PCM into a wet plaster mix used in making wallboard. In each of these cases, dry microencapsulated PCM is directly incorporated into the end product, with no effective fire resistance being imparted to the PCM material. In each case, the end product would be a greater fire hazard with the PCM, which is highly flammable, than without it.

Neither of these methods addresses the health hazards associated with the handling of dry encapsulated PCM. Neither deals with the flammability characteristics of PCM, nor is the use of encapsulated PCM in the form of slurry or cake, or is a non-microencapsulated form even suggested.

By incorporating PCM into an aggregate, fire resistant qualities may be introduced by selection of the feedstock materials that are mixed with the PCM in the process of preparing the PCM aggregate or extrudite.

Depending on which cement system (hydraulic, silicate, or acid-base) is used, the encapsulated PCM particles will be contained within matrices of the three dimensional amorphous agglomeration formed by the cement and other materials comprising the hardened mix. The cross linking is not that of the encapsulated PCM particles; rather, it is the cement hardening into a three dimensional agglomeration. The aggregate particles can be made to be quite small, but even then will be far larger than the encapsulated PCM particles contained within them. The cement in the aggregate will further protect the PCM contained within the acrylic capsules. It will also present an ideal and easily handled material that will form a strong bond with any cementitious end product.

The present invention provides a cementitious composition using specially selected materials that will bind with the fluid media of the slurry or cake and enrobe the encapsulated PCM solids within the cementitious viscous mass formed thereby. The cementitious materials are selected based on the qualities which are desired in the aggregate or extrudite being made for the end user. The aggregate mix design is optimized to achieve the desired result when used in conjunction with these other cements or products of the end user.

The aggregate is an agglomeration that can be made in any size (e.g., from fine sand or finer to coarse gravel) depending on the needs of the final product. ASTM C 125-07 fineness modulus principles are used to size phase change aggregate screen sizes to minimize cement binder and maximize phase change aggregate to achieve maximum enthalpy in the final product.

Many substances, either by themselves or in combination, are capable of absorbing or adsorbing or becoming hydrated by the fluids of a encapsulated PCM slurry.

The process of combining or blending the slurry with such substances results in the production of an array of solid materials that can be made into aggregates for use in a variety of applications. These substances include, for example, powders with pozzolanic qualities, inorganic salts, fly ash, hydrous silicates, super kaolins, Portland Cement, magnesia cements, metal oxide cements, phosphate cements, silicates, and a variety of other acid-base cements.

In the mixing process the encapsulated PCM solids contained in the slurry are further incorporated within the aggregate or extrudite. The result of the process is that aggregates or extrudite made with encapsulated PCM slurry will be inert for purposes of mixing with other materials, but will be far easier and safer to handle and will have fire resistant qualities that are lacking in most dry encapsulated PCM.

Through selection of the amounts and types of substances used in these processes, the encapsulated PCM aggregate can be tailored for qualities such as hardness, ability to bond with other materials, and the amounts and multiple types of encapsulated PCM contained in it.

Further, if in an aggregate form, the PCM viscous mass can be processed so that size and particle distribution of the aggregate may be optimized for a particular application or for more generally applicability.

U.S. Pat. No. 4,747,240 speaks to the utility of using encapsulated PCM in an aggregate in the manufacture of interior building materials. The encapsulated PCM employed in that invention was encapsulated PCM in its dry form. The difficulties encountered when using encapsulated PCM in slurry form were not addressed, and no disclosure was made therein relating to the manufacture or use of encapsulated PCM aggregate from slurry or cake. Likewise, no disclosure was made for making or using an aggregate of such composition that has fire resistant qualities, and of a size that avoids the need for hazard precautions.

Therefore, it is also an aspect of this invention to incorporate dry encapsulated PCM with water and a combination of the substances described above, in connection with PCM slurry, to make an aggregate with fire resistant qualities, and without hazards associated with the handling of the material.

It is an aspect of the present invention to combine encapsulated PCM in the form of slurry or cake with other materials that can be hydrated or that can absorb or adsorb the water and other fluids contained therein. A partial listing of these materials is shown above. This will result in significant savings to encapsulated PCM manufacturers who would otherwise be compelled to remove the fluids from the slurry or cake by spray drying or by other costly means. It will also result in further enrobing of the encapsulated PCM solids within the materials formed in the process. In the process, the slurry or cake PCM becomes an integral part of a dry, solid aggregate with fire resistant qualities that may safely be handled without special hazard precautions or training required of the user.

The resulting aggregate can be incorporated directly into a wide variety of cementitious materials of the end user and other end products.

It is a further aspect of this invention to tailor the dry solids resulting from the above described processes in terms of size, particle size distribution, compatibility with other materials, fire resistance, percentage of encapsulated PCM solids contained therein, suitability for any particular kind of cement system that may be employed therewith (e.g., Portland based, MagPhosphate based, MagOxychloride based) or to any particular application wherein phase change qualities are imparted to a cementitious product by use of the aggregate.

The essence of certain embodiments of the invention is that PCM can be incorporated within an aggregate or extrudite which is then easily handled and which can then be incorporated into many final products without any radical modifications of existing production procedures.

The aggregates produced by this invention can easily incorporate PCM into a wide range of building materials. It is therefore also an aspect of this invention that building materials, such as wall board, plaster, render, tiles, ceiling panels, floors, and floor underlayment, and any other building materials manufactured by any cementitious process be capable of adding phase change qualities by simply including the aggregate with the other feedstocks in the production processes used to produce those products. Alternatively, the PCM-containing composition in monolithic mass form may be otherwise incorporated into end products or the like either during or after the manufacturing process for the end products.

In embodiments of the present invention, the drying process for separating the encapsulated PCM form the encapsulation slurry is replaced by mixing feedstocks in a process wherein the slurry itself is used to make an aggregate with fire resistant qualities that can then be directly incorporated, as an aggregate, into the concrete mix of a wide variety of cementitious end products or as an extrudite in a variety of end products.

The present invention provides for the incorporation of encapsulated PCM particles, in the form of dry powder, wet or damp cake, or contained within an emulsion, into an aggregate in order to impart fire resistant qualities to the PCM.

The use of aggregate as the means by which PCM is incorporated into cementitious end products has many advantages. As noted, the cost of drying the mPCM slurry can be saved. Fire resistant qualities can be imparted to the PCM particles. Particles of PCM aggregate are easier and safer to handle than PCM powder. PCM aggregate can be custom manufactured so that it may be incorporated into building materials with little or no alteration required of the manufacturing processes of those building materials.

An embodiment of the present invention also relates to the manufacture of PCM aggregates through a process of mixing the PCM particles with other materials, agglomerating the resulting mixture into larger, agglomerated particles, curing the agglomerated particles, and classifying them for incorporation into the concrete mix of cementitious end products.

The prior art known to applicants does not teach a process that provides the economic benefits and convenience provided by this invention, which includes an innovative step where PCM particles, and in particular, the encapsulated PCM slurries, are made part of a manufactured aggregate according to specifications required by the end product, including those pertaining to fire resistance.

Unlike the present invention, U.S. Pat. No. 4,747,240 does not contemplate the manufacture of an aggregate from PCM, the manufacture of an extrudite from PCM, the use of encapsulated PCM liquid emulsions in a system that bypasses the spray drying process to make an aggregate, nor does it seek to mitigate the high degree of flammability that is characteristic of PCM.

The drawing, like reference numerates refer to like features.

Turning now to the drawings, FIG. 1 presents a process for the production of a fire resistant PCM viscous mass 90 which can be fashioned into numerous forms such as an aggregate, multiple extruded shapes, or self bonded directly to material such as insulation foam board. The flexibility in forms of output using the novel formulation of this invention is complemented by the range of options for most ingredients or feedstocks. The foundation of this novel formulation is an encapsulated PCM which can be any form of encapsulated PCMs. Currently encapsulated PCMs are available in a wet PCM 60 form such as BASF/Ciba's PC200®, or a dry PCM 70, which is a wet PCM 60 dried in an expensive drying process or a cake PCM 80 such as offered by Microtek Laboratories which generally have about a 30% moisture content. Wet PCM 60 generally has a moisture content of between 40% and 60%. BASF/Ciba's PC200® generally has a moisture content of approximately 51%. Dry PCM 70 generally has a moisture content of 5% or less and is produced from a wet PCM 60 which has been dried in an expensive step that is generally an unnecessary step for use in this invention. Cake PCM 80, currently manufactured by Microtek Laboratories, has gone through an extra step in the production process to remove most residual liquid remaining from the encapsulation process.

Besides the three forms of encapsulated PCMs noted above, encapsulated PCMs are available in a wide range of shell sizes from <51 to about ¼ inch, and a wide range of targeted melting temperatures, generally ranging from −57° C. to 52° C. (−76° F. to 125° F.). The process for production of the materials disclosed herein accommodates all of these variations in forms of PCMs and moisture content without compromising optimum performance in an end use product. For a specific batch of PCM viscous mass 90 either one or a combination of encapsulated PCMs 60, 70, and 80 are metered and pumped 62 or 72 or 82 into tank 12. In tank 12 water 50 is added 52 as necessary to achieve the desired moisture content of the resulting PCM aqueous suspension 11. The PCM aqueous suspension 11 in tank 12 may need a surfactant 54 metered and piped 56 into the mix in order to aid in the blending of dry PCM 70 or cake PCM 80. The PCM aqueous suspension 11 is then metered and pumped 14 into a mixer 88 where it is aggressively mixed with the already blended dry feedstock 15.

The dry feedstock 15 comprises a cementitious binder 30 and an adsorbent and/or absorbent (e.g., a sorbent) such as a clay mineral 32. Other optional feedstocks 34 may include fire retardants or fillers, and in some cases to achieve greater flexibility and strength of an embodiment, fibrous reinforcing materials such as chopped or milled fibers 43 may be added to the dry mix. The desired amounts of dry feedstocks 15, which may or may not include material from feedstocks 34 and 43, are metered and augered 31, 33, 35 and 45 to a ribbon blender 44 for blending. Blended dry feedstock 15 is augered to a dry storage bin 16.

The cementitious binder 30 may be a hydraulic cement, a silicate cement, or an acid-base cement, i.e., any combination of inorganic materials capable of acting as a bonding agent to bind other materials together into a hardened mass (e.g. Portland Cements, plaster of Paris, silicate cements, magnesium phosphate cements, magnesium oxychloride cements, magnesium oxysulfate cements, etc.). A preferred cementitious binder 30 for the PCM viscous mass 90 or embodiments of this PCM viscous mass 90, presented in FIG. 2 and FIG. 3 as a PCM aggregate 25 or in FIG. 4 as a PCM extruded viscous mass 41, is an acid-base cement such as a magnesium phosphate cement. A particular type of acid-base cement is a combination of magnesium oxide and monopotassium phosphate, referred to by Wagh as magnesium potassium phosphate ceramic. Monopotassium phosphate, also known as potassium acid phosphate (MKP), has the formula $KH_2PO_4$.

Acid-base cements are defined on page 3 of Wagh's book, cited below, and discussed in Chapter 1. In an acid-base cement, the PCM particles will be contained within matrices of the three dimensional amorphous clusters formed by the cement and other materials forming the PCM viscous mass 90. The particle clusters can be made to be quite small, but even then will be far larger than the PCM particles contained within the PCM aqueous suspension 11. The cement in the clusters will further protect the PCM contained within its shell, thus significantly protecting the shell, which previous methods could only accomplish by varying the composition of the shell material. Some shell materials impact the efficiency of the PCM within the shell. The PCM aggregates disclosed herein also provide an ideal and easily handled material.

A preferred combination of ingredients for PCM viscous mass 90 and most embodiments comprises a preferred cementitious binder 30 of about 3 parts dead burnt magnesium oxide and 6 parts monopotassium phosphate, 20 parts palygorskite or modified attapulgite clays 32 and about 72 parts encapsulated PCM aqueous suspension 11. The composition of the PCM aqueous suspension 11 for the wet PCM 60 is generally between 40% and 60% encapsulated PCM and 40% and 60% residual liquid.

Companies involved in the industrial extraction and processing of gellant grade attapulgite clay include Active Minerals International LLC and BASF Corporation. Active Minerals produces a patented, purified form of attapulgite known as Actigel® 208 in which the clay has been chemically and mechanically exfoliated into discrete pseudo nanoparticles of attapulgite which are about 2 microns in length and 30 Angstroms in diameter. Most non-attapulgite particles are removed, leaving a purified form of attapulgite.

Based on research conducted at the Argonne National Laboratory as noted in Wagh's book CHEMICALLY BONDED PHOSPHATE CERAMICS (ELSEVIER 2004) at pages 239-241, acid-base cements such as the cementitious binder 30 above can convert flammable materials into fire resistant forms, substantially eliminating the risk of flammability associated with existing preparations. The novel formulations disclosed herein convert highly flammable hydrocarbon PCMs into a fire resistant PCM viscous mass 90. The nonflammable properties of the PCM viscous mass 90 are enhanced by the addition of the attapulgite clays.

Figure 3:
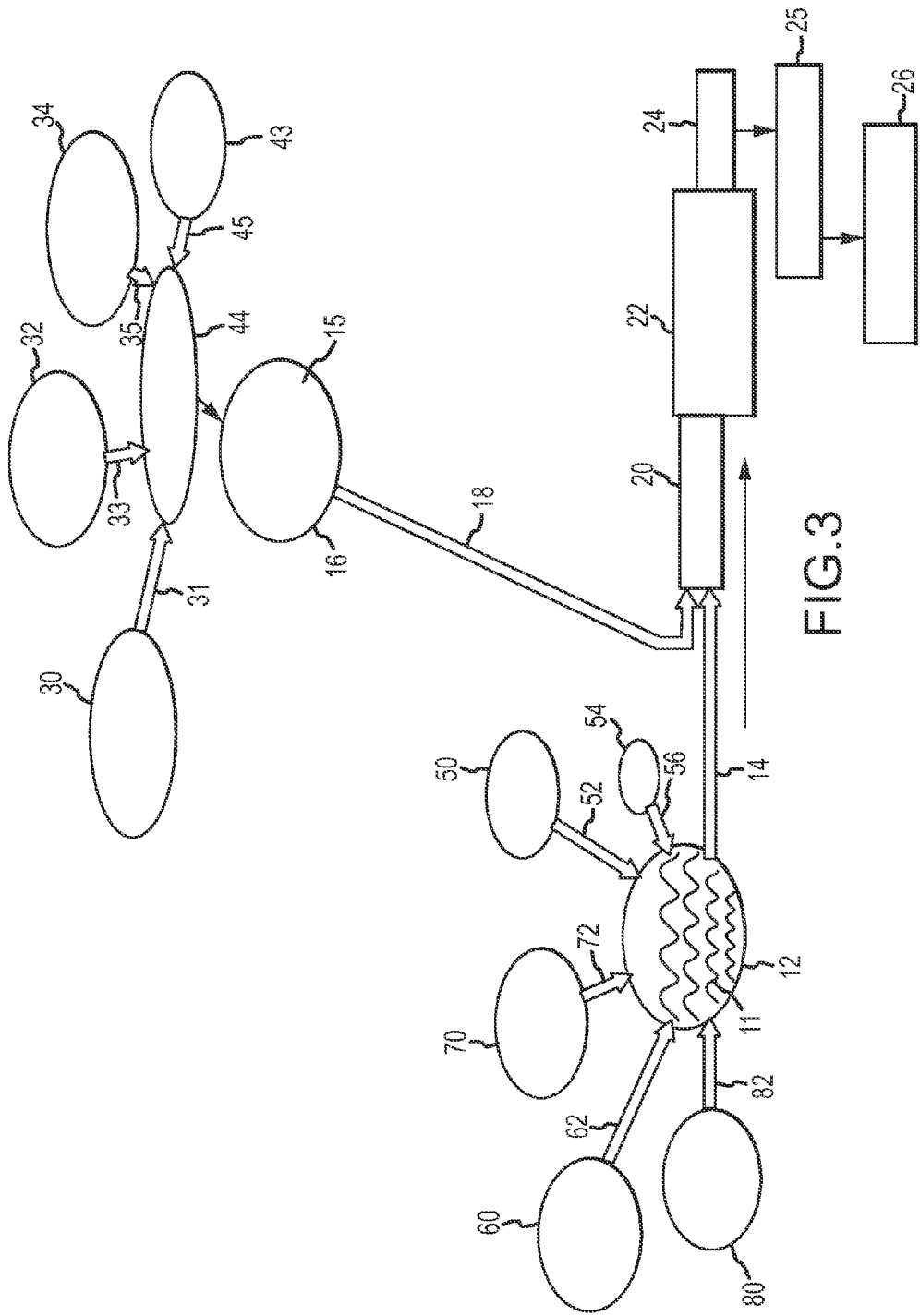
FIG. 3 is a flow chart of a process for production of a PCM aggregate.

An advantage of using a preferred acid-base cement as the cementitious binder 30 is the elimination of any problems with containment of the PCM. The cementitious mixture encases or enrobes the PCM in a non-leaching material, even when a cured embodiment of the PCM viscous mass 90, such as a PCM aggregate 25 of FIG. 3, is ground into very fine particle sizes.

The preferred cementitious binder 30 also presents an ideal and easily handled aggregate material. The preferred novel formulations in aggregate form presents a safe and easily handled fire resistant PCM aggregate for use in various end products. U.S. Pat. No. 7,166,355, issued Jan. 23, 2007 for Use of Microcapsules in Gypsum Plaster board to Jahns et al. discusses a process wherein microencapsulated PCM is incorporated directly into cementitious building materials, i.e., wallboard core and plasterboard. In this patent, special steps must be taken to insure the bonding of all components because of the poor bonding nature of the microencapsulated PCM particles. Also, additional processing of such materials may be required for fire protection (e.g., adding a coating of gypsum slurry or a fiber glass cloth coating). Commercially available dry PCM 70, when incorporated in cementitious building materials, has many drawbacks. The microscopic particle size increases water demand beyond typical water/cement ratios and special precautions must be taken to avoid inhaling the particles. U.S. Pat. No. 6,099,894 mentions these precautions and addresses special precautions take to avoid inhaling respirable sub 10 micron PCM particles. The novel formulations of fire resistant PCM aggregates 25 disclosed herein preferably have a non respirable minimum size of 20 microns.

Cement binders may hydrate from 5% to 70% of their weight of water. Clay minerals 32 may adsorb or absorb from about one to four times their weight of water or aqueous solution. When an aqueous suspension of encapsulated PCM with a viscosity of 200 mPa·s is combined with cement binder 30, clay minerals 32 and optional feedstocks 34 and 43 are subjected to vigorous mixing 38, the combined ingredients of this novel formulation begin physical and chemical reactions which cause them to coalesce very quickly into a PCM viscous mass 90. At this point in the chemical curing process, viscous mass 90 may be described as a non Newtonian semi solid that can hold peaks and has the consistency of peanut butter or shortening. The viscous mass 90 while in this plastic state in the curing cycle moves through an extruder 40 which shapes the PCM viscous mass 90 into extruded form 41 prior to setting and hardening on the final PCM product 42. The objective is to combine and mix the materials, including sufficient moisture to provide a viscous mass with sufficient plasticity to permit it to be processed in an extrusion process.

Figure 2:
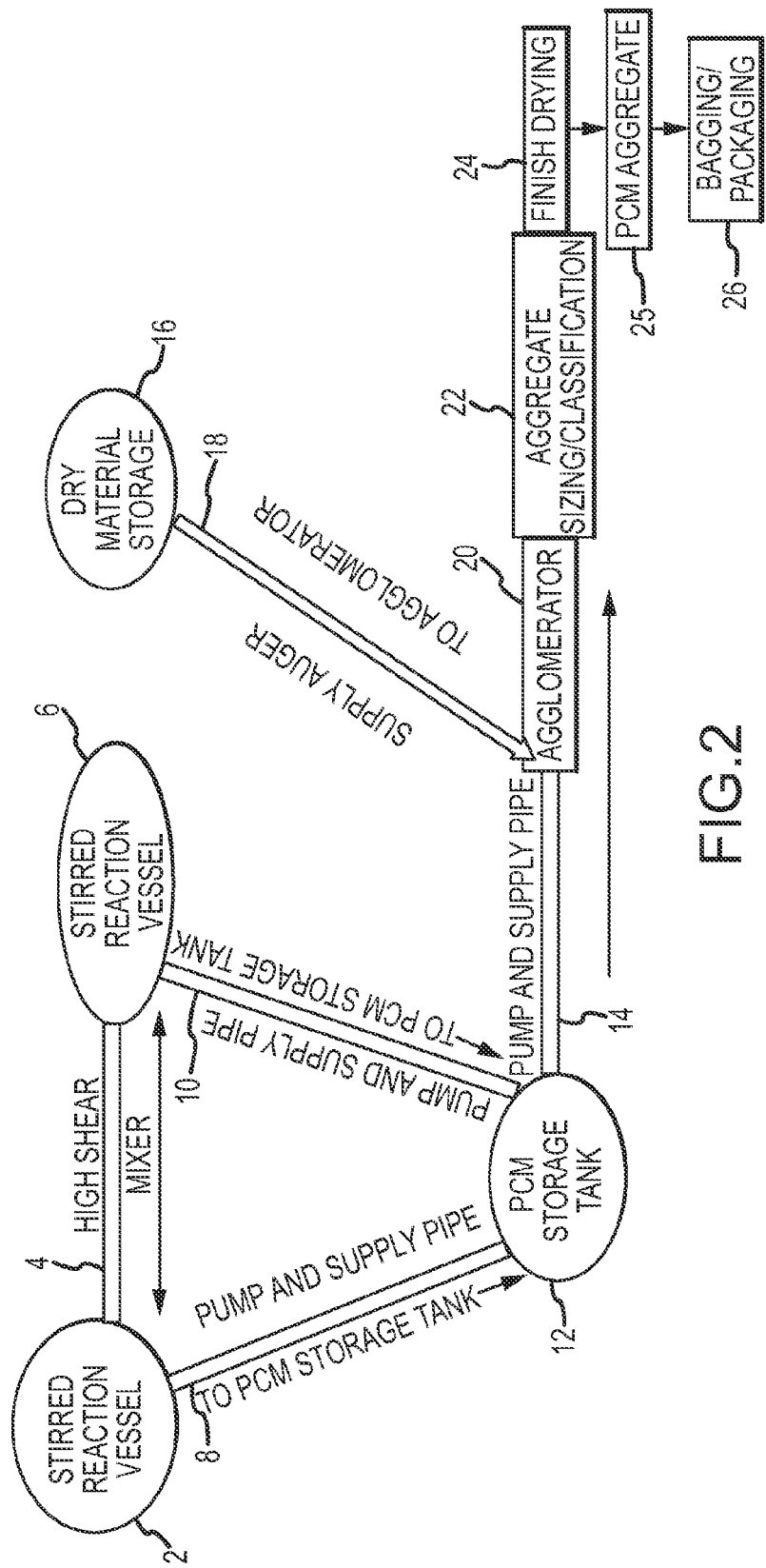
FIG. 2 is a flow diagram of a process for manufacturing PCM aggregate material which is integrated into a production process for encapsulated PCM.

FIG. 2 illustrates a process for manufacturing PCM aggregate 25 (in FIG. 3) integrated with the manufacture of encapsulated PCM using processes such as that of BASF/Ciba: "Particulate Compositions and Their Manufacture," disclosed in U.S. Published Patent App. 2007/0224899. Generally, in BASF/Ciba's process, a PCM aqueous suspension 11 is formed containing a PCM in liquid or solid form, capsule material, nucleating agents, wetting agents, and surfactants. These ingredients are mixed in stirred reaction vessels 2 and 6 connected by a high shear mixer 4. The high shear mixer 4 causes the blended or mixed ingredients to flow between stirred reaction vessels 2 and 6 to optimize the aqueous suspension of the encapsulated material. The PCM emulsion is pumped back and forth between vessels 2 and 6 until the desired PCM capsule size is achieved (generally from 1 to 10 microns), encapsulating the PCM in a bubble-like polymer shell and forming an PCM aqueous suspension 11 (FIG. 1) containing approximately 35% to 60% encapsulated PCM suspended in a residual liquid which contains water, non-encapsulated PCM and other ingredients not fully utilized in the encapsulation process. The PCM aqueous suspension 11 (FIG. 1) formed by BASF/Ciba's encapsulation process is pumped into the PCM storage tank 12. In the BASF/Ciba process to produce encapsulated PCM, the residual liquid in the suspension is approximately 55% of the total weight and the PCM capsules are the remaining approximately 45%. The PCM aqueous suspension 11 (FIG. 1) in storage tank 12 is metered and pumped 14 to an agglomerator 20 where it is aggressively mixed with the already blended dry feedstocks 15 in dry material storage 16 which has been metered by weight and augured 18 into the agglomerator 20.

Components of the dry materials 15, not shown in FIG. 2, are more fully illustrated in FIG. 1 as a cementitious binder 30, a clay mineral 32, optional feedstocks 34 and chopped or milled fibers 43. As described in FIG. 1, the cementitious binder 30 may be any combination of inorganic materials capable of acting as a bonding agent to bind other materials together into a hardened mass, as discussed above.

The dry material feedstocks 15 and the PCM aqueous suspension 11 are vigorously mixed in the agglomerator 20 to form the PCM aggregate 25 (FIG. 3). The PCM aggregate 25 (FIG. 3) particle size can vary in size from about 0.35 mm (0.0140 inch) to about 19 mm (¾ inch). After the PCM aggregate is formed in the agglomerator 20, it is sized and classified 22 before proceeding to a final drying process 24. The various sizes of aggregate size may be combined to conform to Fineness Modulus Specifications and particle packing formulae to conform to the end-user's specifications (e.g., dictated by the process to manufacture a specific end product). Smaller PCM aggregates (0.35 mm to 2 mm) can be incorporated into a wide range of insulation materials.

Extensive testing on a flammable form of PCM in insulation has been conducted at Oak Ridge Laboratories. The PCM used in these tests has thus far been flammable encapsulated PCM or encapsulated PCM treated with fire retardant. The compositions disclosed herein are fire resistant and require no additional fire retardant treatment. Blown in insulation materials such as cellulose, rock wool and fiberglass with encapsulated PCMs incorporated can benefit from the increased thermal mass and have been proven to decrease energy use and shift peak power demands. Smaller PCM aggregates 25 can be incorporated in batt insulation and foam insulation boards made of polyisocyanurate, expanded polystyrene, urethane and beadboard. Larger PCM aggregates 25 (4 to 19 mm) may be added to poured concrete, precast concrete and concrete masonry units (CMUs).

The final step in the PCM aggregate 25 process is some form of bagging or other type of packaging 26 for shipping.

FIG. 3 is a flow chart of the process to produce PCM aggregate 25, an embodiment employing a novel formula for a fire resistant PCM viscous mass 90, as in FIG. 1. FIG. 3 is more detailed in steps to make the PCM aggregate than FIG. 2 and it does not present the manufacture of encapsulated PCM found in vessels or components 2, 4, 6, 8, or 10 of FIG. 2.

FIG. 3 begins with the options available for encapsulated PCM—wet PCM 60, dry PCM 70, and cake PCM 80. These categories of encapsulated PCMs are based generally on the moisture content of commercially available encapsulated PCMs. For example, BASF/Ciba's PC200® is a wet PCM with a moisture content of approximately 55% where the encapsulated PCM is in suspension in the residual liquids from the encapsulation manufacturing process. This residual liquid contains water, non-encapsulated PCM and other ingredients not fully utilized in the encapsulation process. There are reported examples where these residual liquids caused bonding problems when the encapsulated PCMs were applied in either wet 60, dry 70, or cake 80 form because the non-water residuals, either suspended in the liquid and/or adhered to the shell, created incompatibility problems with other ingredients in end products. The acid-base cements preferred in the present embodiments mechanically and/or chemically bond these residues, along with the encapsulated PCM, into the PCM viscous mass 90 (e.g., shown in FIG. 1) without impact based on a particular embodiment such as PCM aggregate 25 or PCM compositions extruded as a viscous mass 41. Optional feedstocks 34 or chopped or milled fibers 43 are also physically and/or chemically bonded by the acid-base cement 30.

Encapsulated PCM, either wet 60, dry 70, or cake 80 or a combination of these, are metered 62, 72, and 82 into a tank 12 where additional water 50, if needed, is metered in 52. Wet PCM 60 may require no additional water 50 whereas cake PCM 80 and dry PCM 70 will require additional water 50. The PCM aqueous suspension 11 in tank 12 may need a surfactant 54 metered and piped 56 into the mix in order to aid in the blending of dry PCM 70 or cake PCM 80. At this stage, the liquid in tank 12 is a PCM aqueous suspension 11 and ready to be pumped 14 into an agglomerator 20 for vigorous mixing and agglomeration with the blended dry materials 15. The blended dry materials 30, 32, 34, and 43 in this embodiment are fully described above. Also fully described is the process of agglomerating 20 the dry materials 15 with the PCM aqueous suspension to form the PCM aggregate 25 which goes through a sizing process 22 and final drying 24 before bagging and packaging 26 for shipment.

PCM aggregate 25 substantially mitigates the risk associated with flammability, as well as ease of application, compatibility with existing ingredients in products and health hazards associated with the breathing and handling of dry PCM 70. PCM aggregate 25 can be produced in a wide range of sizes, or using multiple melting temperature PCMs, and the acid-base cement 30 protects the PCM shell without increasing interference with the thermal properties of encapsulated PCM.

Figure 4:
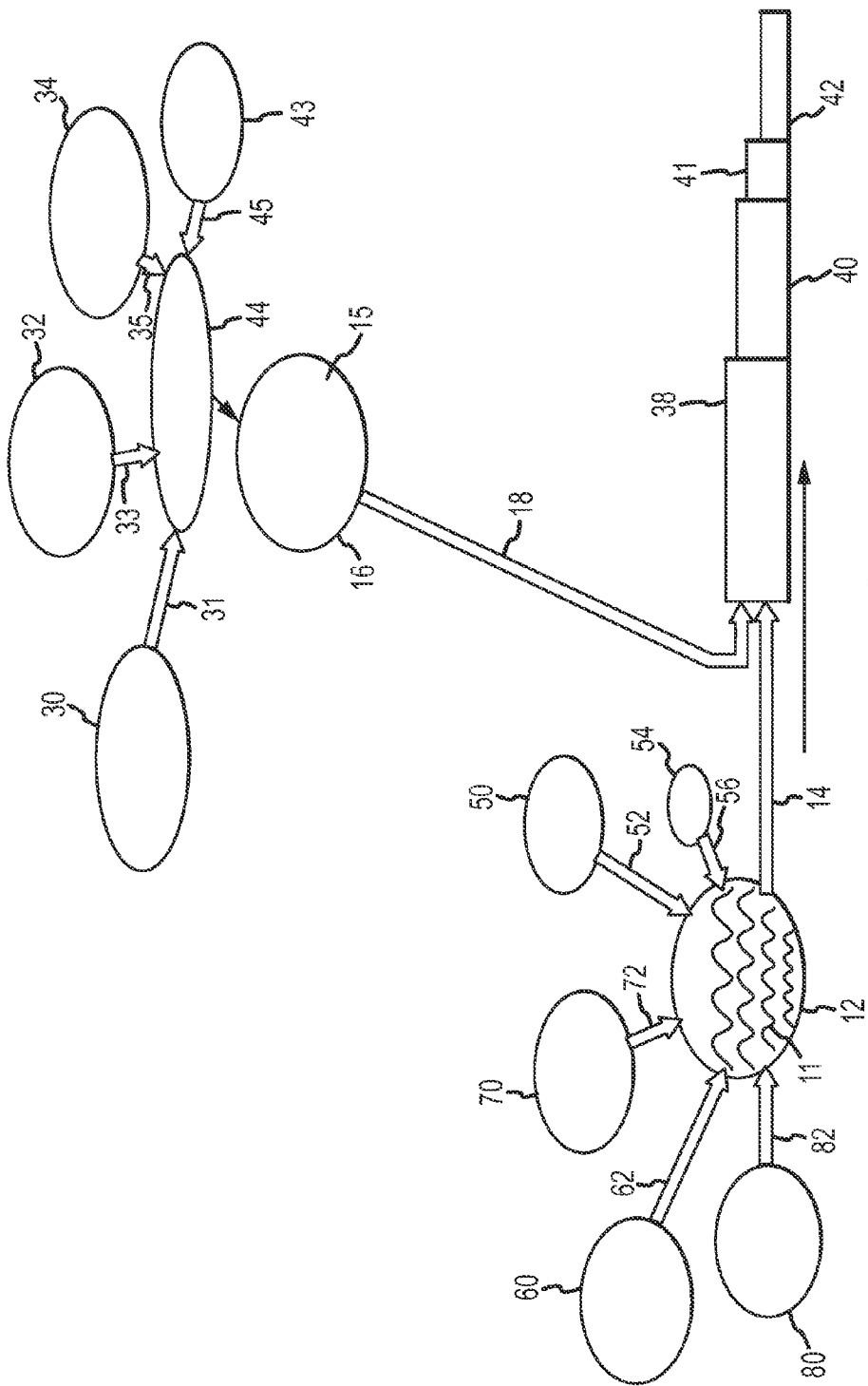
FIG. 4 is a flow diagram of a process for production of a fire resistant PCM extruded viscous mass.

FIG. 4 is a flow chart of a process to produce a fire resistant PCM extruded viscous mass 41 which will self bond to most materials, thus increasing the thermal mass. In FIG. 4, the process of making the PCM aqueous suspension 11 and the blended dry materials 15 are essentially identical to those in the description above in relation to FIG. 2 and FIG. 3. While in FIG. 2 and FIG. 3, these feedstocks for the novel formulations of the invention are mixed in an agglomerator 20. In this embodiment, these same ingredients are vigorously mixed in mixer 38 to produce a PCM viscous mass 90 which is immediately conveyed to an extruder 40 with a mold head such as a sheet mold head. For example, a sheet or layer 42 of the PCM extruded viscous mass 41 from 4 to 15 mm thick can be applied to, and will self bond when cured, to a wide range of board products. The PCM extruded viscous mass 41 will act both as a fire barrier and add thermal storage capacity to plywood, oriented strand board (OSB), drywall boards, cement board and both foil faced and un-faced insulation boards. Present materials and methods do not provide the fire barrier, or the non-flammability, or the flexibility of application that this embodiment offers.

Figure 5A:
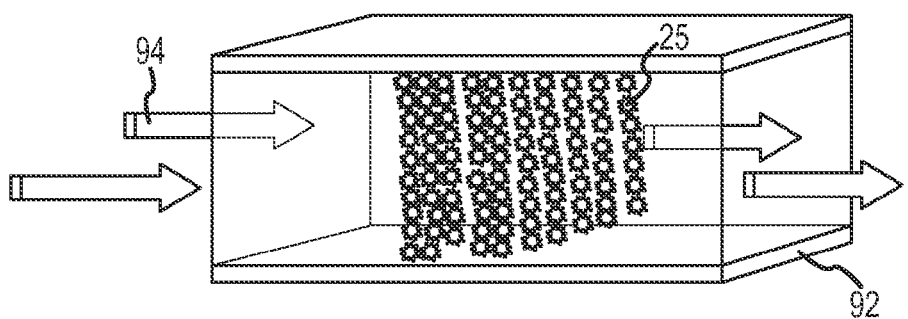
FIG. 5a and FIG. 5b are sectional views of PCM aggregate in use within an air to air heat exchanger.
Figure 5B:
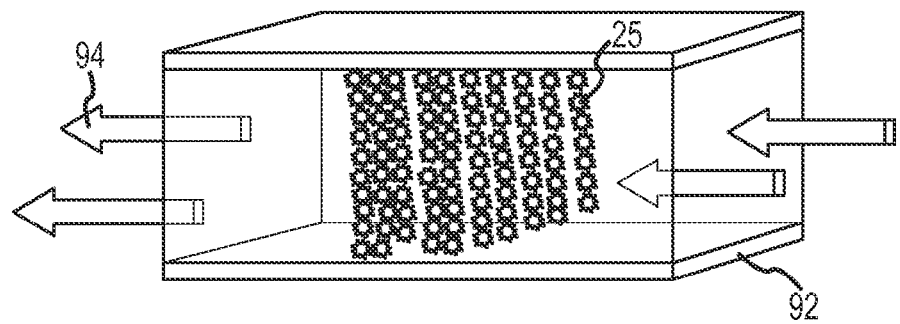

Presented in FIG. 5a and FIG. 5b is an embodiment of PCM aggregate 25) in an application as a heat exchanger/heat storage medium. PCM Thermal Solutions, Inc. of Naperville, Ill. in cooperation with MJM Engineering Co., offers to design and develop customized heat exchangers that incorporate PCM materials. The companies presently use either plastic packaged PCMs or metal-encapsulated PCMs. Unlike the aggregate embodiments disclosed herein, their products rely on containment in plastic or metal containers to prevent leakage of the PCM salts. FIG. 5a illustrates how fire resistant PCM aggregate 25, sized and graded to optimize surface area and efficient air or fluid flow, or an extruded fire resistant PCM viscous mass 41 (not illustrated here) shaped to optimize surface area and efficient air flow 94 can be employed to capture and store thermal energy (heat). This stored energy may be used to heat or cool depending on the needed application and will serve to reduce overall energy use and shift peak demand PCM aggregate 25 or a column of PCM extruded viscous mass 41 (not illustrated) could be installed in a duct 92 or other enclosed space where hot or cold air 94 is flowing over the PCM aggregate 25, charging the PCM aggregate 25 with stored heat. As shown in FIGS. 5a and 5b, the air 94 may pass over the PCM aggregate 25 in either direction. FIG. 5a and FIG. 5b suggest an enclosed duct but, unlike existing systems, PCM aggregate 25 could easily be installed in any space where air flows freely such as under a raised computer floor or on ceiling tiles.

Figure 6A:
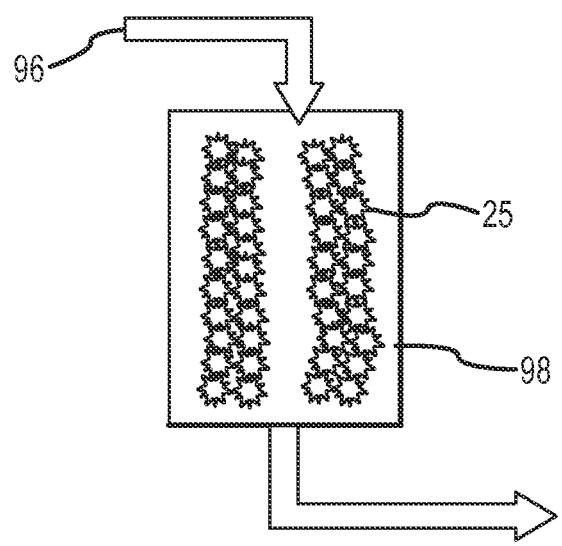
FIG. 6a and FIG. 6b are sectional views of liquid/gas PCM aggregate heat exchangers, charging and discharging, respectively.
Figure 6B:
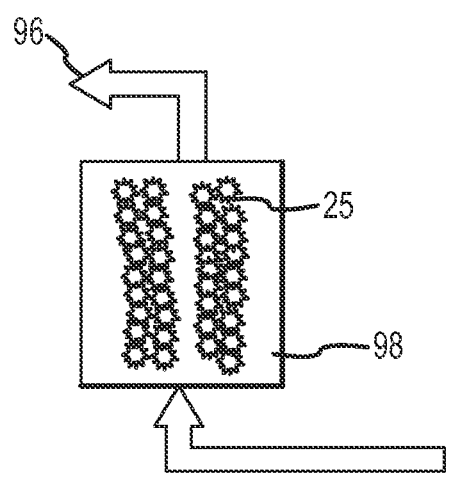

FIG. 6a and FIG. 6b illustrate an embodiment where PCM aggregate 25 or PCM extruded mass 41 in a cylindrical column (not illustrated, but can have any suitable cross section)) function in a fluid or gas flow 96 within a closed system, in this example illustrated by a tank 98. The PCM aggregate 25 functions to store heat and release heat in the same functional way as described above for FIG. 5a and FIG. 5b. The difference is that the heat is stored or released back into a liquid or gas flowing over the PCM aggregate within a closed system. The fluid or gas flow 96 may pass through the tank 98 in either direction. Unlike existing systems, the PCM aggregate 25 or PCM extruded mass 41 in any desired shape does not have to be contained beyond the form that the invention can create because there is no leakage of the PCM aggregate 25 material into the liquid or gas. The apparatus and process described secures the PCM so that it will not react or release into the heat carrying liquid or gas.

FIG. 7A is a cross sectional view of a PCM blanket 254A with a PCM aggregate 235a forming the middle layer. The top ply 234a is attached by seams 239 to the bottom ply 234b, thus enclosing the middle layer of PCM Mix formed into aggregate 235a within a pattern of pouches 242, slats or enclosed patterns.

FIG. 7B is a sectional view of a PCM Blanket 254B with a PCM Mix extrusion 234b forming the middle layer. The top ply 234b is attached by seams 239 to the bottom ply 234b, thus enclosing the middle layer of a PCM Mix extruded 235b within a pattern of pouches 242, slats or enclosed patterns.

Figure 8:
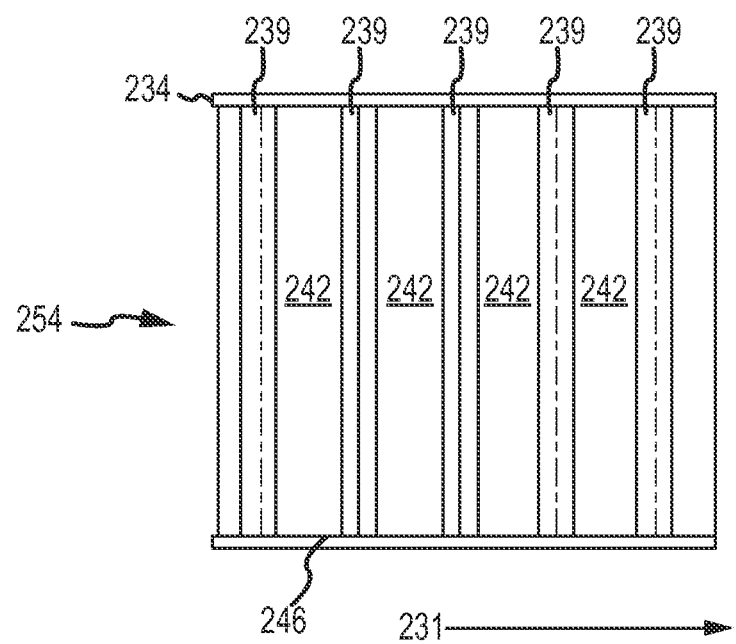
FIG. 8 is a top or plan view of a PCM Blanket. The top ply is attached to the bottom ply enclosing the middle layer of PCM Mix within a pattern of pouches or slats. A ply flange facilitates attachment to the building envelope wherever positioned.

FIG. 8 is a top or plan view where 231 indicates the long dimension (length dimension) of a PCM Blanket 254. The width dimension is the shorter dimension orthogonal to the length dimension, and the thickness dimension is into the paper. The top ply 234 is attached by seams 239 to the bottom ply 234, thus enclosing the middle layer of PCM Mix within a pattern of pouches 242 or slats. A ply flange 246 facilitates attachment to the building envelope wherever positioned.

Figure 9:
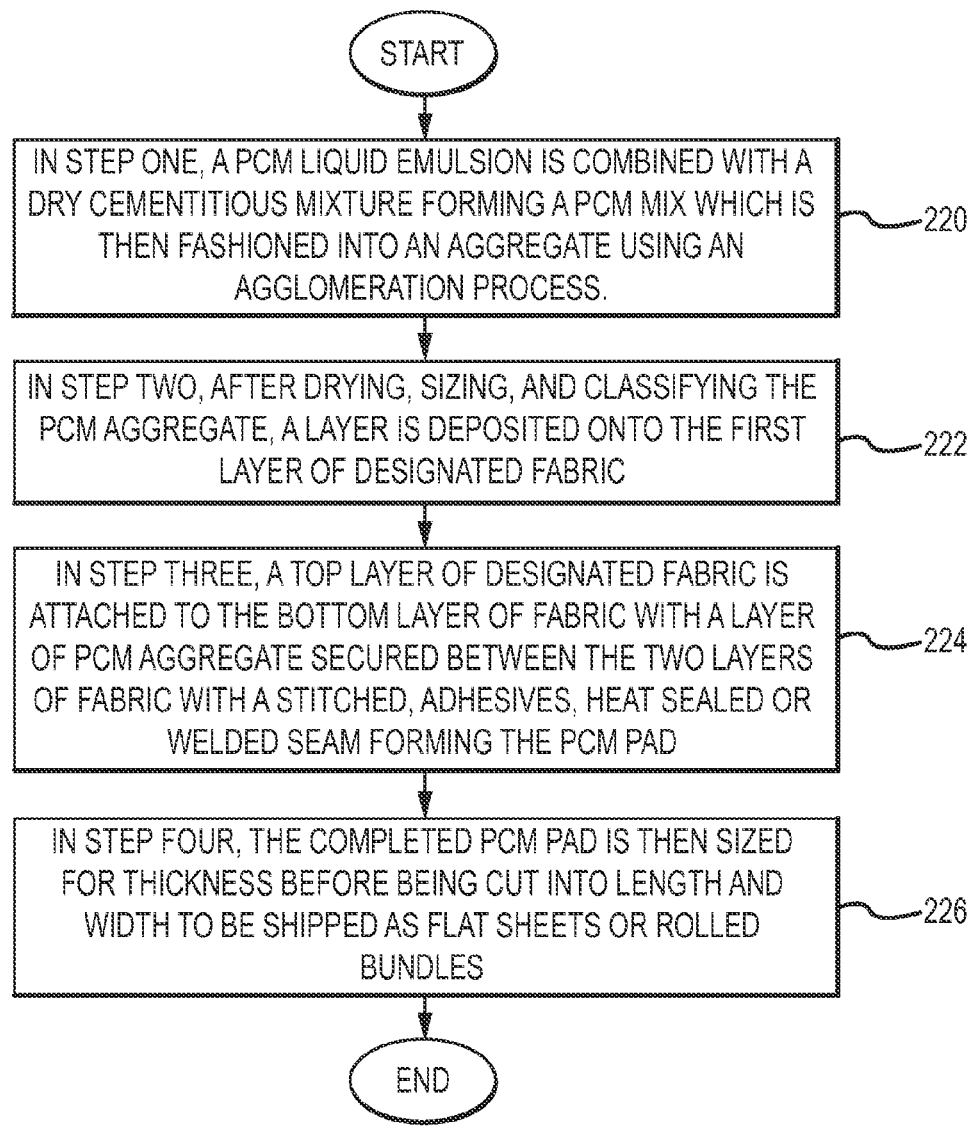
FIG. 9 is a flow chart of the embodiment of a method of manufacturing the PCM Blanket of FIG. 7A and FIG. 8.

As shown in the flow chart of FIG. 9, to form a PCM Blanket 254, a PCM cementitious mix 235 forms a layer between two plies 234. The cementitious mix 235 solves the containment and flammability issues in prior art by encapsulating the PCM in a cementitious mix that is fire resistant and non-leachable. The cementitious mix 235 is compatible with any material should a ply 234 be breached in any way and it is compatible with the variations in both format and particle sizes of encapsulated PCM. The two embodiments of the cementitious mix, an aggregate format 235a and an extruded format 235b, as flow-charted in FIG. 9 and FIG. 10 will accommodate any encapsulated PCM with melting points in any range needed for a particular application without modification to the equipment or cementitious material.

As shown in FIG. 9, in step 220 a PCM liquid emulsion, suspension, or slurry is metered into an agglomerator where the liquid emulsion, suspension, or slurry is combined with a dry cementitious powder mix. The internal structure of the agglomerator causes the liquid PCM emulsion, suspension, or slurry to coalesce with the dry cementitious material forming various size particles or aggregates 235a. Particles having sizes of at least about 20 microns to about one inch can be produced. For certain PCM applications, particle sizes can vary from 1/64$^{th}$ to 3/4 inch. Depending upon the application, the particles can have substantially uniform sizes or various particle size distributions. In step 222 a portion of the water not bound up in the agglomeration process is removed, and then the agglomerated PCM aggregate 235a is sized and classified to the desired thickness. A layer of PCM aggregate 235a is deposited on to the bottom ply 234b. In step 224 a top ply 234a, or alternately house wrap 234c, is attached by suitable mechanical means including, but not limited to, stitching, adhesives, heat sealed or welded seams 239 to the bottom ply 234b, securing the PCM aggregate 235a between the two plies 234 forming the completed PCM Blanket 254. In step 226, the PCM Blanket 254 is cut to its final length and width dimensions to be shipped as flat sheet material or rolled into bundles.

The PCM cementitious mix 235 component of the PCM Blanket may be any combination of inorganic materials capable of acting as a bonding agent to bind other materials together into a hardened mass with the PCM (e.g. Portland Cement, plaster of Paris, silicate cement, magnesium phosphate cement, magnesium oxychloride cement, magnesium oxysulfate cement, etc.). A preferred bonding agent for the PCM Blanket is an acid-base cement such as magnesium phosphate cement. A particular type of acid-base cement is a combination of magnesium oxide and mono potassium phosphate, referred by Waugh as magnesium potassium phosphate ceramic (ceramicrete). Acid-base cements are defined on page 3 of Wagh's book, cited below, and discussed in Chapter 1. In an acid/base cement, the PCM particles will be contained within matrices of the three dimensional amorphous clusters formed by the cement and other materials comprising the hardened mix. The cross linking is not that of the PCM particles, rather, it is the cement hardening into three dimensional clusters. The particle clusters can be made to be quite small, but even then will be far larger than the PCM particles contained within it. The cement in the clusters will further protect the PCM contained within its shell. The cement also presents an ideal and easily handled material.

A preferred cementitious mix for the PCM Blanket consists of 3 parts dead burnt magnesium oxide, 6 parts mono potassium phosphate, and 20 parts Palygorskite or modified attapulgite clays, and about 72 parts PCM in a liquid aqueous emulsion, suspension, or slurry form. The PCM liquid emulsion, suspension, or slurry in the cementitious mix above should be between 40% and 50% encapsulated PCM and 60% and 50% liquid. Palygorskite and attapulgite are both magnesium aluminum phyllosilicates with the general chemical formula $(Mg,Al)_2Si_4O_{10}(OH).4H_2O$ which occur in certain clay soils. Attapulgite clays are composites of smectite and palygorskite. Smectites are expanding lattice clays included in a generic class commonly known as bentonites. The palygorskite component is an acicular bristle-like crystalline form which does not swell or expand. In contrast, attapulgite forms gel structures in both fresh and salt water by establishing a lattice structure of particles connected through hydrogen bonds. Companies involved in the industrial extraction and processing of gellant grade attapulgite clay include Active Minerals International LLC and BASF Corporation. Active Minerals produces a patented, purified form of attapulgite known as Actigel® 208 in which the clay has been chemically and mechanically exfoliated into discrete particles of palygorskite which are about 2 microns in length and 30 Angstroms in diameter. All non-palygorskite particles are removed, leaving a purified form of palygorskite.

Based on research conducted at the Argonne National Laboratory as noted in Wagh's book *CHEMICALLY BONDED PHOSPHATE CERAMICS* (ELSEVIER 2004) at page 241, acid/base cements such as the cementitious mix above can convert flammable materials such as highly flammable hydrocarbon PCMs, into fire resistant forms, and the new cementitious material 235 is non leachable. The cementitious PCM mix 235 is then installed as the center layer of the plies 234 forming a PCM Blanket.

An advantage of the PCM cementitious mix 235 using a preferred acid-base cement is the elimination of any problem with containment of the PCM. The cementitious mix encases the PCM in a non leaching material, even when the PCM cementitious mix is ground into very fine particle sizes. The expansion of the encapsulated PCM within the shell does not cause a problem within the rigid PCM cementitious mix 235. Encapsulation of the PCM provides the space for expansion and that expansion space is in no way affected by the processes shown in FIG. 3 or FIG. 4.

Using an acid-base cement for the binder in the cementitious mix 235 substantially eliminates the risk of flammability associated with prior art preparations. Acid-base cements are in and of themselves non-flammable. When used in combination with any flammable material such as organic PCMs, they create an end material that is also non-flammable.

One embodiment of the process to create a PCM Blanket 254 with a PCM aggregate 235a forming the middle layer as illustrated in FIG. 7A and FIG. 8 is outlined in FIG. 9. FIG. 9 is a flow chart of an embodiment of a process to manufacture a PCM Blanket 254 using a PCM aggregate as in FIG. 7A and FIG. 8. In step 220 a PCM liquid aqueous emulsion, suspension, or slurry is metered into an agglomerator where the liquid emulsion, suspension, or slurry is combined with a dry cementitious powder mix. The internal structure and operation of the agglomerator causes the liquid PCM emulsion, suspension, or slurry to coalesce with the dry cementitious material forming various particle sizes of aggregates 235a. Suitable agglomerator apparatus is available from Engineering and Design Associates, Inc. (EDA) of Folsom, Calif., which produces the "O'Brien Agglomerator;" and from MARS MINERAL of Mars, Pa., which produces, e.g. the DP-14 "Agglo-Miser." Suitable apparatus and methods are also disclosed in U.S. Pat. No. 3,536,475 ("MAKING PELLETS FROM FINELY DIVIDED MATERIAL") and U.S. Pat. No. 4,504,306 ("METHOD OF PRODUCING AGGLOMERATES"), both of which are incorporated herein by reference.

In step 222 a portion of the water not bound up in the agglomeration process is removed; then the agglomerated PCM aggregate 235a is sized and classified to the desired thickness. A layer of PCM aggregate 235a is deposited on to the bottom ply 234b of a blanket. In step 224 a top ply 234a or alternately house wrap 234c is attached by suitable mechanical means including, but not limited to, stitching, adhesives and heat sealed or welded seams 239 to the bottom ply 234b securing the PCM aggregate 235a between the two plies forming the completed PCM Blanket 254. In step 226, the PCM Blanket 254 is cut to its final length and width dimensions to be shipped as flat sheet material or rolled into bundles.

Figure 10:
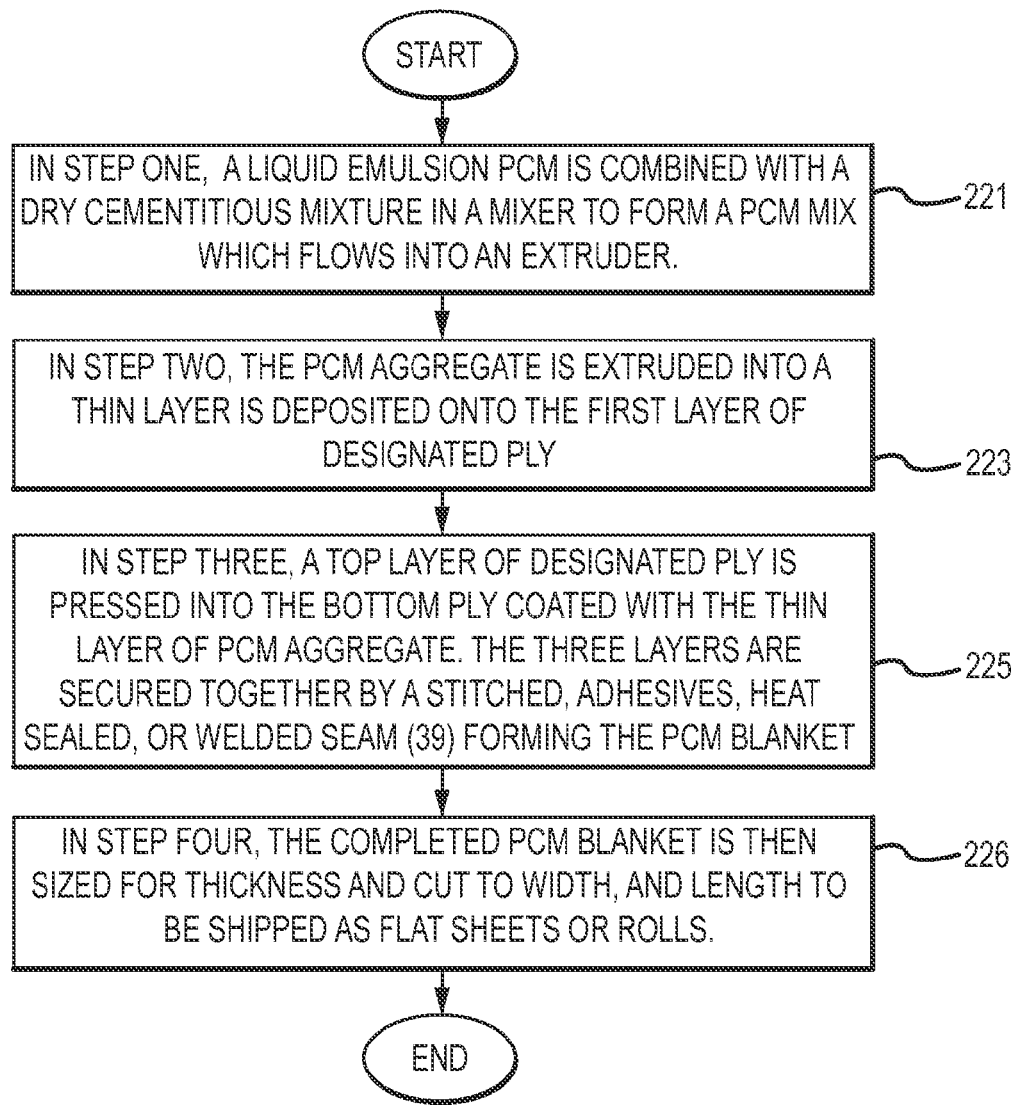
FIG. 10 is a flow chart of the embodiment of a method of manufacturing the PCM Blanket of FIG. 7B and FIG. 8.

FIG. 10 is a flow chart of a second embodiment of a process to create a PCM Blanket 254 with an extruded PCM mix 235b forming the middle layer as illustrated in FIG. 7B and FIG. 8. In step 221 a mixer combines a PCM liquid aqueous emulsion, suspension, or slurry with a dry cementitious powder for an extrusion process. In step 223 the desired amount or thickness of extruded PCM 235b is extruded through an extruder mold head onto the bottom ply 234b. In step 224 the top ply 234a or alternately, a ply made from a material such as a house wrap 234c or a heat reflective material, is placed over the extruded PCM 235b and pressed into the bottom ply 234b. Appropriate fastening methods may include, but are not limited to by, stitching, adhesives and heat sealed or welded seams 239. In step 226, the PCM Blanket 254 is cut to its final length and width dimensions to be shipped as flat sheet material or rolled into bundles.

The PCM Blanket 254 is a self-contained PCM delivery system without the disadvantage of most prior art systems which are tied to a specific product such as wallboard or insulation. The PCM Blanket enhances existing insulation without the restrictions of placement if it were tied to a specific product. Whereas wallboard can only be installed on an interior wall, the PCM Blanket can be installed wherever needed to optimize the energy efficient design of a particular location.

FIGS. 11, 12, 13, 14 and 15 illustrate potential operational applications for PCM Blankets. The functional design of the PCM Blanket 254 remains essentially the same for all applications including the illustrated applications. In each application, it will be apparent that the PCM Mix 234, is sandwiched in a thin layer between two plies, and is placed as close as possible to the desired temperature zone to maximize the benefits of the PCM.

Besides the two embodiments of the PCM mix, as an aggregate 235a or extrusion 235b, the PCM Blanket offers at a number of customizations in order to maximize the potential benefits of the PCM for various locations, either geographic or physically in or on a building. One custom option would be flexibility or variations in width of the PCM Blanket 254 for a particular application. The manufacturing processes outlined in FIG. 9 and FIG. 10 is flexible in the placement of seams 239, allowing varying widths of the Blanket for installation. A width as small as 3 inches or more could be produced if the PCM Blanket were to be used for a thermal break instead of being applied to a whole wall.

Figure 11:
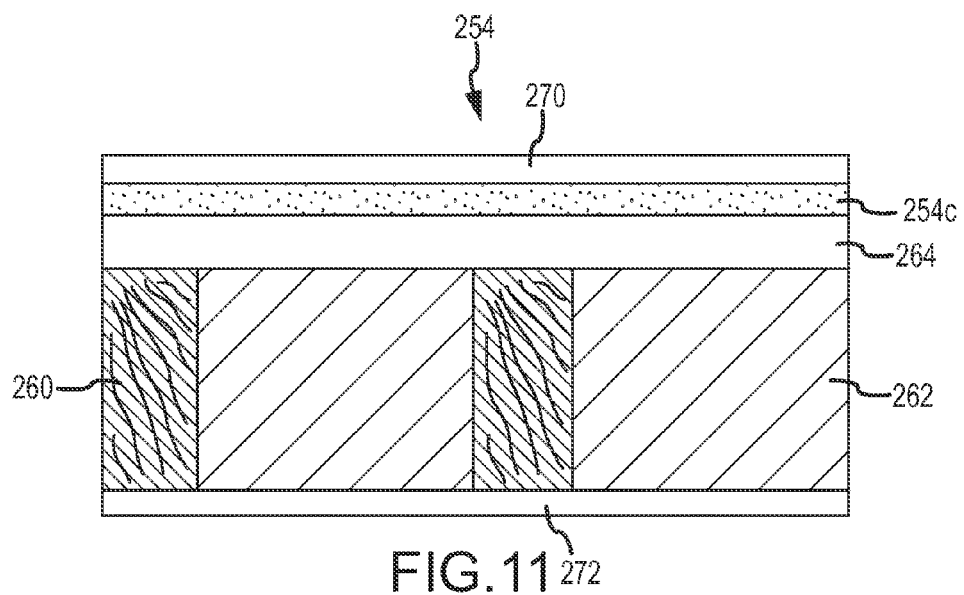
FIG. 11 is a horizontal cross sectional view of a typical wood or metal stud wall with a typical interior wallboard or other interior wall material and a typical exterior sheathing enclosing typical batt or blown in wall insulation. A PCM Blanket with a house wrap material comprising the top ply of the PCM Blanket is attached to the sheathing followed by the typical exterior siding to complete the wall structure.

More importantly, the PCM Blanket can be designed to have enhanced thermal characteristics over a wide range of temperatures or at discrete temperature ranges through proper selection of a PCM having a melting point designed for an intended application. A PCM Blanket 254 as illustrated in FIG. 11 which is a design for a building in Oak Ridge, Tenn. would preferably require a different PCM melting point than a similar application in South Carolina in order to optimize the thermal mass benefits of PCM. Flexibility as to which encapsulated PCM to use is factored into the flow of either process embodiment in FIG. 9 and FIG. 10.

Another potential customization of the PCM Blanket is the option of specifying one ply as house wrap 234c or another appropriate material such as a heat reflective material. Plies 234 may be any flexible material used currently or in the future that has functional qualities which would make it suitable one of the plies and which would be compatible with the manufacturing process in FIG. 9 or FIG. 10.

FIG. 11 illustrates the installation of a PCM Blanket 254 enhancing the insulation of an exterior wall. In this example, one of the plies is a typical house wrap 254c. Fabricating the PCM Blanket with one of the plies 234 as a house wrap 254c eliminates the need for the additional expense and labor of installing house wrap on the walls specified for the PCM Blanket 254 thermal mass.

The application in FIG. 11 also illustrates a solution to the problem of placement with prior art and installation. As noted in the Oak Ridge Lab study above, PCM enhancement is not needed nor desirable for all exterior walls. The PCM Blanket is installed on an exterior wall in a similar manner as a typical house wrap. If for some reason the PCM Blanket were incorrectly installed on the East facing wall instead of the North facing wall, then it could be easily removed and reinstalled on the correct wall as long as the repositioning occurs before the attachment of exterior sheathing 264. In this embodiment the house wrap material 234c serves a dual function, both enclosing one side of the PCM Blanket 254 and protecting the building envelope from air and moisture infiltration.

Figure 12:
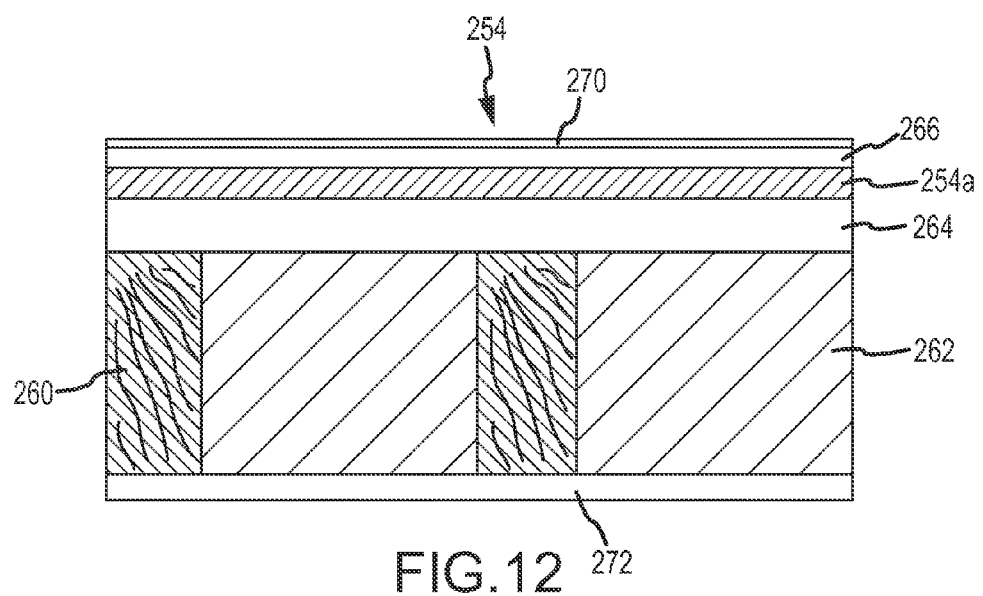
FIG. 12 is a horizontal cross sectional view of a typical wood or metal stud wall where a typical interior wallboard or other interior wall material and typical exterior sheathing material encloses batt or blown in wall insulation. A PCM Blanket is attached to the exterior sheathing and is then usually covered by a house wrap which would then be covered with a typical exterior siding to complete the wall structure.

FIG. 12 illustrates the installation of a PCM Blanket 254a in a typical wood or metal stud 260 exterior wall. In this example, the PCM Blanket 254a is attached to the exterior sheathing 264 and covered by a house wrap 266 which would then be covered with a typical exterior siding 270 to complete the wall structure. In this illustration, the PCM Blanket 254a performs its thermal mass function and could serve as a fire barrier, but not the vapor barrier functions of a house wrap 266. In most applications, once the PCM Blanket 254a without a house wrap ply is attached to the exterior, a house wrap 266 would be installed over the PCM Blanket 254a followed by layer of typical exterior siding 270.

Figure 13:
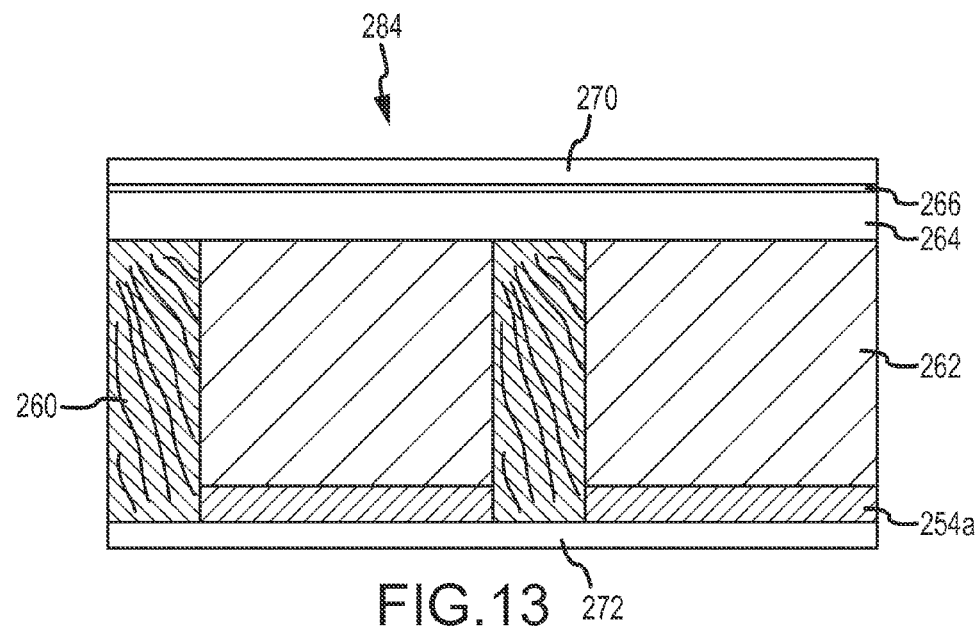
FIG. 13 is a horizontal cross sectional view of a typical wood or metal stud wall where typical wall board or other interior wall material and typical exterior sheathing encloses batt or blown in insulation and the PCM Blanket.

FIG. 13 illustrates a possible interior application where the PCM Blanket 254a is placed directly behind the typical interior wallboard 272 but in front of the batt or blown insulation 262. Even though this placement of the PCM Blanket 254a in FIG. 13 is not the most desirable for maximum efficiency of the PCM, the PCM Blanket is fire resistant, will not leak into the surrounding material if breached and concentrates the PCM directly behind the wallboard, thus enhancing the benefits of placing the PCM in this location. FIG. 13 illustrates the versatility of the PCM Blanket in terms of placement when compared to the limited placement options with prior art systems. In this illustration of an application, the PCM Blanket 254a is placed to the interior side of the wallboard 272 next to the batt or blown in wall insulation 262.

Figure 14:
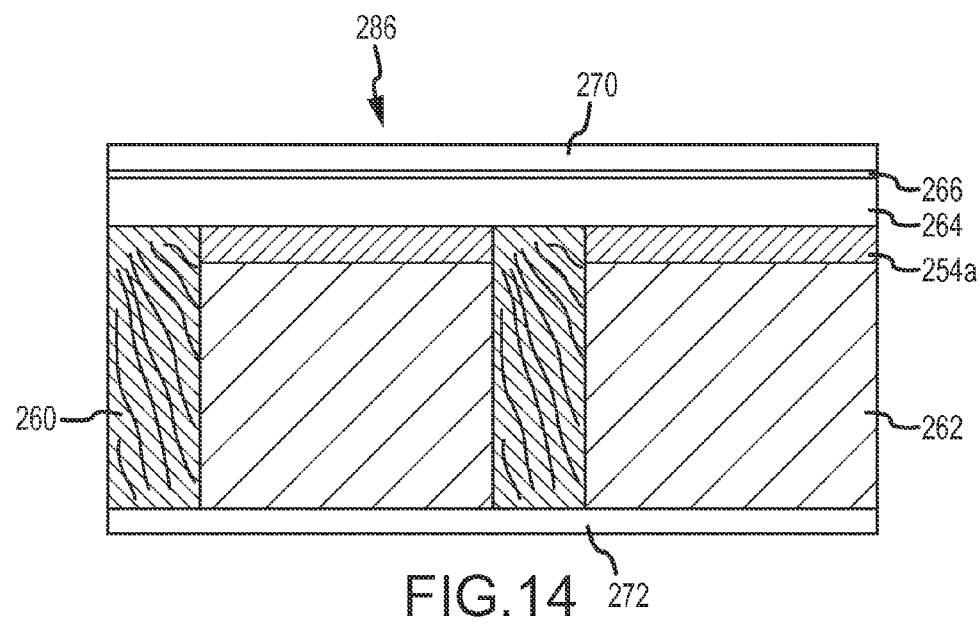
FIG. 14 is a horizontal cross sectional view of a typical wood or metal stud wall where typical interior wallboard or other interior wall material and typical exterior sheathing enclose both the batt or blown in wall insulation and the PCM Blanket.

FIG. 14 illustrates a possible interior application in which the PCM Blanket 254a is placed on the inside face of a typical exterior sheathing 264 as opposed to FIG. 13 where the PCM Blanket 254a is placed on the inside wall but on the interior face of the insulation. FIG. 14 again illustrates the flexibility of a PCM Blanket 254a in an energy efficiency design for placement of PCM in a building envelope. The fact that the PCM Blanket 254a is not tied to a specific building product allows for placement of the invention in or on the building envelope without the limitations of linkage to the installation requirements of a carrier product such as wallboard or insulation. In this illustration of an application, the PCM Blanket 254a is placed to the outside of the wall cavity and attached between the studs 260 and to the interior side of the exterior sheathing 264. Typical house wrap material 266 is attached to the sheathing 264 followed by typical exterior siding 270 to complete the wall structure.

Figure 15:
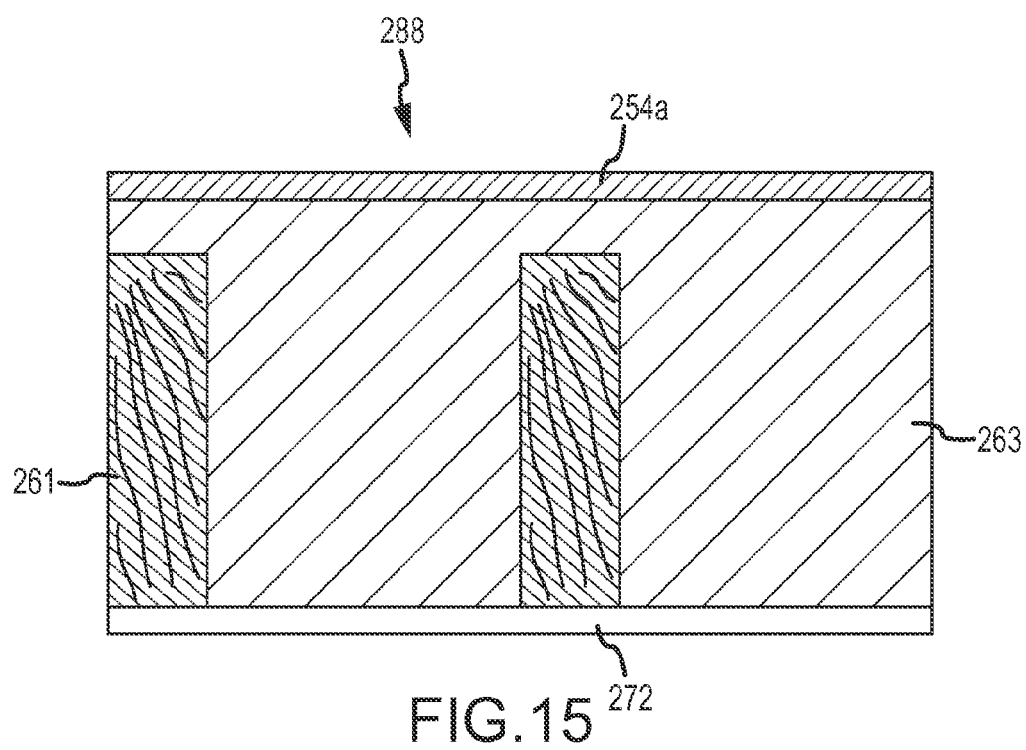
FIG. 15 is a schematic cross section view of a typical ceiling structure with typical interior wallboard or other interior wall material attached to ceiling joists.

FIG. 15 illustrates a possible attic installation of a PCM Blanket 254a. The PCM Blanket 254a, which is fire resistant and flexible in terms of the melting point of the PCM specified, can be installed in an attic on top of batt or blown in insulation 263 provided by any manufacturer. Since the PCM Blanket 254a is not a part of the insulation itself 263, the specified type and volume of insulation is flexible depending on the design of the building and the geographic location. The PCM Blanket 254a properties are then specified to enhance the insulation design and maximize the thermal benefits of the PCM. The cavities between the ceiling joists 261 are filled with batt or blown in attic insulation 263. Said insulation 263 may extend above the ceiling joists 261 to achieve designated insulation values. In this illustration of an application, the PCM Blanket 254a is placed above the attic insulation 263 to moderate attic temperature fluctuations.

Other potential locations besides interior or exterior walls and attics for a PCM Blanket could include but are not limited to floors, ceilings, above ceiling tiles, in tilt up wall construction, structural insulated panel walls, metal buildings, and in sheets behind independent panels in a room or computer server room. Many of these applications for a PCM Blanket are options for retrofitting an existing building to obtain the thermal mass benefits of PCMs.

Figure 16:
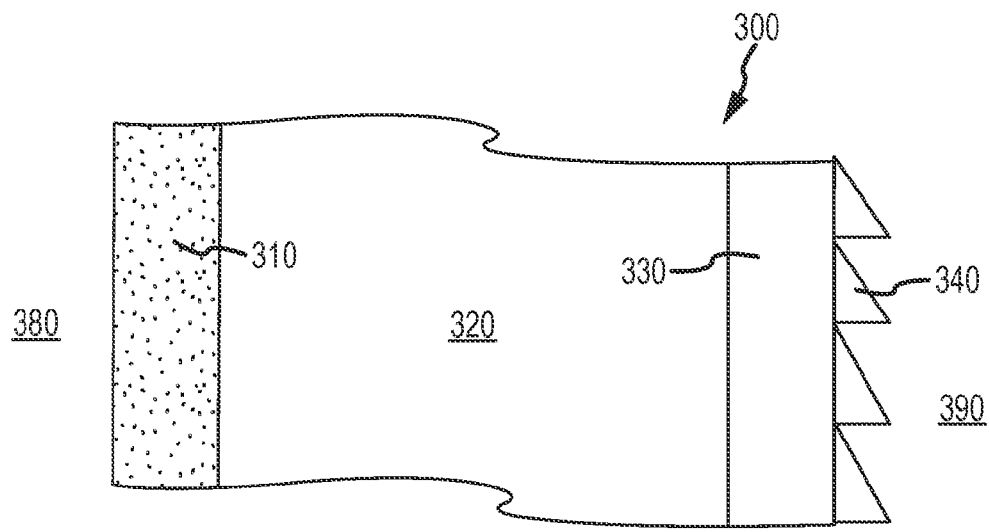
FIG. 16 is a vertical cross sectional view of a portion of an embodiment of a wall structure.

FIG. 16 depicts a cross-section of a portion of a wall structure 300. The wall structure 300 may provide a barrier between an interior space 380 of a building and an exterior space 390 of the building. The wall structure 300 includes a layer of wallboard 310 that includes a PCM composition. For example, the wallboard 310 may be a gypsum, magnesium oxide (e.g., magnesium chloride or magnesium phosphate) board, or other appropriate type of wallboard material that includes particles of the PCM composition bound in the matrix of the wallboard. The PCM composition may replace materials in the mix of the wallboard 310 or may serve as an additive in the mix of the wallboard 310. The layer of wallboard 310 may be disposed to the interior (i.e., closer to the interior space 380) of a metal or wood stud 320. To the exterior (e.g., closer to the exterior space 390) of the stud 320 may be a layer of exterior sheathing 330 and a layer of siding 340.

Figure 17:
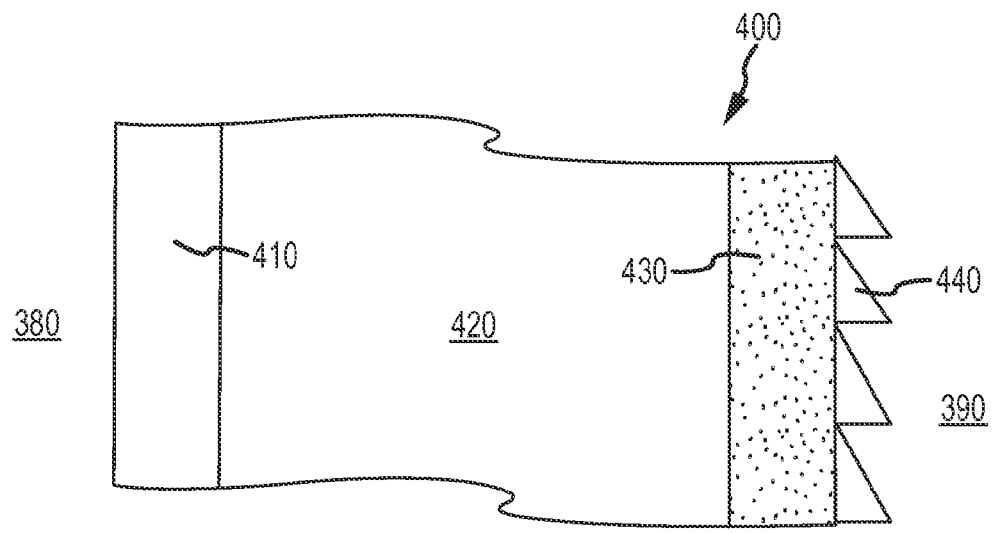
FIG. 17 is a vertical cross sectional view of a portion of another embodiment of a wall structure.

FIG. 17 depicts a cross-section of a portion of a wall structure 400. The wall structure 400 may include a layer of exterior sheathing 430 that includes a PCM composition disposed to the exterior of a metal or wood stud 320. For example, the exterior sheathing 430 may be a magnesium oxide (e.g., magnesium chloride or magnesium phosphate) sheathing board including a PCM composition that replaces materials in the mix of the exterior sheathing 430 or serves as an additive to materials in the mix of the exterior sheathing 430. A layer of siding 440 may be disposed exterior to the layer of exterior sheathing 430. A layer of wallboard 410 may be positioned to the interior of the studs 420.

Figure 18:
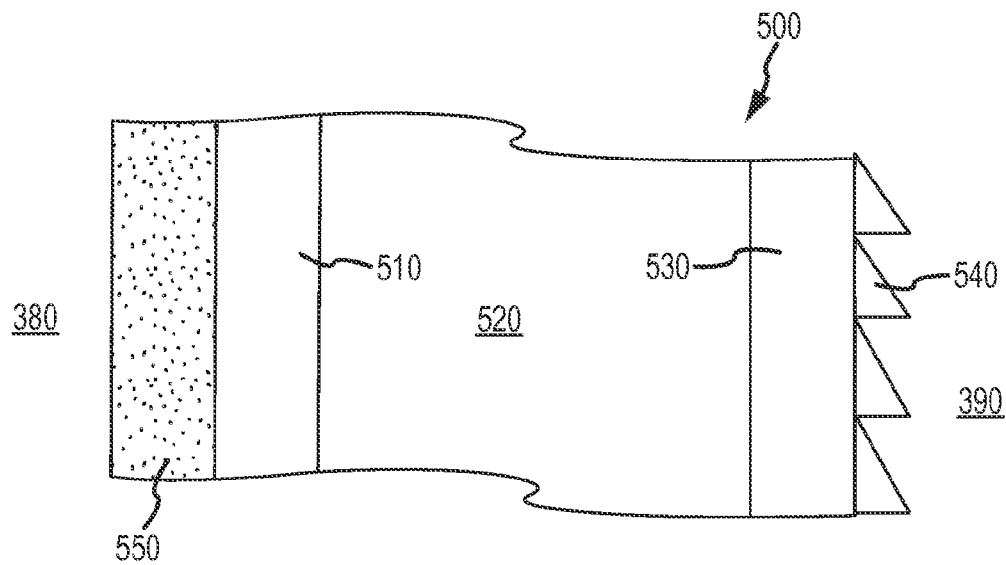
FIG. 18 is a vertical cross sectional view of a portion of yet another embodiment of a wall structure.

FIG. 18 depicts a cross-section of a portion of a wall structure 500. The wall 500 may include an interior topcoat layer 550 that includes a PCM composition. For example, the topcoat layer 550 may include particles of the PCM composition in a plaster, clay, or paint or wall texture or other top coat. As shown in FIG. 18, a topcoat layer 550 may be applied to a substrate 510. The substrate 510 may include a layer of wallboard or a layer of lattice material (e.g., diamond metal lathing, plastic lathing or the like). The substrate 510 may be disposed to the interior of a metal or wood stud 520. Disposed exterior to the stud 520 may be a layer of exterior sheathing 530 and a layer of siding 540.

Figure 19:
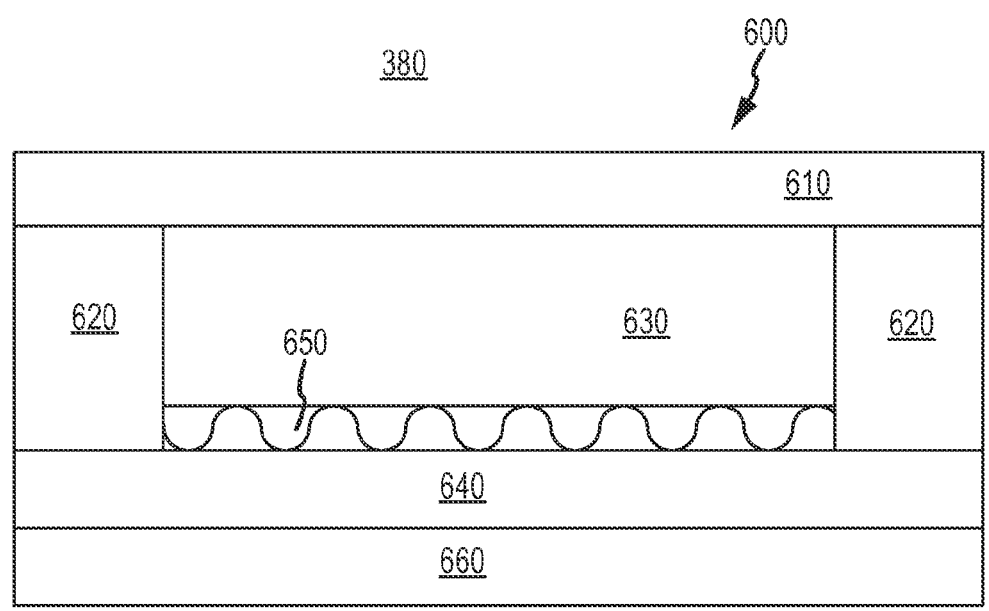
FIG. 19 is a horizontal cross sectional view of a portion of an embodiment of a wall structure.

FIG. 19 depicts a cross-section of a portion of a wall structure 600 including a PCM composition product 650. The PCM composition product 650 may be in the form of a blanket (e.g., such as a PCM blanket described above), a sheet board material containing a PCM composition, loose particles of a PCM composition, or other appropriate form of a PCM composition. The wall structure 600 may have metal or wood studs 620. A layer of wallboard 610 may be applied to the interior of the studs 620. Disposed generally between the studs 620 and exterior to the wallboard 610 may be an insulation material 630 (e.g., batt, blown, foam, or other appropriate type of insulation). Disposed exterior to the insulation material 630 and between the studs 620 may be the PCM composition material 650. To the exterior of the PCM composition material 650 and the studs 620 may be a layer of exterior sheathing 640. Disposed to the exterior of the layer exterior sheathing 640 may be a layer of siding 660.

Figure 20:
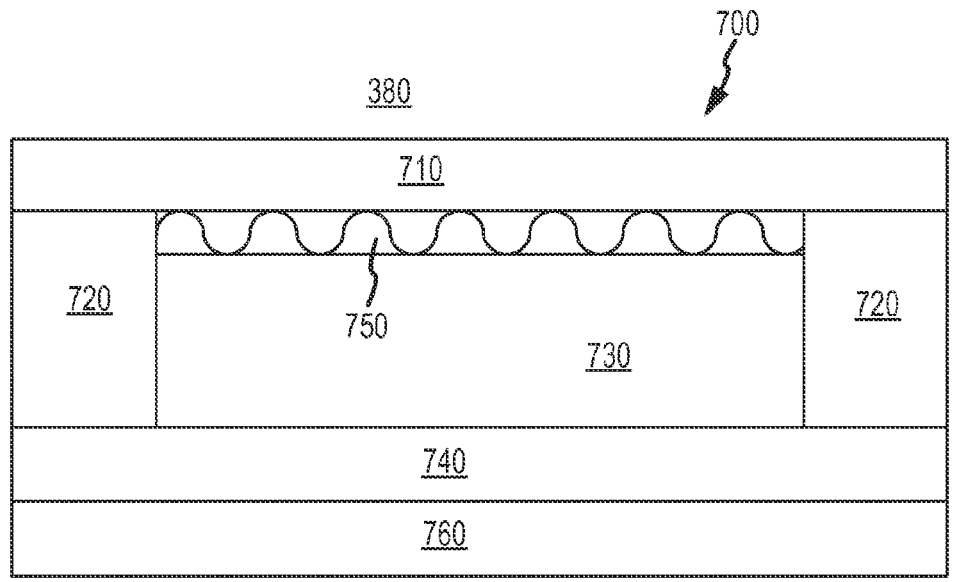
FIG. 20 is a horizontal cross sectional view of a portion of another embodiment of a wall structure.

FIG. 20 depicts across-section of a portion of a wall structure 700. The wall structure 700 may include metal or wood studs 720. Disposed to the interior of the studs 720 may be a layer of wallboard 710. A PCM composition product 750 may be disposed exterior to the wallboard material 710 and between the studs 720. To the exterior of the PCM composition product 750 may be an insulation material 730. Disposed to the exterior of the insulation material 730 and the studs 720 may be a layer of exterior sheathing 740. To the exterior of the layer of sheathing 740 may be a layer of siding 760.

Figure 21:
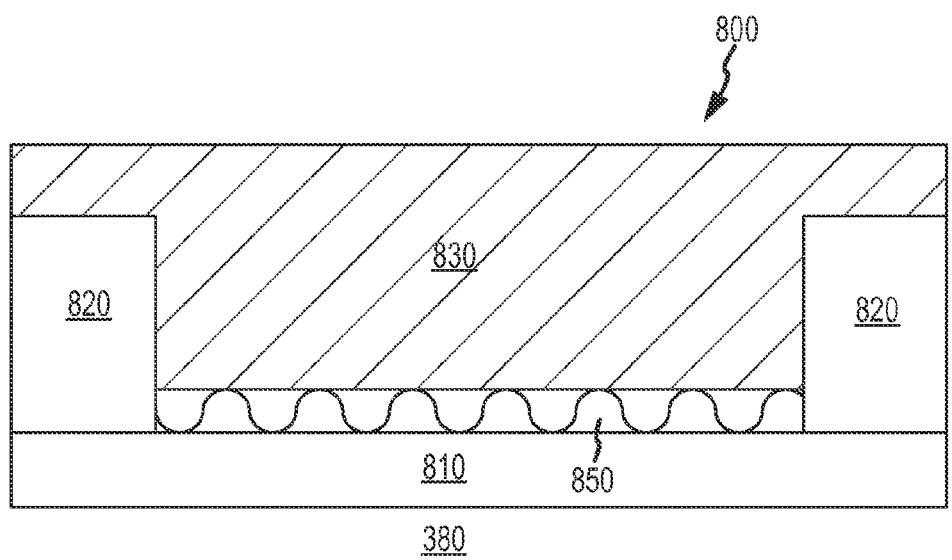
FIG. 21 is a vertical cross sectional view of a portion of an embodiment of a ceiling structure.

FIG. 21 depicts a cross-section of a portion of a ceiling structure 800. The ceiling structure 800 may include ceiling joists 820. Disposed to the interior of the ceiling joists 820 may be a layer of ceiling wallboard 810. Exterior to the ceiling wallboard 810 and between the ceiling joists 820 may be a PCM composition product 850. To the exterior of the PCM composition product 850 may be insulation material 830.

Figure 22:
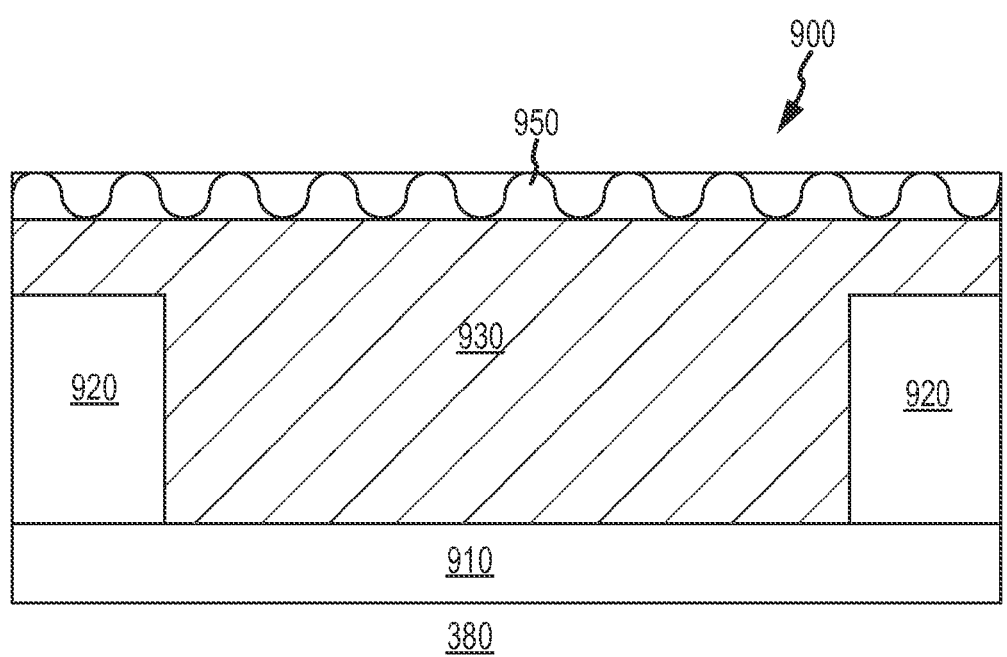
FIG. 22 is a vertical cross sectional view of a portion of another embodiment of a ceiling structure.

FIG. 22 depicts a cross-section of a portion of a ceiling structure 900. The ceiling structure 900 may include ceiling joists 920. Disposed to the interior of the ceiling joists 920 may be a layer of ceiling wallboard 910. To the exterior of the ceiling wallboard 910 and between the joists 920 may be an insulation material 930. A PCM composition product 950 may be disposed to the exterior of the insulation material 930.

Figure 23:
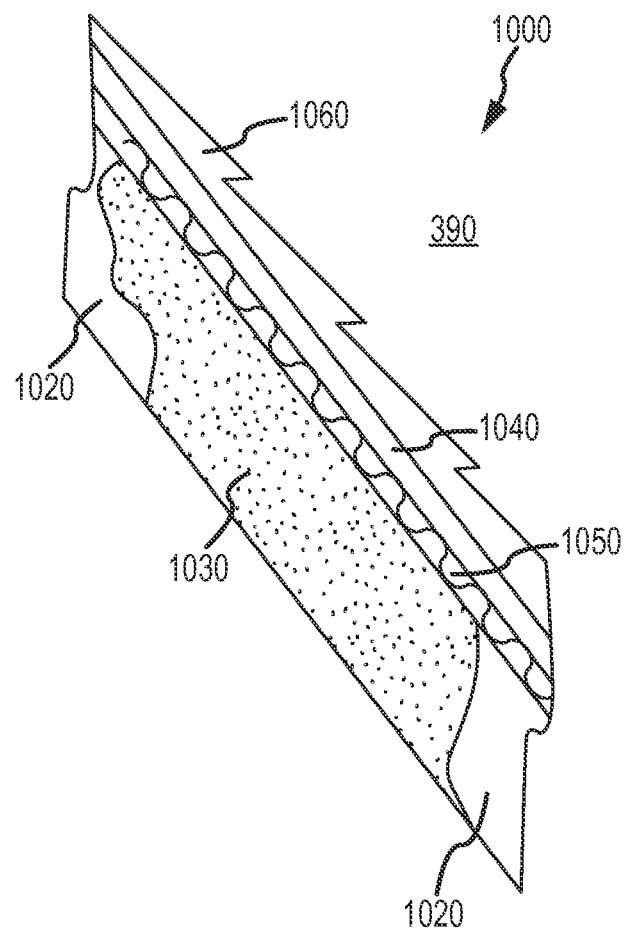
FIG. 23 is a vertical cross sectional view of a portion of an embodiment of roof structure.

FIG. 23 depicts a cross-section of a portion of a roof structure 1000. On the exterior of the roof structure 1000 may be a layer of roof shingles 1060. To the interior of the layer of roof shingles 1060 may be a layer of roof sheathing 1040. Disposed to the interior of the layer of roof sheathing 1040 may be a PCM composition product 1050. The PCM composition product 1050 may be disposed exterior to roof joists 1020. Disposed between adjacent roof joists 1020 may be insulation material 1030, which is shown partially cut away to expose the roof joists 1020 to view in FIG. 23.

Figure 24:
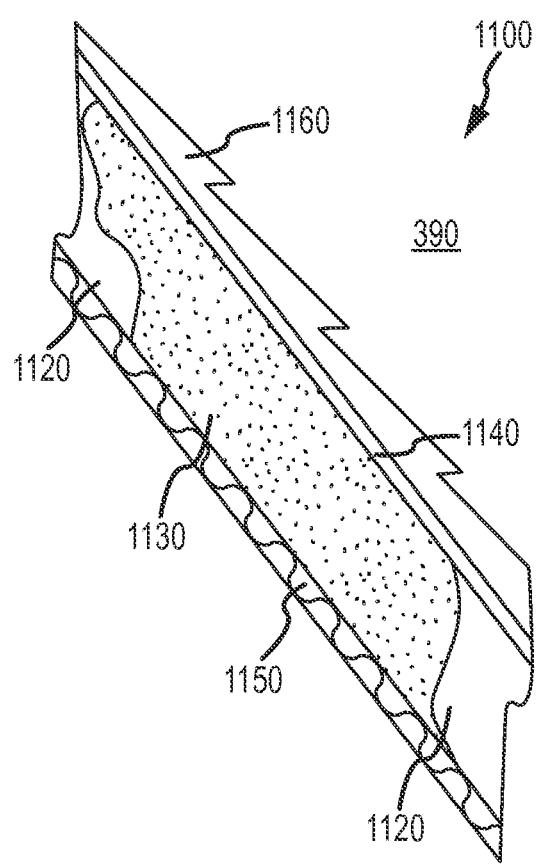
FIG. 24 is a vertical cross sectional view of a portion of another embodiment of a roof structure.

FIG. 24 depicts a cross-section of a portion of a roof structure 1100. The roof structure 1100 may include an exterior layer of roof shingles 1060. Disposed to the interior of the roof shingles 1060 may be a layer of roof sheathing 1040. The layer of roof sheathing 1040 may be disposed exterior to roof joists 1020. Insulation material 1030 may be disposed between adjacent roof joists 1020. The insulation layer 1030 is shown partially cut away to expose the roof joists 1020 to view in FIG. 24. To the interior of the roof joists 1020 may be a PCM composition product 1050.

Figure 25:
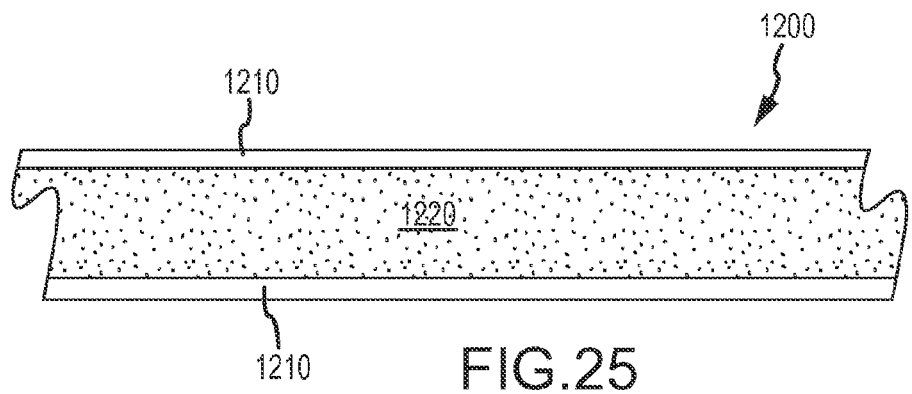
FIG. 25 is a cross sectional view of an embodiment of a structural insulated panel (SIP).

FIG. 25 depicts a cross section of a portion of a structural insulated panel (SIP) 1200. The SIP 1200 may include exterior layers 1210 (e.g., comprising oriented strand board (OSB)). Other appropriate material may also be used for the exterior layers 1210 of the SIP such as, for example, plywood, pressure-treated plywood, steel, aluminum, cement board, stainless steel, fiber-reinforced plastic, or magnesium oxide. Disposed between the exterior layers 1210 may be a foam insulation material 1220. The foam insulation material 1220 may include a PCM composition (e.g., in particulate form) disposed within the foam matrix. For example, the foam 1220 may be a polyurethane, isocyanurate, or other appropriate type of foam.

Figure 26:
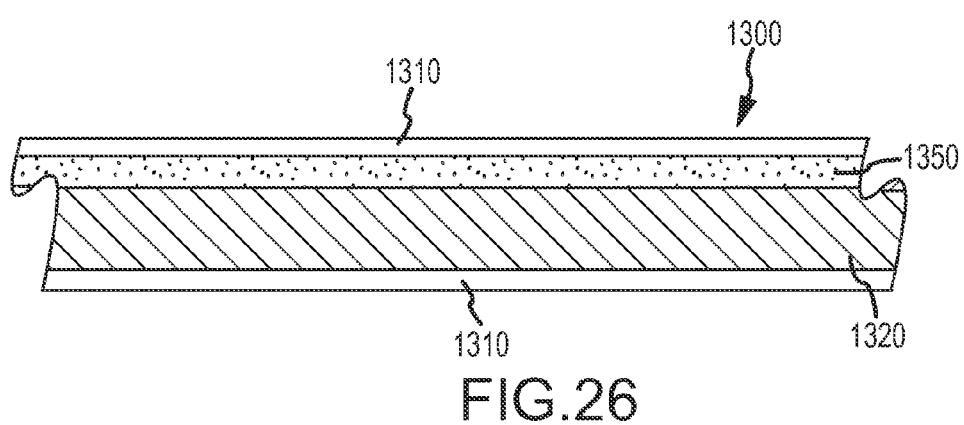
FIG. 26 is a cross sectional view of another embodiment of a SIP.

FIG. 26 depicts a cross section of a portion of a SIP 1300. The SIP 1300 may include exterior layers 1310. A layer of PCM composition 1350 may be disposed adjacent to a first of the exterior layers 1310. Additionally, layer of foam 1320 (e.g., polyurethane, isocyanurate, or other appropriate type of foam) may also be disposed adjacent to the layer of PCM composition product 1350 and a second of the exterior layers 1310.

Figure 27:
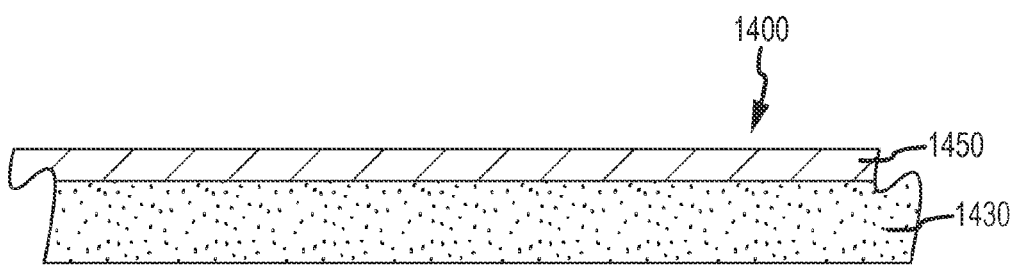
FIG. 27 is a cross sectional view of an embodiment of an insulating product.

FIG. 27 depicts an insulating product 1400 containing a PCM composition. The insulating product 1400 may include a layer of foam board 1430 (e.g., an isocyanurate or polyurethane foam board that may or may not be foil faced). An extruded layer 1450 of PCM composition is disposed on and bonded to the foam layer 1430.

Figure 28:
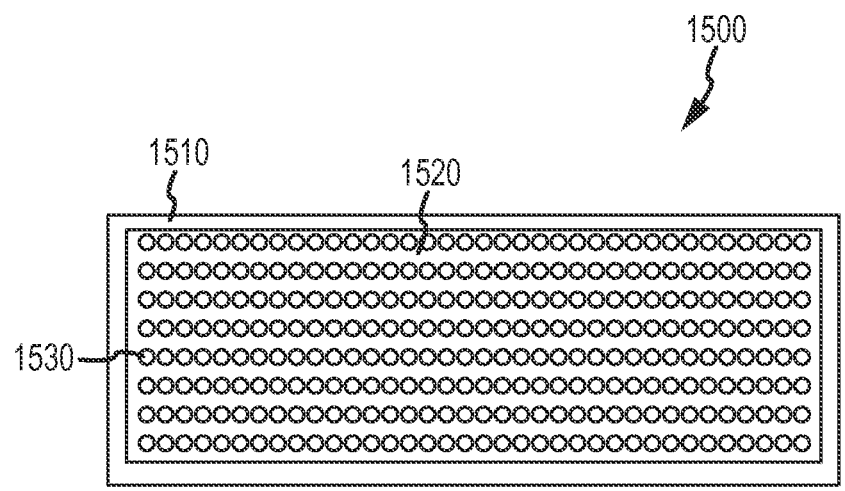
FIG. 28 is a cross sectional view of an embodiment of an air to air heat exchanger.

FIG. 28 depicts a cross section of a direct air heat exchanger 1500 using a PCM composition as a thermal storage mediation. The heat exchanger 1500 includes a wall 1510 defining an interior chamber 1520. A PCM composition 1530 in particulate form may be disposed within the interior chamber 1520. For example, the particles of the composition 1530 may be roughly spherical in shape, preferably with a diameter of from about ⅜ of an inch (9.5 mm) to about ¾ of an inch (19 mm) Perhaps about 30% of the volume of the interior chamber 1520 may comprise void space surrounding the particles 1530 to accommodate air flow around the particles. When the air is at a higher temperature than the PCM composition, heat is transferred to the PCM composition for storage. When the air is at a lower temperature than the PCM composition, heat is transferred from the PCM composition to the air.

Figure 29:
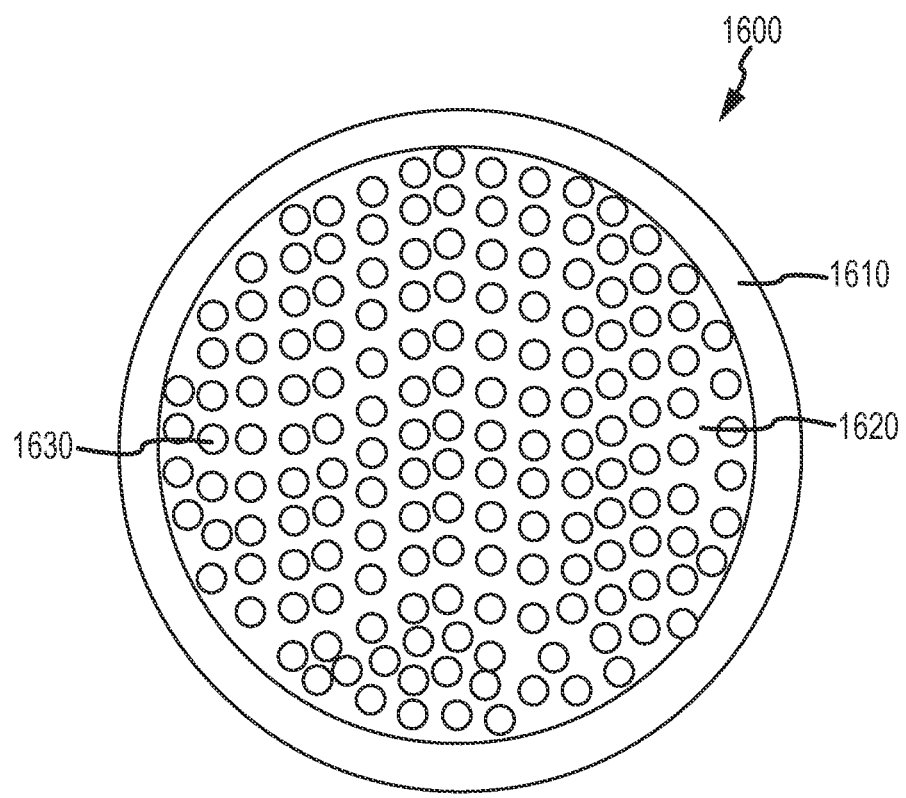
FIG. 29 is a cross sectional view of an embodiment of a liquid to liquid heat exchanger.

FIG. 29 depicts a direct liquid using a PCM composition as a thermal storage mediation heat exchanger 1600. The heat exchanger 1600 includes a wall 1610 defining an interior space 1620. A PCM composition 1630 in particulate form may be disposed within the interior space 1620. For example, the particles of the PCM composition 1630 may be roughly spherical in shape, preferably without a diameter of from about ⅜ of an inch (9.5 mm) to about ¾ of an inch (19 mm). Perhaps about 30% of the volume of the interior space 1620 may comprise void space to accommodate liquid flow around the particles. When the liquid is at a higher temperature than the temperature of the composition 1630, heat is transferred to the PCM composition for storage. When the temperature of the liquid is lower than the temperature of the PCM material, heat is transferred from the PCM composition to the liquid.

Figure 30:
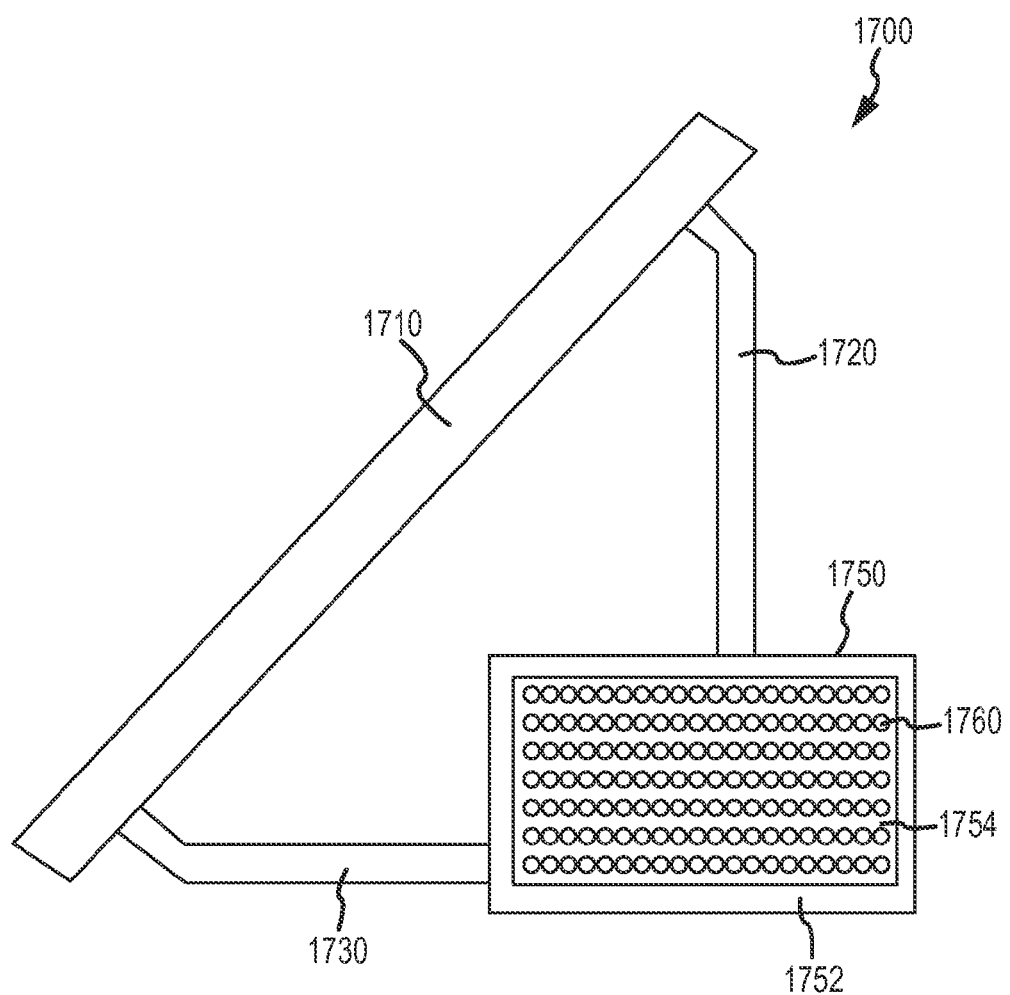
FIG. 30 is a schematic view of an embodiment of a solar panel hot water heater.

FIG. 30 depicts a solar hot water heater 1700 including a PCM composition as a thermal storage mediation. The solar water heater 1700 includes a thermal solar panel 1710 through which water may be passed to be heated during the day. Water may be introduced to the solar panel 1710 via an a feed conduit 1730. As the water passes through the solar panel 1710, the water is heated and subsequently passes via an outlet conduit 1720 to a tank 1750. The tank 1750 may have a wall 1752 defining an interior space 1754. Particles of PCM composition 1760 may be disposed within the interior space 1754 to receive and store thermal energy from the thermal solar panel 1710.

Figure 31:
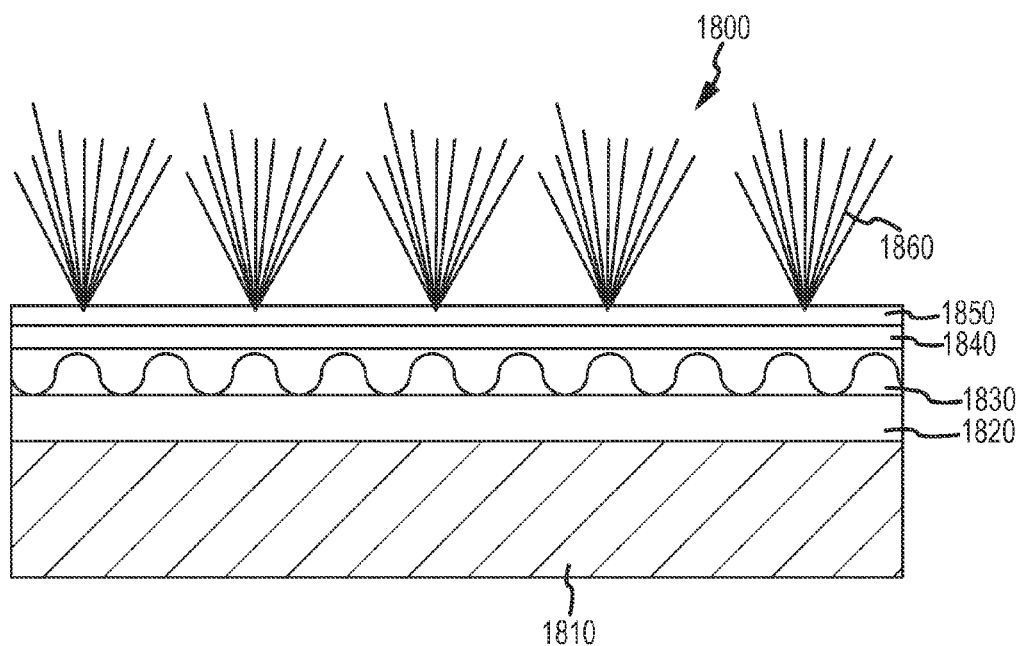
FIG. 31 is a vertical cross sectional view of an embodiment of a green roof structure.

FIG. 31 depicts a cross section of a "green roof" 1800. A green roof 1800 may be used to grow vegetation on a roof of a building. A rigid foam insulation layer 1820 may be disposed on the roof structure 1810. Above the foam insulation layer 1820 may be a PCM composition layer 1830. The PCM composition layer 1830 may be a in the product form of a blanket, a sheet board a layer of particles or other form. A roof membrane layer 1840 may disposed above the PCM composition layer 1830. Above the roof membrane layer 1840 may be a layer of growing medium 1850. Vegetation 1860 may grow from the growing medium 1850 (e.g., soil or soil substitute).

Figure 32:
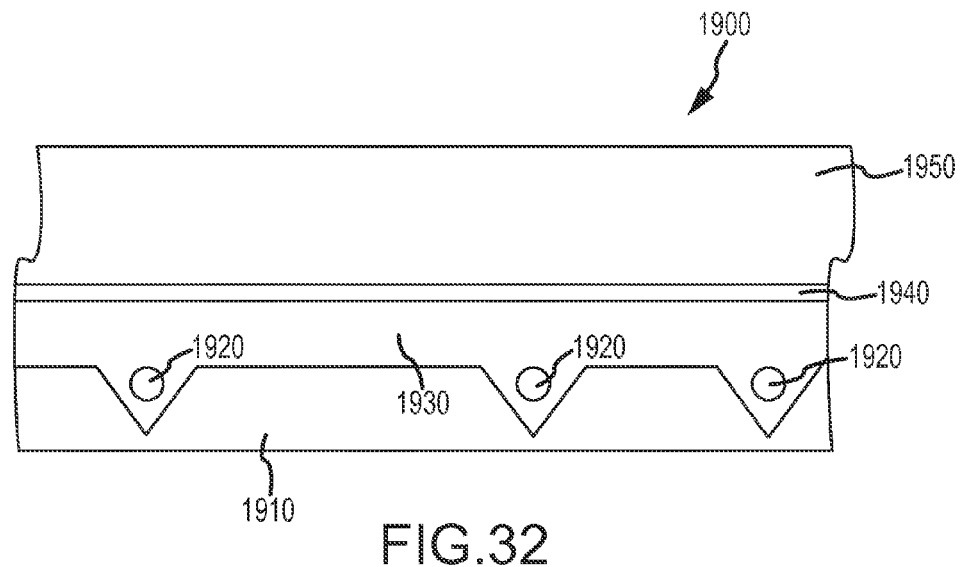
FIG. 32 is a vertical cross sectional view of an embodiment of a flooring system.

FIG. 32 depicts a cross section of an embodiment of flooring 1900 of an agricultural structure (e.g., barns for chickens or other animals. Upon the dirt floor base 1910 may be disposed a PCM composition layer 1930. The PCM composition layer 1930 may be a mixture of PCM composition particles and particles (e.g., aggregate) of a different material (e.g., sand). A number of tubes 1920 may be disposed within the PCM composition layer 1930 such that a working heat exchange fluid (e.g., water) may be passed therethrough to either heat or cool the PCM composition layer 1930. A disposable fabric layer 1940 may be disposed over the PCM composition layer 1930. A clay litter floor 1950 may be disposed over the fabric layer 1940. The clay litter floor 1950 and disposable fabric layer 1940 may be disposed of and replaced periodically (e.g., annually).

Figure 33:
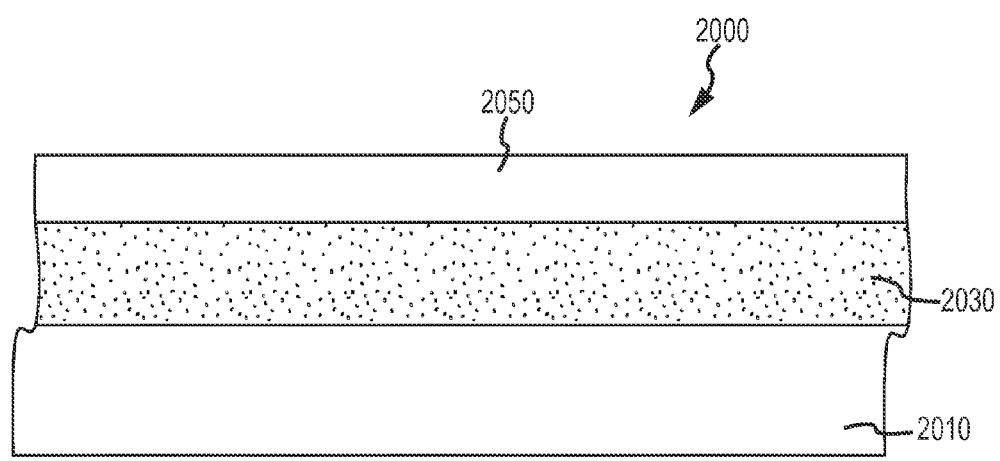
FIG. 33 is a vertical cross sectional view of an embodiment of an in-floor heating system.

FIG. 33 depicts a cross section of an in-floor heating system 2000. The system 2000 may include a heat source 2010. For example, the heat source 2010 may comprise resistive heating elements or tubing through which a heated fluid (e.g., water) may be passed. A sheet board 2030 (e.g., a magnesium oxide board) containing a PCM composition may be disposed above the heat source 2010. Alternatively, the sheet board 2030 may be disposed below the heat source 2010. A finished flooring product 2050 (e.g., tile, hardwood flooring, linoleum flooring, etc.) may be applied over the sheet board material 2030.

Figure 34:
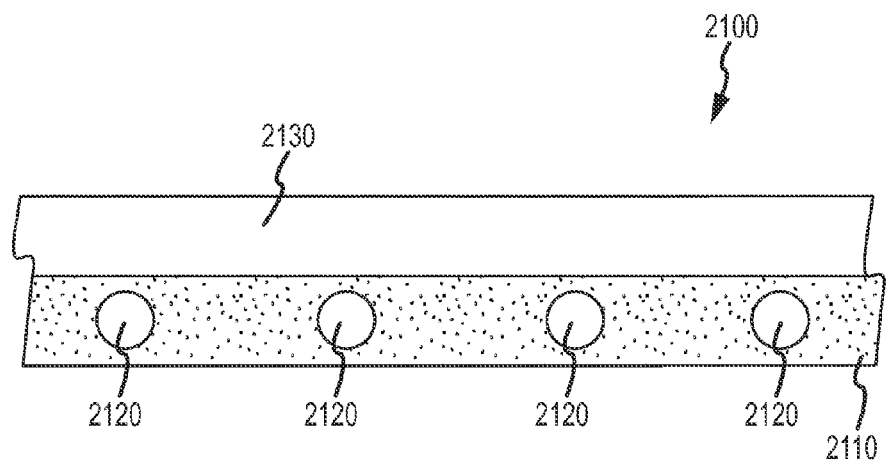
FIG. 34 is a vertical cross sectional view of an embodiment of a greenhouse bed.

FIG. 34 depicts a cross section of a of a structure 2100 for a growing bed in a greenhouse. The structure 2100 may include a PCM composition layer 2110. For example, the layer 2110 may include particles of the PCM composition. Surrounding air ducts 2120 that extend through the PCM composition layer 2110. A soil layer 2130 may be disposed above the PCM composition layer 2130. Accordingly, hot air from the top of the greenhouse may be circulated through the air ducts 2120 to store thermal energy in the layer 2110 to heat and moderate temperature changes in the soil layer 2110.

Figure 35:
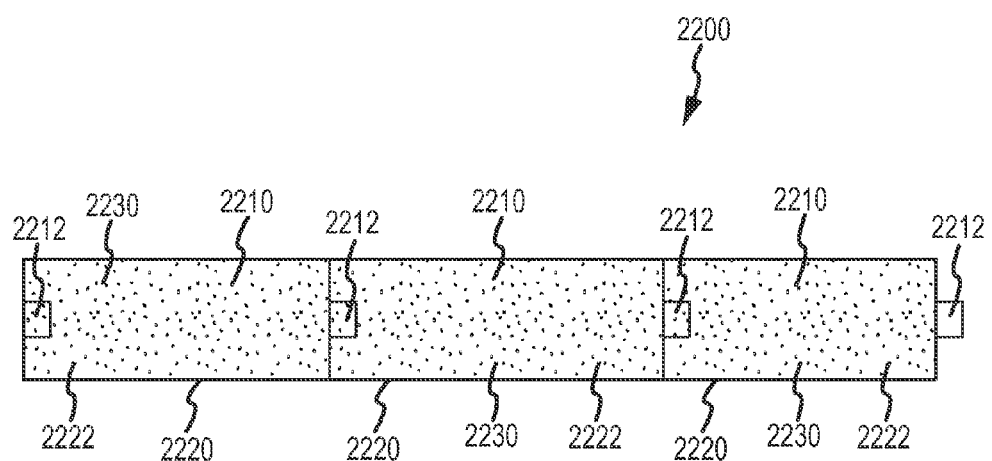
FIG. 35 is a cross sectional view of an embodiment of interlocking metal panels.
Figure 36:
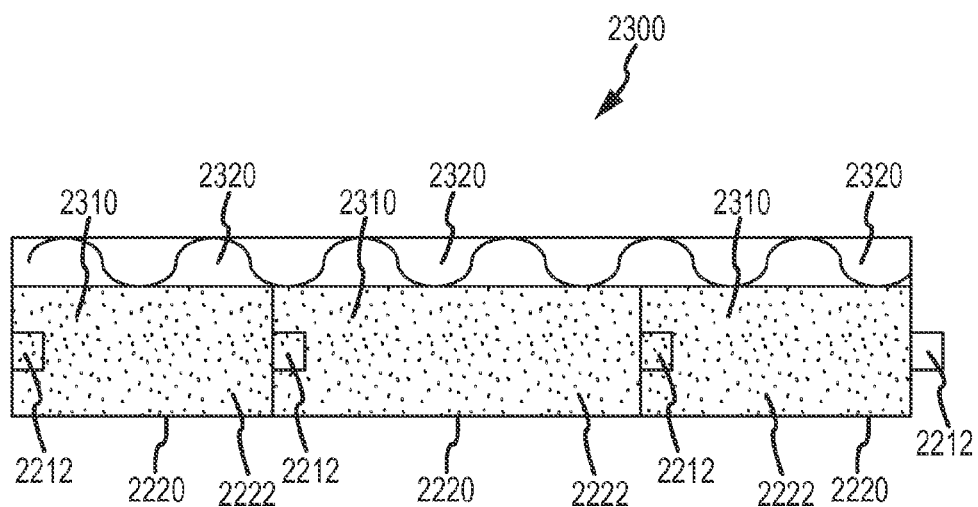
FIG. 36 is a cross sectional view of another embodiment of interlocking metal panels.

FIG. 35 depicts a cross section of a number of interlocked metal panels 2200. Each metal panel 2210 may include an interlocking mechanism 2212 (e.g., correspondingly shaped tabs and notches or other appropriate type of interlocking mechanism) used to interlock the panels 2210. The panels 2210 may include a metallic wall 2220 defining an interior volume 2222. The interior volume 2222 may be filled with a foam matrix 2230. The foam matrix 2230 may have disposed therein particles of a PCM composition (e.g., disposed in the matrix of the foam). The interlocked panels 2200 may be used for wall and/or roof assemblies. FIG. 36 depicts an alternative embodiment of interlocked metal panels 2300. In FIG. 23, the interior space 2222 may include a foam insulation layer 2310 and a discrete PCM composition layer 2320.

Figure 37:
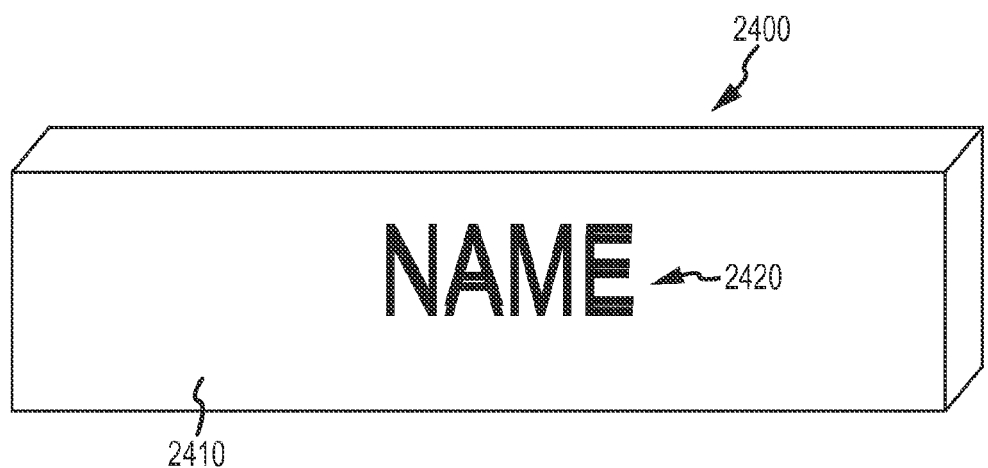
FIG. 37 is a perspective view of an embodiment of a decorative panel.

FIG. 37 depicts a molded or shaped decorative panel 2400. The decorative panel 2400 may include a body 2410 made of a PCM composition. Graphics, designs, or logos 2420 may be molded into, carved from, printed on, or be otherwise disposed on the decorative panel 2400. In this regard, the decorative panel 2420 may be disposed in a space (e.g., mounted to a wall) to allow for air flow thereabout.

Figure 38:
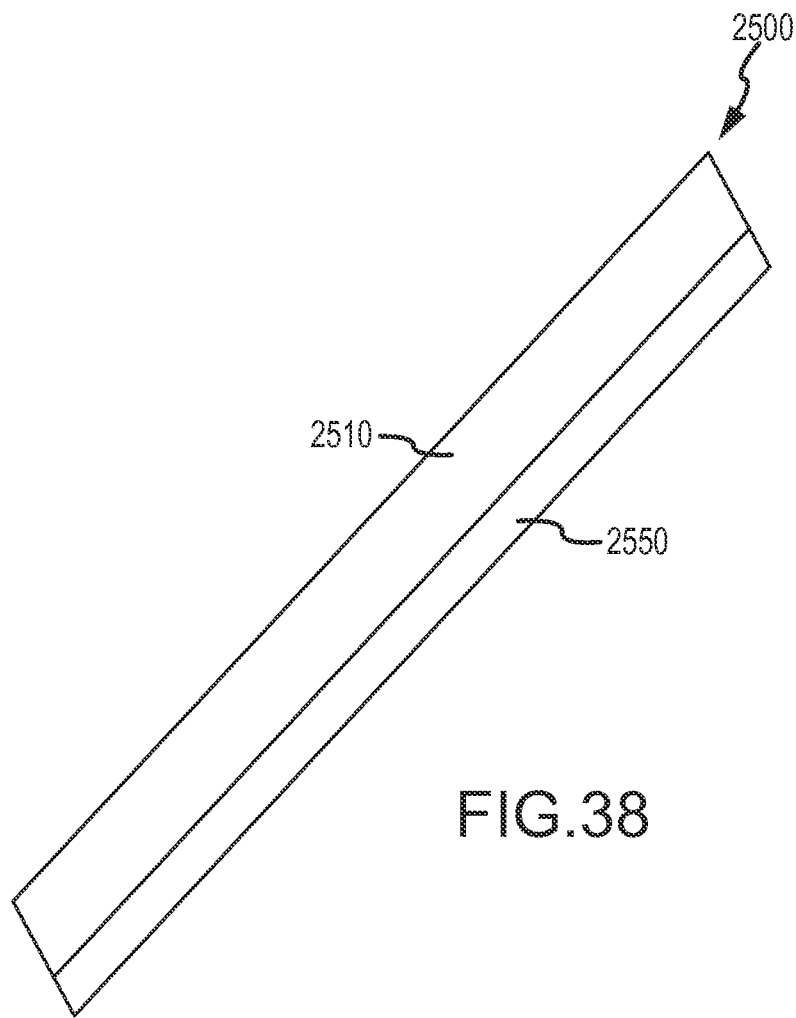
FIG. 38 is a side view of an embodiment of a photovoltaic solar panel.

FIG. 38 depicts a photovoltaic solar panel assembly 2500. The assembly 2500 may include a photovoltaic solar cell 2510. A PCM composition 2550 may be disposed onto a support substrate. The PCM composition 2550 may in turn be bonded (e.g., with a heat conductive adhesive) to the photovoltaic solar cell 2510.

Figure 39:
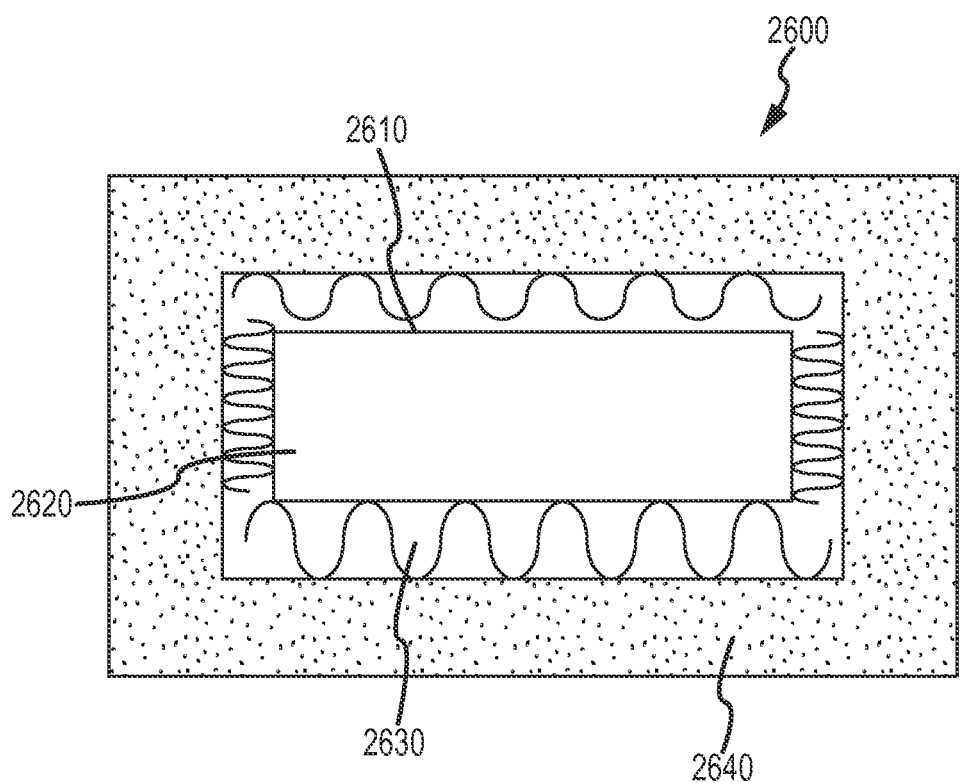
FIG. 39 is a cross sectional view of an embodiment of an air duct.

FIG. 39 depicts a cross section of a heating duct 2600. The heating duct 2600 may include a duct side wall 2610 that defines a duct passage 2620 through which air may be passed. A PCM composition material 2630 (e.g., a PCM blanket, sheet board including a PCM composition, or other appropriate form of PCM composition containing material) may be disposed about the duct side wall 2610. A layer of insulating material 2640 may be disposed about the PCM composition material 2630.

EXAMPLES

The invention is further illustrated by the following non-limiting examples.

Example 1

A phase change aggregate with an enthalpy of 31 J/g and a mean particle size of ⅛ inch was produced in a rotating drum agglomerator in a continuous production process. An acid/base dry feed cement containing 11% magnesium oxide, 27% monopotassium phosphate, 5% wollastonite, 44% class C fly ash, plus 11% magnesium aluminum silicate was introduced into the rotating agglomerator at a rate of 6.52 pounds per minute. A like amount of Ciba Chemicals [now BASF/Ciba] DPNT0031 microencapsulated PCM (mPCM) liquid emulsion was pumped to a fine spray nozzle inside the drum agglomerator. With a residence time of 3.1 minutes inside the rotating drum agglomerator, a phase change aggregate with mean average diameter of ⅛ inch and an aggregate outflow rate of 0.3 cubic feet per minute was produced in a continuous test production process.

Example 2

A binder was prepared using dead burned magnesium oxide (HR98 from Martin Marietta), finely ground monopotassium phosphate (300 mesh) and class C fly ash in a ratio of 1:3:7. 100 grams of MgO, 300 grams of MKP, and 700 grams of fly ash were combined as dry ingredients. This mixture was added to 2400 gram of mPCM liquid emulsion (Ciba Chemicals [now BASF/Ciba] DPNT0031). When mixed, the sample began to gel and harden within 30 seconds. After 1 hour the sample was broken into particles of ½ inch diameter or less with a high speed shear mixer. The dry particles, now usable as an aggregate in concrete mixes, were tested to contain 35% PCM solids with an enthalpy of 47 J/g.

Example 3

100 grams of mPCM liquid emulsion (Ciba Chemicals [now BASF/Ciba] DPNT0031) was mixed with 100 grams of magnesium aluminum silicate powder (Acti-Gel (R) 208). Within 15 seconds, all of the fluid of the mPCM emulsion was adsorbed, leaving a sandlike substance. Flame from a propane torch was applied directly to the sandlike substance, both immediately after mixing, and after it had been allowed to dry for 24 hours, and in both instances, the substance could not be ignited, although it contained thirty percent mPCM with a measured enthalpy of 34 J/g.

Example 4

An aggregate was prepared by mixing 100 grams diatomaceous earth, 100 grams hydrous sodium silicate (type G from PQ Corp.), 100 grams of dead burned magnesium oxide (HR98 from Martin Marietta) with 1000 grams of mPCM liquid emulsion (Ciba Chemicals [now BASF/Ciba] DPNT0031). This mixture was allowed to cure and dry, resulting in a hardened, solid mass. The mass was then sized by placing it in a blender, resulting in an aggregate ranging from fine sand to ¼ inch gravel in size. The entire dried sample, weighing 1040 grams, was then mixed together with a binder consisting of 400 grams of light burned magnesium oxide (Oxymag® from Premier Chemicals), 300 grams of liquid magnesium chloride (35 baume from Cargill), and filler comprised of 467 grams of wet sawdust. During mixing, 180 grams of water was added, as well as 34 grams of a defoamer, Burst 5470®. The resulting mix was placed in a mold to produce a 26 cm×31 cm size wallboard, 15 mm thick. The average enthalpy was 23.5 J/g, density was 1.35 g/cm³ and board area enthalpy was 540 KJ/m3.

Example 5

An mPCM liquid emulsion (Ciba Chemicals [now BASF/Ciba] DPNT0031) was added to a like weight of a mix of the following dry materials: fly ash (ranging from 30% to 70% by weight of the dry mix), magnesium oxide (ranging from 10% to 50%) monopotassium phosphate (MKP) (ranging from 20% to 60%), plus aluminum silicates (ranging from 5% to 25%). The mPCM liquid emulsion (Ciba Chemicals [now BASF/Ciba] DPNT0031) and the dry mix were thoroughly blended together and allowed to harden and dry. When semi-solid, the mix was broken up by any conventional means, such as grinding. When fully cured and dried, the material size was further reduced by conventional methods in order to achieve a desired particle size. When the mPCM liquid emulsion (Ciba Chemicals [now BASF/Ciba] DPNT0031) contained 45% mPCM solids, the resulting mixture contained 22.5% mPCM solids on a wet basis. When fully cured, the amount of mPCM solids in the resulting dry aggregate was about 6 percent higher.

Example 6

In another example, the dry mix was comprised of lightly calcined magnesium oxide (10% to 40%), dolomite powder (CaMg(CO3)2) (10% to 40%), magnesium chloride hexahydrate (10% to 40%), antimony pentoxide (5% to 20%) as a fire retardant and diatomaceous earth (20% to 50%). To this dry mixture, mPCM liquid emulsion (Ciba Chemicals [now BASF/Ciba] DPNT0031) was added in a ratio of one part of dry mix to two parts slurry. These ingredients were thoroughly mixed and allowed to harden and dry. The slurry contained 45% of mPCM solids, the resulting mixture had about 37% solids on a wet basis. The percentage of mPCM solids in the dry, fully cured aggregate was higher.

Example 7

A fire resistant board with an estimated B—fire rating was made as follows. Dry ingredients including 435 grams magnesium oxide (Martin Marietta HR 98), 425 grams monopotassium phosphate (300 mesh), 250 grams wollastonite, plus 250 grams class fly ash produced a magnesium phosphate cementitious material. This was mixed with wet ingredients: 15 grams super plasticizer [Rheobuild 10000], 500 grams dry mPCM (Ciba Chemicals [now BASF/Ciba] DPNT-0176) and 820 grams of water. The dry ingredients were mixed thoroughly with the wet and placed in a 26 cm×31 cm×1.27 cm mold. A layer of 2.5 oz. nonwoven veil fiberglass fabric was placed on both sides. The board hardened and was de-molded in 8 hours. A Perkin Elmer Pyrus DSC1 Differential Scanning Calorimeter was used to test board enthalpy. The tested board enthalpy level was 29.7 J/g (427 KJ/m2), with a density of 1.15 g/cm^3. A propane torch was positioned 7 cm from the board face. The torch flame was directed at the center of the board and held in place for 10 seconds, and the flame extinguished when the torch was removed. The torch was applied a second time for 30 seconds when the torch was removed the flame again extinguished.

Example 8

A phase change aggregate as described below in Example 10 with an average diameter of ¼ inch was placed in a rectangular enclosure measuring 3 inches by 3 inches by 12 inches high with a volume of 108 cubic inches. Tests revealed 32 percent void space between the phase change aggregate particles for air or fluid to flow through. A total of 1.84 pounds of phase change aggregate with an enthalpy of 34 J/g was placed in the enclosure. A volume of 2 cfm, 50 degree Fahrenheit air was introduced at the bottom for 8 hours to simulate night time air conditions. Tests revealed significant potential for use of the phase change aggregate as a heat exchange medium to capture cool night time air for day time cooling.

Example 9

A fire resistant PCM extrudite was formed of these materials by weight: 10 parts dead burned magnesium oxide, 20 parts monopotassium phosphate (MKP) (300 mesh), 80 parts purified attapulgite clay, 300 parts microencapsulated PCM liquid emulsion (Ciba Chemicals [now BASF/Ciba] DPNT0031), and one half part micro polypropylene fibers. The ingredients of the formula were mixed with a shear mixer and in about 20 seconds formed a thick viscous mass. A one quarter inch thick layer of the PCM viscous mass was extruded onto the surfaces of a foil faced polyisocyanurate insulation board and an expanded polystyrene foam board. The fire resistant PCM extrudite was effective in adding thermal mass to the light weight insulation boards and imparting fire resistance to otherwise flammable products.

Example 10

A fine, sandlike PCM aggregate with a mean diameter of about ¹/₃₂ inch or about 170 mesh was prepared for testing in blown in insulation. The PCM aggregate was intended to increase the thermal mass of the insulation and moderate daytime to night time temperature fluctuations and thus to decrease peak power demands. A PCM aggregate was prepared with 10 parts 300 mesh Martin Marietta P98 PV magnesium oxide (MgO), 20 parts 200 mesh Peak monopotassium phosphate (MKP) and 80 parts Actigel® 208, a purified attapulgite clay. The three components of the dry mix were blended and then added to 300 parts of BASF/Ciba PCM PC200 aqueous liquid emulsion. The original intention for the inclusion of the purified attapulgite was to soak up, adsorb or absorb the excess water and the wax and acrylic polymer residues not bound up in the manufacturer's PCM encapsulation process. The dry ingredients were added to the PCM liquid emulsion and mixed with a shear mixer. Within a few seconds, the mixture formed a viscous mass. Shear mixing continued for five minutes and the mass broke down into ¼ to ¾ inch PCM aggregate particles.

The resulting PCM aggregate was air dried at room temperature for twelve hours and then processed in a ball mill for further size reduction to sizes ranging from 80 to 140 mesh. PCM aggregate particles smaller than 140 mesh were removed by sieves. An unexpected discovery was made when the sub-140 mesh PCM aggregate, ranging in size from about 150 to about 300 mesh, was exposed to direct flame from a propane torch and could not be ignited. When further examined, an additional surprising discovery was made. The sub-200 mesh particles of the cementitious binder combined with the pseudo/nano particle size of the purified attapulgite clay (which contains high aspect ratio rodlike particles about 20 microns long by about 30 Angstroms in diameter) formed a hard, fire resistant mass around the 2 to 15 micron size acrylic shells of the microencapsulated PCM. The hard, fire resistant mass surrounding the acrylic shells should allow manufacturers to use aggressive mixing devices to blend such aggregates with other materials without concern for damaging the acrylic shells. Analysis by Differential Scanning Calorimeter showed the enthalpy of the samples to range from about 70 to about 80 J/g.

Based upon the above examples, the proportions shown in Table 2 below are considered appropriate for PCM compositions based upon aqueous suspensions or slurries of encapsulated PCM. All percentages are by weight.

TABLE 2

| Mixture Components | Mixtures of Examples 9 and 10 Prior to Drying | | | | Ranges for some representative example compositions prior to drying |
|---|---|---|---|---|---|
| Dry Cementitious Binder Components | 30 | 7.3% | 30 | 4.9 | 4% to 8% |
| Adsorbent or Absorbent | 80 | 19.5% | 80 | 13.1% | 8% to 30% |
| PCM Solids | 135 | 32.9 | 225 | 36.9% | 32% to 40% |
| Aqueous Liquid | 165 | 40.2% | 375 | 45.1% | 30% to 60% |
| Total | 410 | 100.0% | 610 | 100.0% | |

Examples 11-15

Cementitious mixture products were made with a magnesium phosphate cement binder from feedstock components of magnesium oxide (MgO) and monopotassium phosphate (MKP). Other feedstock components include a clay as a water sorbent and microencapsulated phase change material (mPCM). The mPCM feedstock was provided either in a dry form or in a wet form (slurry form) with the mPCM particles dispersed in an aqueous liquid phase. The mPCM feedstocks were from either Ciba Chemicals (Ciba PCM 200, available in dry and wet forms; BASF 5001X, in dry form; and BASF 5000X, in wet form). The Ciba PCM 200 wet product contains about 45 weight percent mPCM solids and the BASF 5000X contains about 40 weight percent mPCM solids. The mPCM solids are microparticles of a shell-core structure with phase change material contained in the core enclosed within a polymeric shell. The MgO was 300 mesh Martin Marietta P98 PV magnesium oxide. The MKP was 200 mesh Peak monopotassium phosphate (MKP). A water-sorbing clay component was provide in the form of Actigel® 208, a purified attapulgite clay. The weights in grams of feedstock components for each of Examples 11-15 are shown in Table 3. Water was provided either in liquid phase of the wet mPCM feedstock or as added water. Feedstock components were combined and mixed to form particles of a cementitious mixture. The particles were then dried at ambient conditions in a hoop house, typically for at least one or more days. Dried product of the cementitious mixture was then weighed and the enthalpy was tested for some samples. Results are shown in Table 3, including the weight of the dried products, the estimated weight percent content of mPCM solids in the dried products and the measured enthalpy of some of the dried products. Calculations of mPCM content in the dried products assumes that the Ciba PCM 200 wet product contains 45 weight percent mPCM solids and that the BASF 5000X product contains 40 weight percent mPCM solids. Because the mPCM solids include the polymeric shells, the actual weight percentage content of phase change material in the dried products is somewhat less than the weight percentages shown.

TABLE 3

| Component | Example 11 | Example 12 | Example 13 | Example 14 | Example 15 |
|---|---|---|---|---|---|
| MgO (g) | 30 | 45 | 10 | 15 | 10 |
| MKP (g) | 60 | 90 | 20 | 30 | 20 |
| Clay (g) | 40 | 65 | 80 | 110 | 80 |
| Dry mPCM (g) | 300[1] | 300[2] | 0 | 0 | 0 |
| mPCM Slurry (g) | 0 | 550[4] | 400[3] | 500[3] | 300[3] |
| Water (g) | 252 | 0 | 0 | 0 | 0 |
| Total Feed Mixture Weight (g) | 682 | 1050 | 510 | 655 | 410 |
| Dried Product Weight (g) | 480 | 806 | 310 | 382 | 244 |
| mPCM Solids Content in Dried Product (%) | 63 | 65 | 58 | 59 | 54 |
| Enthalpy Dried Product (J/g) | 95 | | 80 | 75 | 81 |

[1]Ciba PCM 200 dry
[2]BASF 5001X dry
[3]Ciba PCM 200 wet, containing approximately 45% by weight mPCM solids
[4]BASF 5000X wet, containing approximately 40% by weight mPCM solids The products of all of Examples 11-15 are formed into particles during shear mixing. Particles in Example 12 were generally of a size of about 3/8 inch (9.5 millimeters) and smaller. Particles in Example 13 were large, generally of a size of about 3/4 inch (19 millimeters) and larger. Particles in Example 15 were mixed until the particle size was reduced to about 20 mesh (0.5 millimeter).

Example 16

A composition containing a cementitious binder and a sorbent was sized to measure 7 1/8 inches×5 1/4 inches by 1/2 inch thick was placed on a Ohaus beam scale accurate to 1/10 of a gram. The sample weight measured at a first instance during the daytime was 172.6 grams. The ambient temperature was 86° F. and relative humidity was 59% at the first instance. Eighteen hours later, during the nighttime, the sample weighed 177.5 grams. The temperature at the time of this subsequent measurement was 69° F. and relative humidity was 74%. The sorption and then desorption of 4.9 grams of water/water vapor indicates a diurnal storage thermal storage capacity of about 74 J/g. The enthalpy of the composition range from about 70 J/g to 95 J/g.

Although only exemplary embodiments of the invention have been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

Although the present invention has been described with reference to preferred embodiments, numerous modifications and variations can be made and still the result will come within the scope of the invention. No limitation with respect to the specific embodiments disclosed herein is intended or should be inferred. Each process embodiment described herein has numerous equivalents. As used in the following claims, unless the context requires otherwise, the term "cement binder" refers to a cured cement composition after reaction of cement feedstock components and after hydration, and the "sorbent" is accounted for separately and is not as part of the cement binder.

We claim:

1. A phase change material-containing composition, comprising:
   phase change material;
   sorbent comprising a clay; and
   cement binder comprising an acid-base cement;
   wherein the phase change material comprises at least 40 weight percent of the composition and wherein the phase change comprises an organic phase change material.

2. The composition according to claim 1, comprising the sorbent at a weight ratio to the phase change material in a range of from 0.01:1 to 2:1.

3. The composition according to claim 1, wherein the cement binder is a magnesium phosphate cement.

4. The composition according to claim 1, comprising the cement binder at a weight ratio to the phase change material in a range of from 0.04:1 to 1:1.

5. The composition according to claim 1, wherein the phase change material is contained in particles bound within the composition.

6. The composition according to claim 5, wherein the particles are of a size in a range of from 1 micron to 3 millimeters.

7. The composition according to claim 1, wherein the composition has a phase change enthalpy of at least 50 joules per gram of the phase change material.

8. The composition according to claim 1, comprising non-chemically bound water at a weight ratio to the sorbent of at least 0.4:1.

9. The composition according to claim 1, having a Euroclass fire rating of C or higher.

10. The composition according to claim 1, wherein the composition is in the form of a monolithic mass.

11. The composition according to claim 10, wherein the monolithic mass is in the form of a sheet board.

12. The composition according to claim 10, wherein said monolithic mass is bonded to another component of a building product.

13. The composition according to claim 10, wherein said monolithic mass is molded.

14. The composition according to claim 1, wherein the composition is in the form of a batch of particles, wherein at least 90 weight percent of the particles of the composition are smaller than 1 inch (25.4 millimeters).

15. The composition according to claim 14, wherein at least 90 weight percent of the particles of the composition are larger than 100 microns (0.1 mm).

16. The composition according to claim 15, wherein the particles of the composition are bound in a matrix.

17. A phase change material-containing composition, comprising:
   phase change material;
   sorbent comprising a clay; and
   cement binder comprising an acid-base cement;
   wherein the phase change material comprises at least 40 weight percent of the composition, and wherein phase change material comprises an inorganic salt.

* * * * *